United States Patent [19]

Abdel-Malek

[11] Patent Number: 5,511,147
[45] Date of Patent: Apr. 23, 1996

[54] GRAPHICAL INTERFACE FOR ROBOT

[75] Inventor: Karim Abdel-Malek, Collegeville, Pa.

[73] Assignee: UTI Corporation, Trappe, Pa.

[21] Appl. No.: 180,410

[22] Filed: Jan. 12, 1994

[51] Int. Cl.⁶ .................................................. G05B 19/42
[52] U.S. Cl. ................................................. 395/99; 395/92
[58] Field of Search .............................. 395/80, 85, 88, 395/92, 99; 901/3, 4, 5; 318/568.13

[56] References Cited

U.S. PATENT DOCUMENTS

| | | | |
|---|---|---|---|
| 4,697,239 | 9/1987 | Sicard et al. | 364/468 |
| 4,763,276 | 8/1988 | Perreirra et al. | 364/513 |
| 4,812,829 | 3/1989 | Ebina et al. | 340/709 |
| 4,833,624 | 5/1989 | Kuwahara et al. | 901/9 |
| 4,835,450 | 5/1989 | Suzuki | 318/568 |
| 4,912,625 | 3/1990 | Glatfelter | 364/192 |
| 4,954,762 | 9/1990 | Miyake et al. | 318/568 |
| 4,956,790 | 9/1990 | Tsuchihashi et al. | 395/94 |
| 4,970,666 | 11/1990 | Welsh et al. | 364/522 |
| 4,987,527 | 1/1991 | Hamada et al. | 364/167.01 |
| 4,998,050 | 3/1991 | Nishiyama et al. | 395/99 |
| 5,047,916 | 9/1991 | Kondo | 395/99 |
| 5,056,031 | 10/1991 | Nakano et al. | 395/90 |

OTHER PUBLICATIONS

White et al, "A Graphics Simulator for a Robotic Arm", IEEE Transactions or Education, vol. 32, No. 4, Nov. 1989, pp. 417–429.

Eydgahi et al, "A Computer Animation of Robotic Manipulators and Work Cells", IEEE Control Systems Magazine, vol. II Iss. 4 pp. 56–59, Jun. 1991.

D. M. A. Lee and W. H. El Maraghy, "ROBOSIM: a CAD–based off–line programming and analysis system for robotic manipulators", Computer–Aided Engineering J., Oct. 1990, 141–148.

Kath, G. S., et al., "Talk To Your Robot Through CAD", Machine Design, vol. 64, No. 21, pp. 190, 192 (Oct. 22, 1992).

Nof, Shimon Y. (ed.) Handbook of Industrial Robots, Chapter 20—Yong, Y. F. et al. "Off–line Programming of Robots", John Wiley & Sons, Inc., 1985, 366–380.

Primary Examiner—Robert W. Downs
Attorney, Agent, or Firm—Seidel Gonda Lavorgna & Monaco

[57] ABSTRACT

A graphical interface system and method of use allows robot programs to be graphically created and visualized in three dimensional space in a CAD environment. Using either on-line or off-line techniques, an operator enters robot positions and orientations in space into the interface to define robot configurations. Trajectories between configurations are entered or generated and are displayed along with the configurations. The state of the end effector is also entered and visually communicated. A special state can be designated. The special state has associated therewith programming code for controlling robot actions at a configuration and the robot environment at the configuration. When such a state is designated by the user, programming code written in a special language is entered and stored in association with a particular configuration. After all robot configurations, states and trajectories are entered, the system creates robot control data. In operation, when the robot reaches a configuration associated with the special state, the programming code is executed. Robot configurations and trajectories can be simultaneously displayed along with CAD created objects such as workpieces so that interactions therebetween are visible. The CAD environment is utilized for selecting configurations and creating of trajectories. Configurations can be also be designated by selecting points on CAD created objects and lines.

24 Claims, 18 Drawing Sheets

OPEN GRIPPER NODE ICON

CLOSED GRIPPER NODE ICON   CRIPTIC NODE ICON

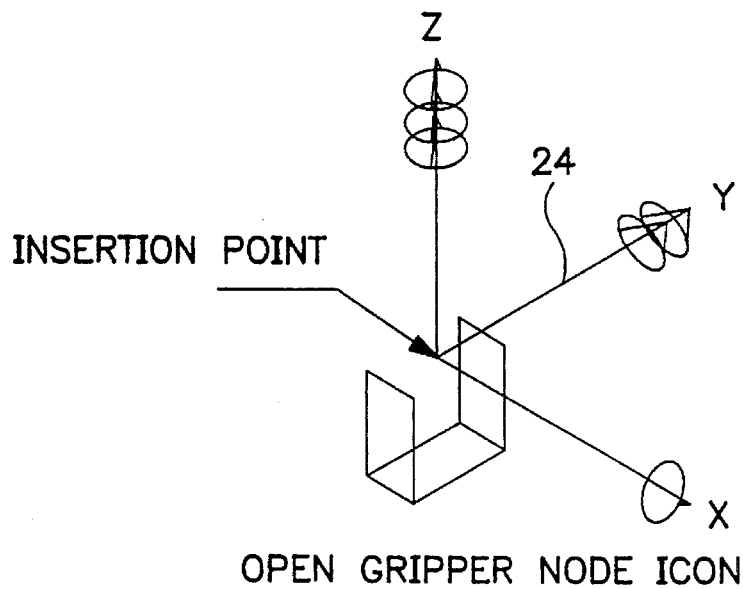
FIG. 4(a) OPEN GRIPPER NODE ICON
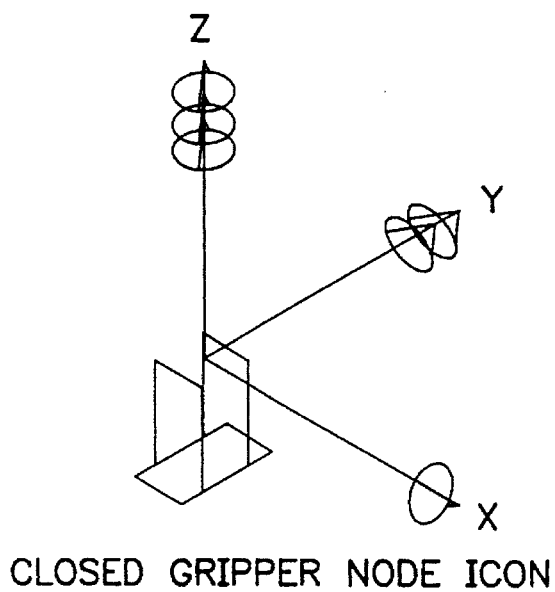
FIG. 4(b) CLOSED GRIPPER NODE ICON
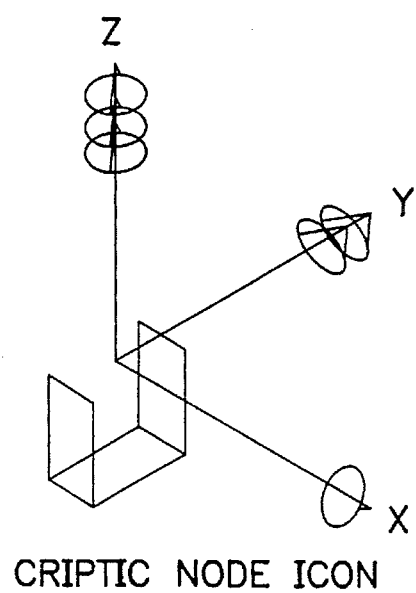
FIG. 4(c) CRIPTIC NODE ICON

GRAPHICAL INTERFACE FOR ROBOT

FIELD OF THE INVENTION

This invention relates to a system and method for graphically creating and visualizing robot positions, orientations and trajectories in space and for controlling and moving robots in accordance with graphical information.

BACKGROUND OF THE INVENTION

Robots today are programmed to perform their tasks by either on-line or off-line techniques, or combinations of both. A typical on-line programming method is known as the "teaching playback" technique. That technique involves the steps of placing the robot in the actual environment where it is to be used (i.e., placing the robot in a work space containing a workpiece to be acted on by the robot), training the robot by moving it through a series of configurations with respect to the workpiece, and causing those configurations to be stored in memory. The stored configurations are then used to generate a robot program. During "playback", the program regenerates the configurations which are continuously repeated on a succession of workpieces placed in the robot's work space.

A typical off-line programming technique involves generating the robot program using a CAD (computer-aided design) or CAD/CAM (computer-aided design/computer-aided manufacturing) system. The robot programs are composed of commanded actions (e.g., REACH, GRASP, PALLETIZE), configurations where the actions are to occur (e.g., position $x_1$, $y_1$, $z_1$, orientation $\alpha_1$, $\beta_1$, $\gamma_1$; position $x_2$, $y_2$, $z_2$, orientation $\alpha_2$, $\beta_2$, $\gamma_2$; etc . . . , ) and sensory queries that are used for branching and program control. In this method, a CAD data file stores data about the dimensions and positions of workpieces. The movement and configurations of the robot are coordinated with the CAD data. For example, CAM involves creating tool-path programs and is used to create parts and components on computerized numerically controlled (CNC) equipment. The specific data generated by the CAD system can be directly utilized in a CAM setup. There is sufficient information in a solid model drawing to automatically or semi-automatically create tool-path files.

On-line and off-line programming methods can also be employed together. For example, an on-line method could be used to create all or part of the initial robot program and an off-line method can be used to complete and/or edit the program.

Graphical interfaces have been developed to assist an operator or user in performing off-line programming. Typically, such interfaces employ a screen which depicts either the workpiece, images of the robot, or both. Those interfaces are deficient in many ways. For example, although the robot and the workpiece may both appear on the screen, the configuration of the robot's end-effector (typically a gripper) is not changeable by simple user interaction. Furthermore, the trajectories between configurations are either not shown on the screen and/or cannot be generated by simple user commands employing the CAD environment.

Current approaches to programming robots can be classified into two major categories:

1. Robot oriented programming
2. Object oriented (task level programming)

In robot oriented programming languages, an assembly task is explicitly described as a sequence of robot motions. The robot is guided and controlled by the robot program throughout the entire task.

Task level languages describe the assembly task as a sequence of positional goals of the objects rather than the motion of the robot needed to achieve these goals. No explicit robot motion is specified.

In sum, off-line and on-line programming of robots typically requires knowledge of a specialized robot programming language even when working in a CAD environment. Thus, in the prior art, the powerful and easy to use CAD environment has not been fully employed to lessen the complexity and time required for off-line programming of a robot. Furthermore, neither the on-line nor off-line programming technique has, heretofore, provided a way to simultaneously visualize plural robot configurations, to visualize together both robot configurations and trajectories by employing a graphical interface in a CAD environment, to graphically visualize different end effector states, or to associate programming code with one such state. The present invention solves those deficiencies.

SUMMARY

The invention comprises apparatus and methods for graphically creating and visualizing robot positions, orientations and trajectories in space and for controlling and moving robots in accordance with graphical information. A three dimensional graphical environment is provided for visualizing objects in space. Graphical image data representing the end-effector of a robot is stored in a file. The operator or user inputs data representing the position and orientation of the end-effector at one or more positions in the three dimensional space wherein a specified position and orientation defines a configuration. A graphical image representation of the end-effector is displayed in the graphical environment at the specified position and orientation.

In another embodiment of the invention, a 10 plurality of configurations can be specified and displayed on the same graphical display along with trajectories between configurations.

In yet another embodiment of the invention, robot movement and control data can be generated from the information input into the graphical display In yet another embodiment of the invention, the state of the end effector is specified at each configuration and the end effector is graphically displayed in its specified state.

In yet another embodiment of the invention, an end effector state associated with a Criptic node can be specified. A set of data instructions and/or commands are associated with each Criptic node so that when the end effector reaches such a node, the data instructions and/or commands are performed at the configuration associated with that node.

DESCRIPTION OF THE DRAWINGS

For the purpose of illustrating the invention, there is shown in the drawings a form which is presently preferred; it being understood, however, that this invention is not limited to the precise arrangements and instrumentalities shown.

FIGS. 4(a), 4(b) and 4(c) show three types of icons which represent different types of nodes employed in the invention.

DESCRIPTION OF THE INVENTION

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

Figure 1:
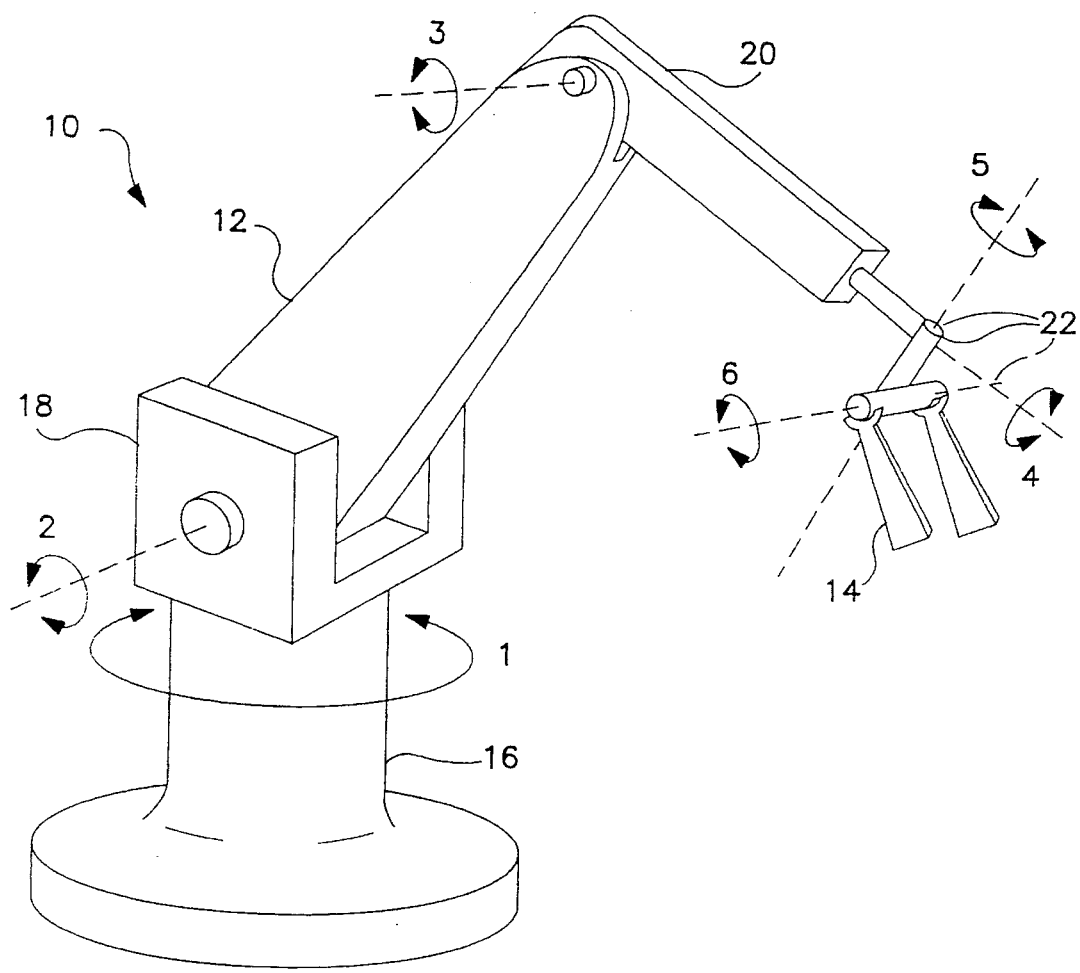
FIG. 1 is a prior art perspective view of a six-degree-of-freedom robot arm with rotational joints.
Figure 2:
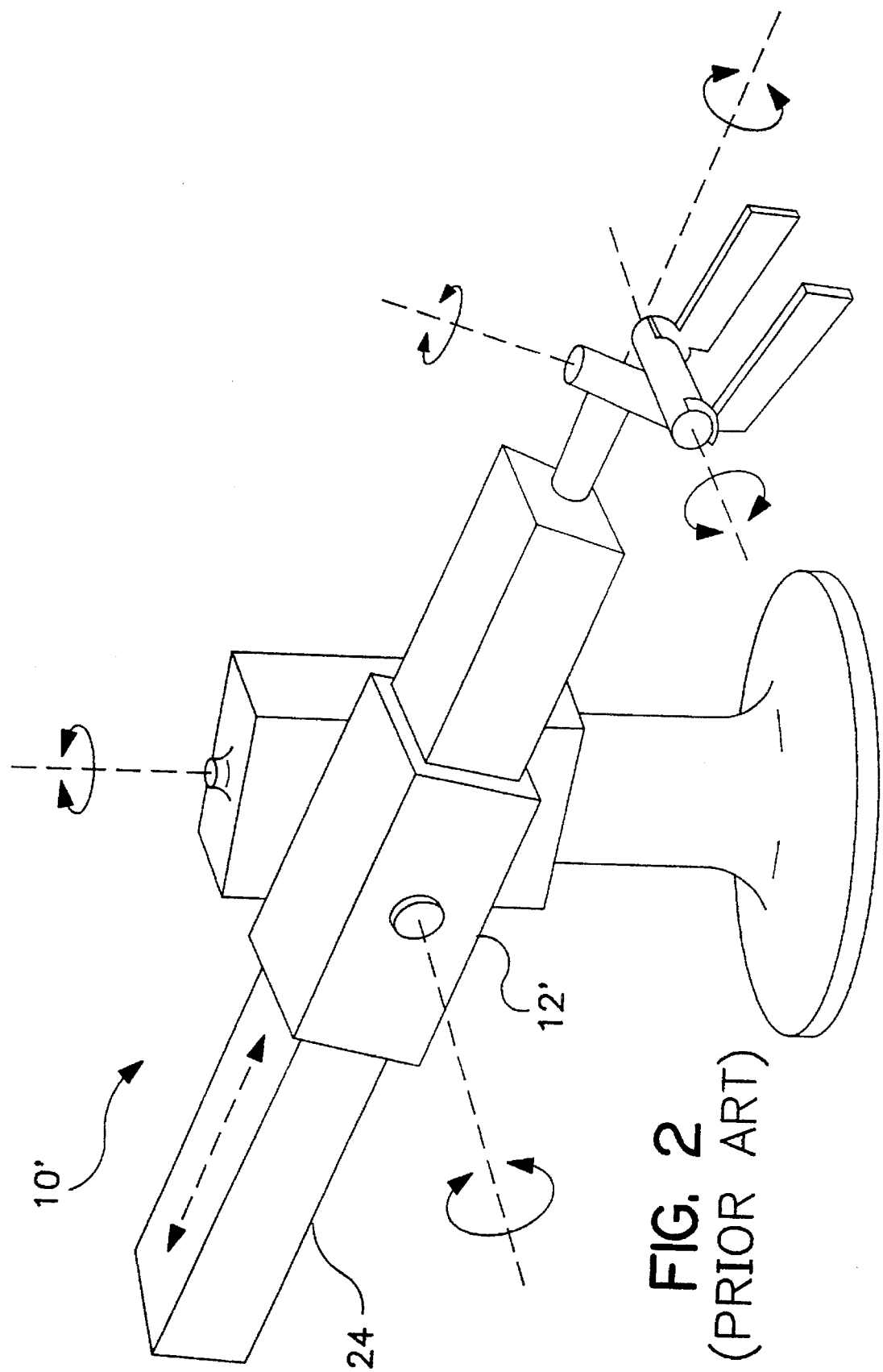
FIG. 2 is a prior art perspective view of a six-degree-of-freedom robot arm with one sliding joint.
Figure 3:
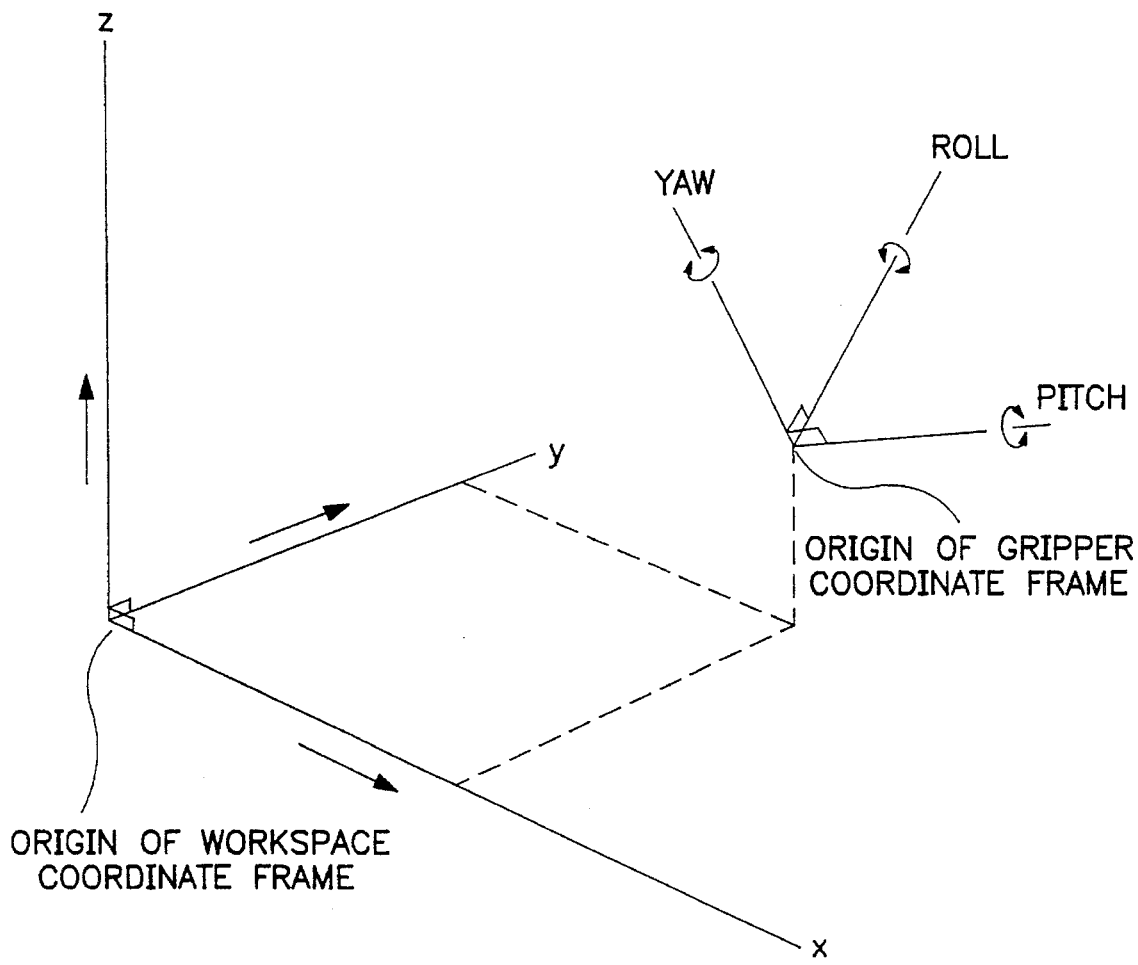
FIG. 3 is prior art depiction of the coordinate relations for a six-degree-of-freedom robot.

Referring now to the drawings, wherein like numerals indicate like elements, there is shown in FIGS. 1 and 2 selected components of prior art robots 10 and 10' which can be programmed according to the present invention. The robot 10 is a typical industrial robot manipulator having an arm 12 capable of six degrees of freedom of movement (exclusive of gripper closure or end effector 14). The six degrees of freedom are required to enable the gripper 14 to approach an object from any orientation. This is usually accomplished with three arm joints, waist 16 (associated with the first degree of freedom), shoulder 18 (associated with the second degree of freedom) and elbow 20 (associated with the third degree of freedom), which can position the wrist at any x,y,z coordinate in a working volume. The three-axis wrist joints 22 (associated with the fourth, fifth and sixth degrees of freedom) can then orient the gripper 14 attached to it by three independent motions (roll $\alpha$, pitch $\beta$, yaw $\gamma$) around the x,y,z location of the wrist, as also understood with respect to prior art FIG. 3. The roll, pitch and yaw of an end-effector can also be seen in FIG. 11 of U.S. Pat. No. 4,763,276, which is incorporated herein by reference. In effect, the wrist represents the origin of a three-axis coordinate system fixed to the gripper 14. Moving the first three joints of the arm translates this origin to any point in a three-axis coordinate system fixed to the working volume, whereas motion of the final three joints (in the wrist) orients the gripper coordinate system in rotation about an origin at the wrist point. For clarity, the robots in prior art FIGS. 1 and 2 have wrist-joint axes which do not all intersect at a single point.

Prior art FIGS. 1 and 2 illustrate different types of joints. The robot 10 in FIG. 1 illustrates an arm 12 with rotational (i.e., revolute) joints numbered 1 to 6. The robot 10' in FIG. 2 illustrates an arm 12' with one sliding (i.e., prismatic) joint 24. Robots are typically constructed of combinations of such joints.

The entire purpose of the arm is to position the gripper or end-effector 10 at a particular configuration so that it can perform some useful function at the configuration. As discussed above, a configuration is defined by a position x,y,z and an orientation $\alpha$, $\beta$, $\gamma$. That is, the position is defined by the location in space of the gripper (usually determined by the location in space of the wrist), whereas the orientation is defined by the rotation about an origin of the wrist point defined at the given location in space.

The mathematics of robot motion (kinematics) is well-known and thus will not be repeated herein. Descriptions of such can be found in U.S. Pat. No. 4,763,276, incorporated by reference above, or in textbooks such as Paul, R. P. Robot Manipulators: *Mathematics, Programming and Control*, MIT Press, Cambridge, Mass., 1981, or Fu, K. S. et al., *Robotics: Control, Sensing, Vision, and Intelligence*, McGraw-Hill, Inc., New York, 1987. In sum, the kinematics allow one to convert the value of the joint variable for each of the six joints in the robot into the configuration of the end-effector, and vice versa. Thus, it is the kinematic equations which allow the robot program to convert configuration data (i.e., x,y,z and $\alpha,\beta,\gamma$ values) of the end-effector entered by the operator during off-line programming into actual robot arm configurations, and which allows a robot end-effector to be placed in a given configuration during an on-line teaching session and have the robot's joint position transducers converted into configuration data (i.e., x,y,z and $\alpha,\beta,\gamma$ values).

As described above, it is known in the art for an operator to interact with a CAD system to aid in certain aspects of programming a robot. A CAD system can be used to create and/or display a wire-frame model, solid model or surface model (essentially a wire-frame model with surfaces hanging on the wire frame) of a workpiece. Certain aspects of the robot's operation can be visualized with respect to the workpiece. For example, the system in U.S. Pat. No. 4,998,050 creates a composite picture of an entire robot in its work environment.

A CAD data base is associated with the images displayed on a CAD screen. Standard data formats are employed to ensure that CAD or CAD/CAM information created on one system can be readily usable by another system. Standard data formats include IGES (Initial Graphics Exchange Specification), DXF (Data Transfer Format) and DWG, among others. The DXF data format is widely used in small-scale commercial CAD products such as AUTOCAD, a product of AutoDesk Corp.

One embodiment of the invention will now be described. That embodiment functions within a three-dimensional version of AUTOCAD. However, in view of the interchangeability of data in CAD-type programs, it should be understood that the invention is not limited to operating only within AUTOCAD or similar CAD programs, but will be applicable to any CAD system.

The Appendix includes the programming code for carrying out the AUTOCAD-compatible embodiment of the invention. Such an embodiment allows the user to interact with display screens and commands familiar to a CAD operator. However, when the operator selects a "ROBOT" option from AUTOCAD's enhanced pull-down menu, the operator will then invoke the programming code in the Appendix and will be able to perform all of the robot-related functions described below. AUTOCAD's "Command:" line is employed for initiating data entry.

Figure 12:
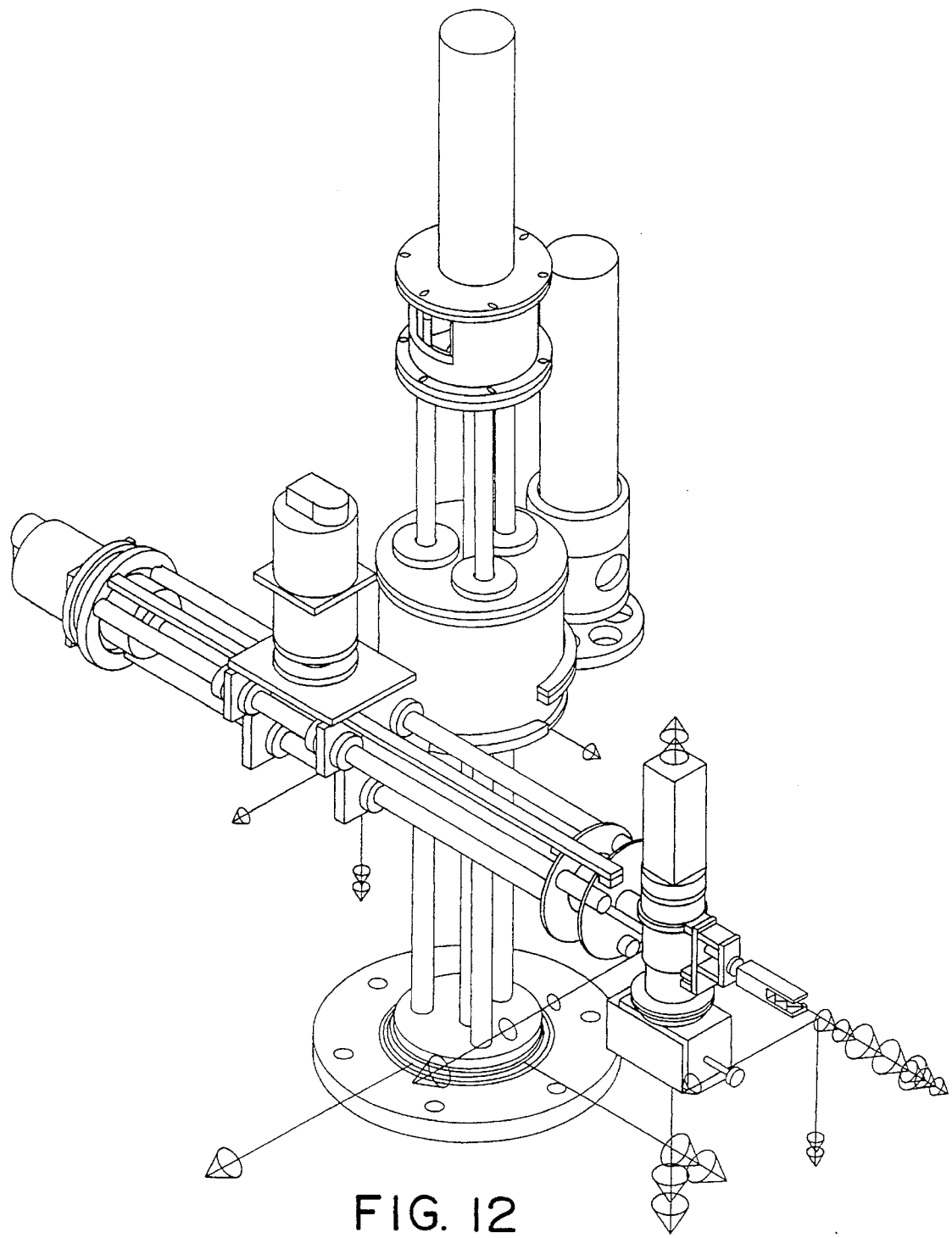
FIG. 12 shows one example of a robot suitable for interfacing with the graphical interface of the invention.

The program in the Appendix was written to interface with a robot having a unique robot arm formed from tube-shaped structural members. The robot arm of that robot is shown in FIG. 12. The statements in the program to a "tube-rob", "tuberob" or "TR- . . . " refer to the robot arm of that unique robot. However, the program and graphical interface can be applied universally to any robot with six degrees of freedom and an end-effector.

The invention creates data structures called "nodes" within a CAD environment. The nodes contain the six generalized coordinates needed to specify the configuration (position and orientation) of an object in space. The nodes in the invention represent the configuration of the end-effector in space. Trajectories are specified by connecting two nodes. Thus, in operation, the robot moves its end-effector from node to node in accordance with the programmed configurations of the nodes (e.g. node 1 to node 2 along trajectory A, node 2 to node 3 along trajectory B, and so on). The nodes and the trajectories between the nodes can be created, edited and visualized on a display screen.

If the robot's end-effector is required to perform an action or series of commands at a given configuration or if other functions are to be performed in the robotics environment while the end-effector is at a given configuration, the programming code for executing the action, commands or function is embedded in a special type of node called a "Criptic node". Each Criptic node thus has programming code associated therewith. The word "Criptic" is a word coined by the inventor to reflect the hidden or cryptic nature of the associated programming code. That is, the programming code, itself, is not visible when viewing the node on a display screen. A special programming language called "Criptic language" created by the inventor is employed for this function. The Criptic language consists of commands in C-language. Criptic nodes, by employing Criptic language, are used to build intelligence into the robot arm for a specific application.

The nodes are represented by on the display screen as icons. As is well-known in the art, icons are used in user interfaces to pictorially represent a desired command. For example, an icon of a file drawer would be selected to cause a computer to file certain information or a garbage can would be selected to cause the computer to delete certain information. In the invention, however, the icon performs a semiotic function by representing the end-effector (gripper) of the robot arm and its state. The icon has a three-dimensional appearance to represent the physical appearance of an end-effector. The nodes appear directly in the CAD environment wherever the end-effector is desired to be placed. In an off-line programming method, the operator enters a configuration and the node appears at the x,y,z position associated with the configuration. Since the nodes are represented by a three-dimensional icon, the orientation of the end-effector is also visible. In the off-line method, the orientation is also entered by the operator. In an on-line programming method, the robot arm is moved to a desired position and the end-effector is oriented in a desired orientation. By employing the robot's joint position transducers and kinematics equations discussed above, the program creates a node on the screen associated with the taught configuration. The result of either method is that the operator can visually represent the end-effector in space.

Additional features of the invention include, among others:

(a) the ability to connect nodes in order to create and view trajectories between the nodes;

(b) the ability to place workpieces and/or other objects on the screen or relate objects to them so that the relationship between the end-effector, its trajectories, and the workpieces and/or objects can be visualized;

(c) the ability to specify that particular actions or commands are to be performed at a given configuration (i.e., the so-called "Criptic node").

FIGS. 4(a), 4(b) and 4(c) show three types of icons which represent different types of nodes employed in the invention. The insertion point shown in FIG. 4(a) is user defined and represents the origin of motion coordinate system (MCS) icon 24. As is well known in the art, the MCS is a temporary coordinate system. The MCS icon 24 shows the orientation of the MCS's X, Y and Z axes. The icon 24 appears on the screen to help the operator enter correct motion commands. The icon 24 always has a single arrow on the X axis, a double arrow on the Y axis and a triple arrow on the Z axis.

FIG. 4(a) shows an "open gripper node icon" which represents an end-effector that is open at the entered configuration.

FIG. 4(b) shows a "closed gripper node icon" which represents an end-effector that is closed at the entered configuration.

FIG. 4(c) shows a "Criptic node icon" which represents an end-effector that has Criptic language associated with it at the entered configuration. When a Criptic node is created, the end-effector is positioned and oriented in accordance with entered data and then Criptic language code associated with that node is created and stored. When the node is encountered during operation of the robot, the Criptic language code is accessed and executed. In contrast, when an open gripper or closed gripper node icon is encountered, no such Criptic language is executed. The end-effector merely moves to the configuration of the node and either opens or closes. Although the Criptic node icon in FIG. 4(c) appears to be identical to an open gripper node icon in FIG. 4(a), the CAD system associates different colors with each icon. Thus, the user can readily distinguish between a Criptic node icon and an open gripper icon even though the appearance is similar. It is also possible to employ icons having a unique appearance for each type of node.

The physical motion of opening or closing the end-effector, or executing Criptic language occurs after the end-effector has reached the desired configuration.

It should be understood that the use of other types of node icons are within the scope of the invention. For example, if it is desired to have the end-effector slowly squeeze a workpiece (instead of opening or closing on it) or spin about its axis, a different icon could be created. In the limited embodiment having only the three types of nodes shown in FIGS. 4(a)–4(c), other types of end-effector operations would be performed by creating a Criptic node and embedding the operations (e.g., squeezing or spinning) in the Criptic language. Furthermore, other types of end-effectors exist which have states other than "open" or "closed" The invention can be employed with any type of end-effector wherein each end-effector state would be represented by a different type of node.

Figure 5A:
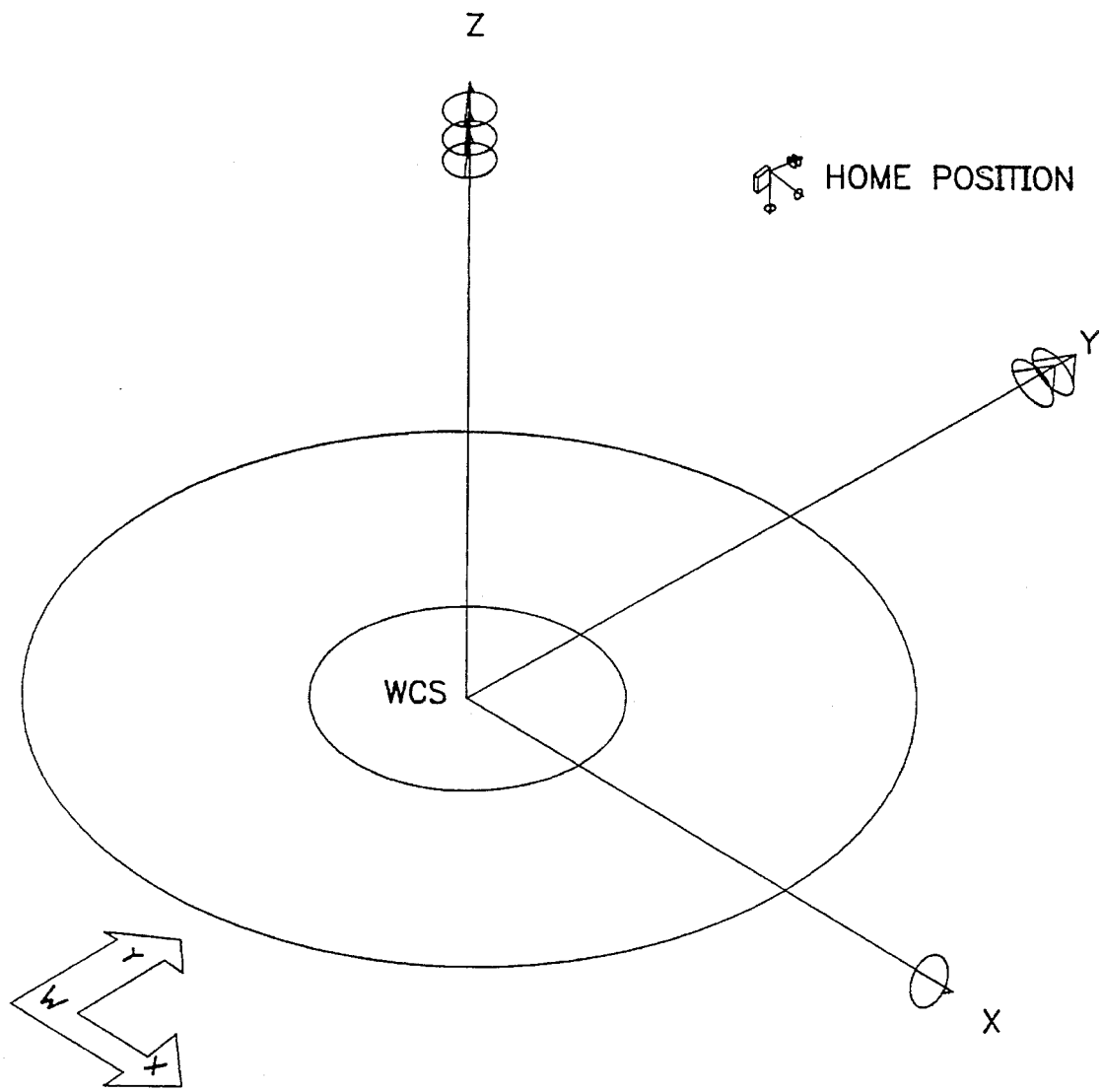
FIGS. 5 (a) and 5 (b) shows screen displays in a CAD environment before and after CAD data is entered, respectively, but before robot-related information is entered.
Figure 5B:
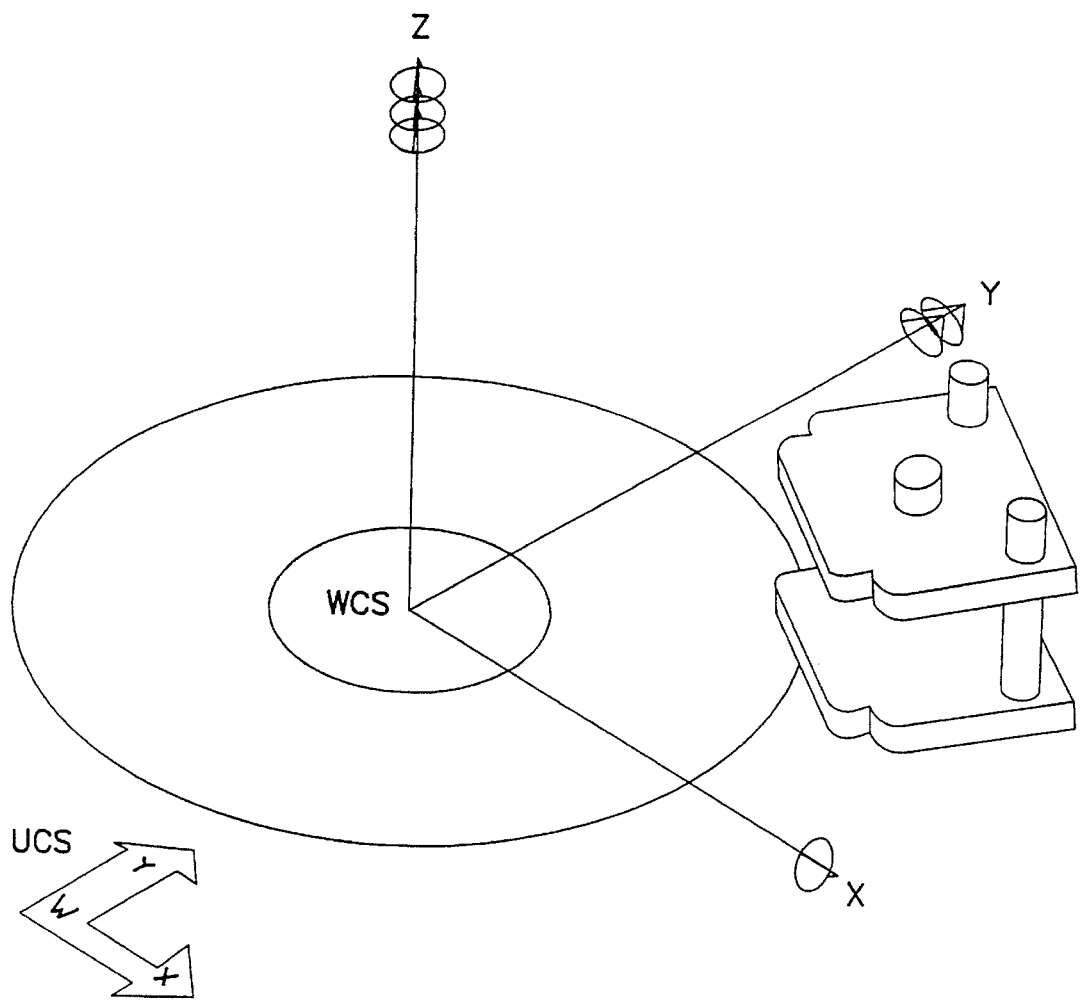

The Criptic node is ideally suitable for processing sensory queries. For example, if it is desired to have the end-effector move to the next node only if a sensor indicates a preselected condition, the operator can define the node as a Criptic node and associate Criptic programming language with the node. The programming language instructs the robot not to move the end-effector until the sensor detects the preselected condition. Examples of other operations which can be associated with a Criptic node are:

(a) branching (b) waiting for a signal from another robot (c) linking to a conveyor belt (d) generating data or graphs (e) performing logic (f) adaptive control FIG. 5 (a) shows the screen in an AUTOCAD environment before any information is entered and FIG. 5(b) shows the screen after normal CAD data is entered, but before robot-related node information is entered.

In FIG. 5(a), the operator sees axis lines x,y,z and reference circle lines in the x-y axis plane associated with the world coordinate system (WCS). In FIG. 5(a), the axes of the MCS icon is set to the UCS. The "W" in the User Coordinate System (UCS) icon in the lower left hand corner of FIG. 5 (a) indicates that the operator has selected the UCS to be equal to the WCS. The UCS will be further explained below.

If the operator has not selected the "ROBOT" option from AUTOCAD's enhanced pull-down menu, the screen functions as a normal CAD system wherein three-dimensional objects can be created or retrieved from a data file. For example, workpieces or objects associated with the robot's work environment can be placed on the screen. FIG. 5(b) shows one such workpiece in the form of a solid model of a die set. A die set is shown as an example of an object that is often used in a robot-controlled environment. The robot can position metal parts into the die set and remove them from the die set after they are manipulated therein.

Once the operator selects the "ROBOT" option or mode, the screen then allows robot-related information to be created, independent of objects placed on the screen in the normal CAD mode. However, the CAD-related workpieces or objects can be employed to designate reference points or the like. For example, if it is desired to move the robot's end-effector to a particular point on the CAD-related workpiece, the operator moves the cursor to that point and captures the appropriate data to create a node at that point.

Figure 6A:
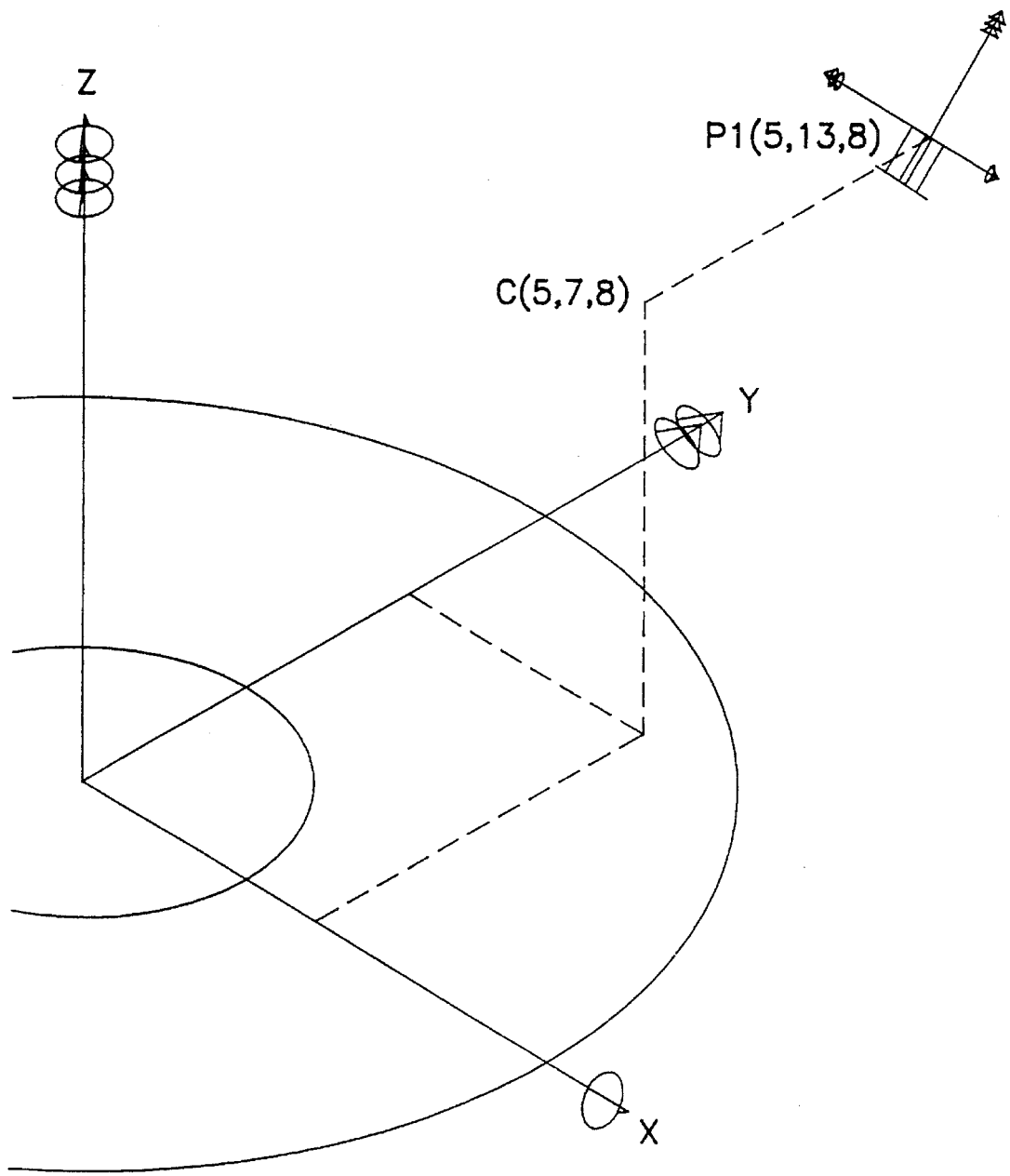
FIGS. 6(a) through 6(c) show the screen display of a CAD environment during successive entry of robot control data in accordance with the invention.
Figure 6B:
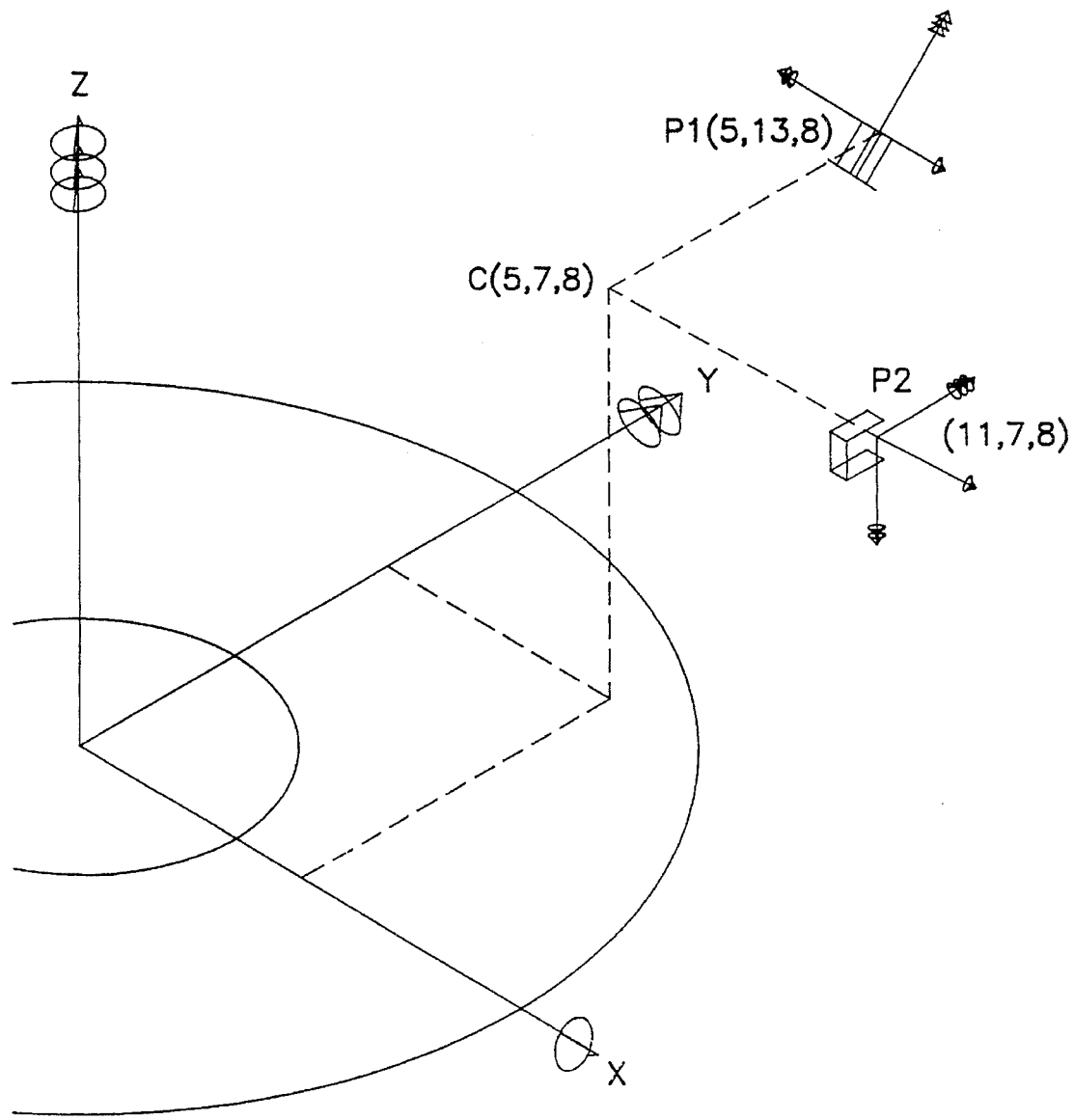
Figure 6C:
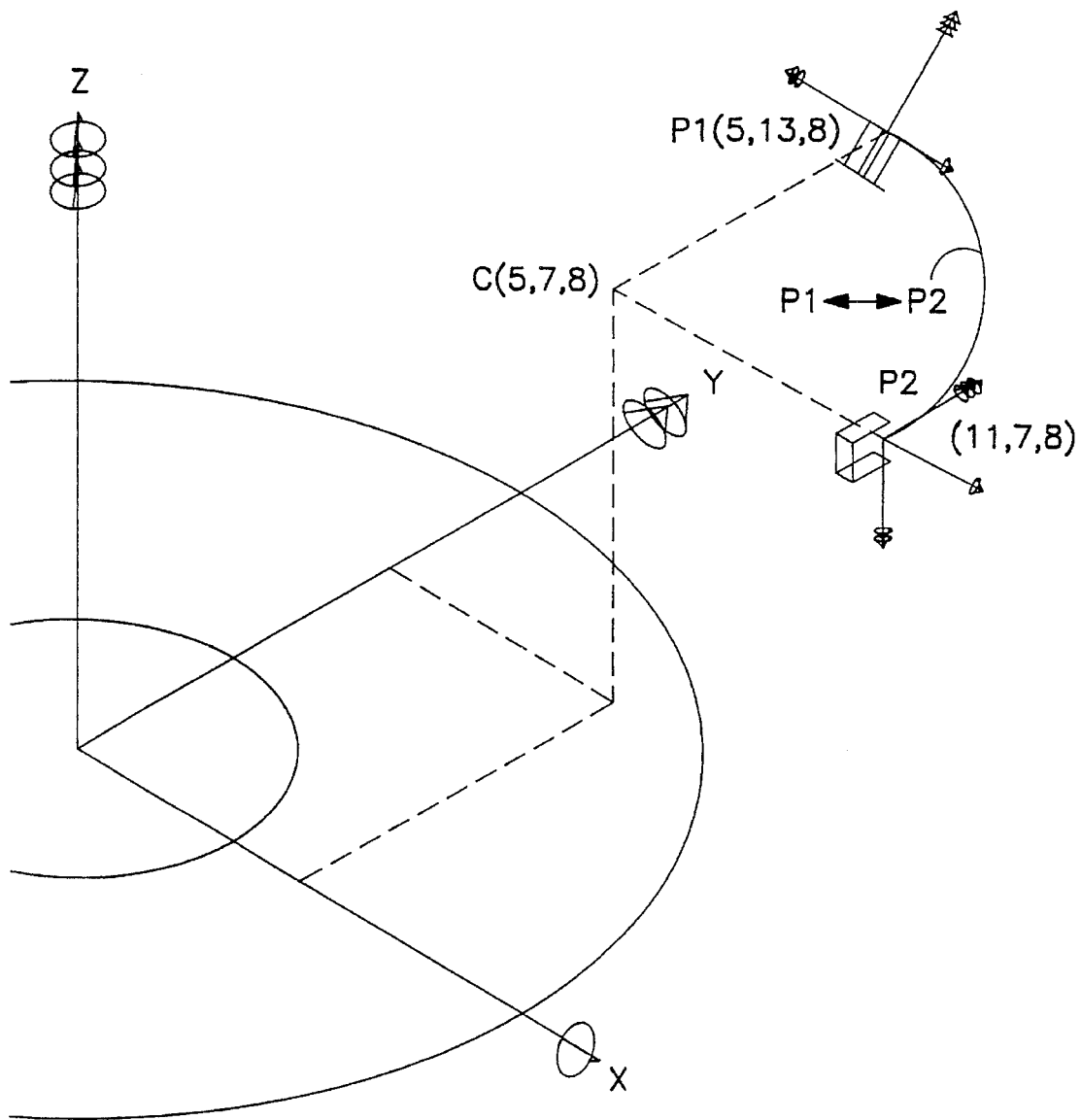

FIGS. 6(a) through 6(c) show the screen of an AUTOCAD environment for creating a robot control program using an off-line programming method. The workpiece(s) can optionally appear on the screen if the operator wishes to use them as a guide for selecting nodes. For clarity of illustration, no workpieces appear in these figures. As discussed above, the programming process consists of generating nodes, trajectories between nodes, and Criptic language code when a Criptic node is specified.

After selecting the "ROBOT" option from the pull-down menu, the operator is ready to enter the first node and the following steps are performed:

(1) At the "Command" lines, the operator specifies the User Coordinate System (UCS). As is well-known in the art, the UCS is defined by the user and can be oriented anywhere in relation to the WCS. By selecting "UCS", the CAD system will interpret all configuration data according to the WCS.

(2) The operator is then prompted to select whether the node will be of a "node" type (i.e., open or closed) or of a "Criptic" type. Although a Criptic node is also a "node", the system must distinguish between types of nodes which will have Criptic language associated therewith and types of nodes which do not have such language associated therewith. If a "node" type is specified, the operator will be prompted to indicate whether it is to be "open" or "closed" (i.e., whether the end-effector is to be open or closed at the node). If "Criptic" type is specified, the screen will switch to a text editor, as described in step (5) below.

(3) Regardless of which type of node is to be generated, the operator will be prompted to enter the orientation of the node. The operator enters the appropriate axis or axes and the degree of rotation about the axis or axes. This step is similar to the procedure for orienting three-dimensional CAD-generated objects (e.g., "rotating" in AUTOCAD) However, this orientation represents the orientation of the robot's end-effector in space and will be used to orient the icon on the screen, as opposed to a CAD-generated object.

(4) The operator is then prompted to enter the position (coordinates) of the node in the WCS.

(5) If a Criptic node is selected, the operator will perform one additional step of entering Criptic language code into a text editor which appears on the screen. Although any text editor can be linked to the Criptic node, the program disclosed herein employs its own editor (the so-called "TR-editor") for simplicity.

(6) When it is desired to create trajectories between two nodes, the operator selects a first node, selects a trajectory, and then selects the second node. It should thus be understood that the normal CAD capabilities of connecting points in space with lines, arcs, or the like, can be employed for generating trajectories between nodes.

FIG. 6(a) shows the screen after the following set of information for an closed gripper node P1 at position (5,13,8) and a first orientation has been input into the CAD system using the steps above. The screen displays a closed gripper node icon at the entered configuration. (The labelled points, their coordinates and the dotted lines associated with them have been added for clarity. They do not appear in the actual environment.)

FIG. 6(b) shows the screen after a second node P2, an open gripper node, has been input into the CAD system. The second node has node position (11,7,8) and a second orientation. The screen now displays icons representing both nodes in the graphical environment. If node P2 was a Criptic node, the operator would have been prompted to enter Criptic language code (comprising one or more commands) into a text editor, as further described below. After the code is entered, the Criptic node would appear on the screen in the same manner as other types of nodes. As noted above, it will be distinguished from the open gripper node icon by having a different color.

FIG. 6(c) shows the screen after an arc-shaped trajectory P1-P2 has been generated between nodes P1 and P2.

As described above, an on-line programming method can also be employed to generate one or more of the configurations. Thus, it should be understood that steps (3) and (4) above can be performed by moving the robot's end-effector to a desired configuration in space and determining the configuration from the robot's joint position transducers. Alternatively, other off-line programming methods can be employed for obtaining the data in step (4). For example, CAD data can generate lines, wire-frame models, or solid models and the operator, in the ROBOT mode, can then designate points on the line or points on the models to become node positions. One suitable method of generating solid models is to employ AUTOCAD's Advanced Modeling Extension (AME) solid modeler.

Once the nodes, trajectories and Criptic language has been generated, the operator selects a command to compile a robot control program. After the program is successfully compiled, a GO command invokes the robot to execute the desired movements. Of course, it should be recognized it is the program in the Appendix, in conjunction with some code in AUTOCAD, which allows for the compiling and execution of the robot control program from the data graphically shown on the screen.

The status or state of the end-effector (i.e., open, closed, Criptic) at each node is monitored by keeping a record of the name of the block (i.e., each icon is saved as a block) inserted by AUTOCAD into the graphics file. The status is defined as:
1=OPEN
2=CLOSED
3=CRIPTIC The status of the end-effector at every node is saved in a "GRIP matrix". The GRIP matrix consists of the position of the node in units of "COUNTS" and the status at each position. COUNTS is a unit of measure for keeping track of the data written to a file read by the robot software in the attached Appendix. The number of filled rows of the matrix indicates how many changes of status (e.g., OPEN to CLOSED, CLOSED to CRIPTIC) will occur in a certain path. Before the GRIP matrix is stored, it is rearranged so as to delete rows containing a status that is the same as the status in an immediately consecutive row. That is, if the status doesn't change, the row is eliminated. An example of this rearrangement feature is the following:

|  | Location (in units of count) | Status at location |
|---|---|---|
| GRIP matrix before rearrangement | | |
| Row 1 | 10000 | OPEN |
| Row 2 | 10040 | CLOSED |
| Row 3 | 10050 | CLOSED |
| Row 4 | 10060 | CRIPTIC |
| GRIP MATRIX example after rearrangement | | |
| Row 1 | 10000 | OPEN |
| Row 2 | 10040 | CLOSED |
| Row 3 | 10060 | CRIPTIC |

In this example, the third row before rearrangement is redundant because the status of the end-effector has not changed. (It is still closed.) Thus, since it is not necessary to store the status information for that location, that row is deleted before the matrix is stored.

When the CAD system is placed in the robot environment (by selecting "ROBOT" from AUTOCAD's pull-down menu in the disclosed embodiment), the following commands are available to the operator:

OUT: Allows the user to pick nodes and trajectories for a specified motion.
COMPILE: Transforms the graphical language to robotics movement commands. Checks joint limits (position, velocity and acceleration), generates data and C-language files.
GO: Compiles the c-routines and executes the motion of the robot arm.
HOME: Sets the manipulator to its home configuration.
RESET: Sets the encoder counts to zero at that particular configuration.
ECHO: Echoes the motion in a step by step reverse mode.
KMATICS: Sets the velocities and accelerations of each segment.
LEARN: Allows the computer to capture any manual given position.
GEN: Graphically generates the node location and orientation in the graphical environment (on the screen).
EDIT: Allows the editing of a Criptic node.
CRIPTIC: Establishes a Criptic node at the given position with the given UCS orientation.
SENSORO...5 Activates any of the six sensors for zeroing, homing and calibration.
POSITION: Reads the encoder positions at that configuration.
COMMAND: Lists the graphical environment commands.

This overview of commands can be better understood with the following additional explanations of certain commands:

EDIT: This command activates the autolisp function Edit() and is used for editing a Criptic node. In response to the EDIT command, the operator selects a node to edit by entering INS, followed by the desired node. Once a Criptic node is chosen, the name of the file associated with that Criptic node is stored into "d\\l-name.txt". A command from within the autolisp file (e-scrpt.exe) is issued to activate the text editor. The Criptic commands can now be edited.

OUT and COMPILE: To move the robot arm from one node to another, the command OUT is selected by the operator. The operator is prompted to select nodes in an orderly fashion. If the robot arm is to move between node 1 and node 2, node 1 is selected first. After both nodes are selected, the command COMPILE is selected by the operator.

OUT and COMPILE are also used in conjunction to create trajectories between nodes as follows:
(1) The operator selects the command OUT;
(2) The operator selects node 1;
(3) The operator specifies a trajectory ARC;
(4) The operator selects node 2;
(5) The operator selects the command COMPILE.

The trajectories not only cause the robot arm to move from node to node along the trajectory but they also cause the orientation of the robot's end-effector to smoothly re-orient itself as it moves through the trajectory. Thus, for example, if the end-effector is to be oriented around the Y axis by 100 degrees at node 1 and by 200 degrees around the Y axis at node 2, the orientation will be approximately 150 degrees half-way through the trajectory. By the time that the end-effector reaches node 2, it will be properly oriented by 200 degrees around the Y axis. The extrapolation process for setting the orientation throughout the trajectory is performed within the program.

GO: This command is used to invoke an execution mode. After the GO command is selected, a series of compilations, bindings and linkings are performed. The operator has no control over the execution of these processes.

LEARN and GEN: In the learning mode, the user may teach the six generalized coordinates in the environment. To get into the learning mode, turn on the power to each individual robot axis motor and type "LEARN" at the command line. Once the learning mode is turned on, the manipulator is able to learn positions by simply leading the arm and memorizing configurations. To memorize (record) a configuration, the <F1> button is depressed. The <ESC> button terminates a learning session. When returning to the programming mode, a "GEN" (short for GENERATE) command can be issued. That will perform the automatic graphic generation of nodes on the screen. The following steps further explain the mechanics of LEARN and GEN.

1. When depressing function key <F1>, the six generalized coordinates are stored in units of encoder counts into the text file "D:\learn.txt" in the format of (a b c d e f). A space separates each joint coordinate.

2. The TRUE-BASIC file "Drct_lrn.tru" then accesses the file "leran.txt", converts the text to numbers, then converts the encoder counts into joint angles and displacements.

3. The direct kinematics is then calculated for each node. It should be noted that the direct kinematics will be specific to the individual robot.

4. To display the correct position and orientation of each node, the UCS has to be changed accordingly without the involvement of the programmer. This was achieved automatically by means of programming using autolisp.

The Criptic node is an important feature of the invention. The Criptic language associated with each Criptic node includes one or more Criptic commands. It should be noted that Criptic language commands cannot be used directly at the command line of AUTOCAD. However, the robot commands described above can be used inside the Criptic nodes to create Criptic language.

The Criptic language which was created for this invention uses a high level language (C-language). Some Criptic language commands that can be entered into the text editor when a Criptic node is specified are as follows:

init_io: set I/O configuration
set_io: set an output port value
get_io: get an input or output port value
get_analog get an analogue input value
get_position: get the current actual position
get_command: get the current command position
get_error: get the current position error
set_filter: set the digital filter coefficients
controller_run: set the controller into run mode
controller_idle: set the controller into idle mode
get_filter: get the digital filter coefficients
start_move_all: start trapezoidal velocity motion sequences on multiple axes
wait_for_all: wait for all of the motion sequences to complete
move_all: start the motion sequences and wait for completion
$set_{13}e_{13}stop$: stop motion at the emergency deceleration rate
dsp_status: get controller status
clear_status: reset controller status: careful when used might change the status of a software limit of the arm
in_motion: tests for in motion
in_position: tests for in position
in_sequence: tests for in sequence
axis_done: tests for motion completion The Criptic language code in accordance with the disclosed embodiment was written using Microsoft® QUICK-C version 2.50a. The flow control, operators, data types, preprocessor directives, and pointers can be used in the same manner as when writing a C-program.

The following rules apply to writing the main function:

a. The main body is not given any names (i.e. main() does not appear in the language associated with any of the Criptic nodes. This will allow the TR-driver to issue different names for each main body of different Criptic nodes. "TR-driver" is the main program of the TR-environment and is set forth in the Appendix.

b. The braces ({ }) associated with the main body function should not appear. This will allow the TR-driver to add functions, as well as edit them.

c. All variables (main body or functions) should be considered as local.

d. Pre-defined functions can be used anywhere in the program.

e. When specifying consecutive change-of-status to the end-effector, care should be given to the mechanical time delay. The end-effector might not respond if the commands are close to each other.

f. Referring one node to another (recognizing the position and orientation of a node from within a Criptic node) is possible by first finding the location of the node, then getting the encoder count from the "d:read_c.txt" ASCII text file containing the kinematics information of each segment in the trajectory. This referring allows jumping out of the normal sequence of nodes planned in the program.

g. Once the main body and functions are written, the compiling and linking is performed by the TR-driver. The mechanism for compiling and linking Criptic nodes, C language, TRUE-BASIC and executable files is described below.

Automatic Compiling and Linking

The following steps are performed by the driver program to include Criptic nodes, executables, C-language object-files, and TRUE-BASIC files.

1. Each Criptic node containing the main body is read by the "TR-driver" program and assigned a filename. The filename is generated by obtaining the location of a node (insertion point), extracting the integer, then changing it to a string (e.g. for a node at [1.232,2.34,2.511], the filename associated with it will be "122.txt".)

2. The C-language program is then generated by assigning a function name to the main body code. The assignment is performed according to the order the Criptic node is picked when planning the trajectory.

3. Several necessary files are then added by the driver program. For clarity, some of the file names and their functions are as follows:

inserts.txt—indicates the location of a node in space cripts.txt—provides an ordered list of Criptic node positions function.c—determines when to call Criptic nodes f1.c...fn.c—file reach Criptic node(n=# of such nodes)

capacity.txt—indicates the number of move commands read_c.txt—contains all move commands (i.e., kinematics data indicating the coordinates in terms of encoder counts)

initial.txt—stores initial position before the next sequence of move commands are planned try1.dxf—stores all of the coordinates of the graphical environment (i.e., everything that appears on the screen)

c_link.bat, r_link.bat—linking and compiling files

4. Once the kinematics data is written, the Criptic language is transformed into proper C-language, the end-effector data is produced, the necessary additional files are generated, and a compile statement is generated and saved into a batch file. The batch file can be executed when the command GO is issued. The batch file will have the following format:

COMPILE: (large memory model) (Drive:\\path\\filename )
[Criptic language functions] [C-generated functions]
(LINK: Drive\\path\\Motion libraries executables)
Where
( ): necessary text
[]: optional—depends on Criptic nodes.

One example of Criptic language code is the following. (In this example, an optical sensor has been connected to the designated port 1, bit 0. If the optical light in the sensor is crossed, the sensor will go high.)

```
    int va;
    va = 0;
    init_io (1, 0);
    get_io (1, &va);
    while (va != 1)
        {(printf ("WAITING \n va = %d\n",va);
        get_io (1,&va);printf("va = %d\n",va);}
    printf ("CONTNUING");
```

When the robot program reaches the Criptic node associated with that code, the code will be executed and the sensor will be interrogated. As long as the sensor does not go high (1), the controller will keep waiting for a signal.

The sensor could be a conveyor belt, another manipulator, a computer, or the like. Note, however, that the program is not included in a function definition such as VOID Check_Sensor (int a, float b). The robot compiler generates names of functions and adds the necessary C-code so that this function can be called at the right time.

Figure 7A:
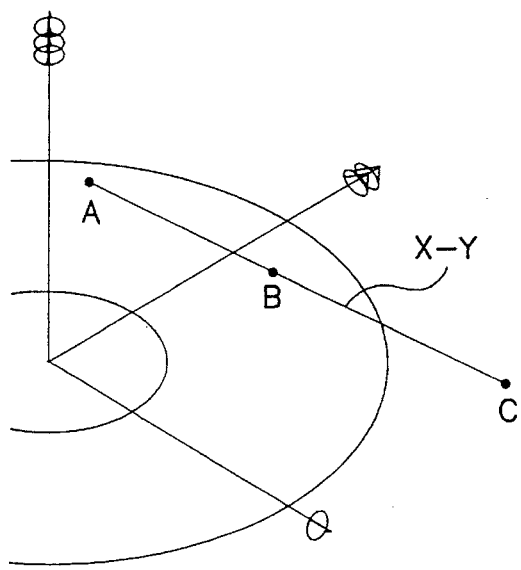
FIGS. 7(a), 7(b) and 7(c) show screen displays which illustrate the technique for selecting nodes using CAD generated information.
Figure 7B:
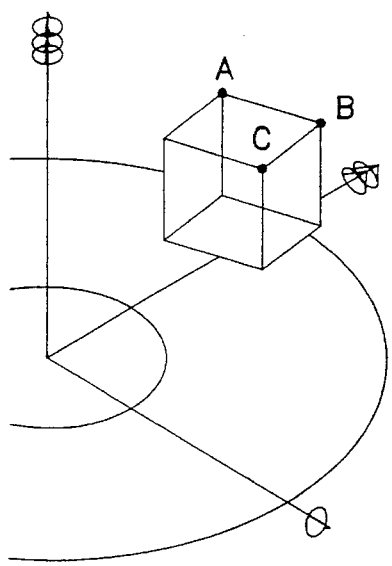
Figure 7C:
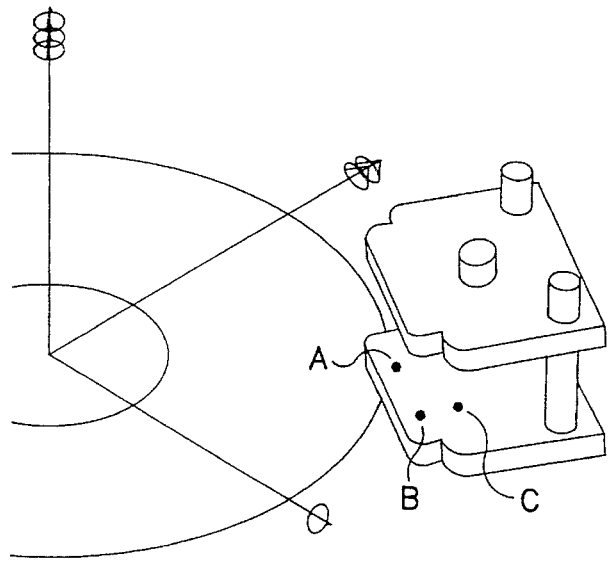

FIGS. 7(a), 7(b) and 7(c) illustrate the techniques described above for selecting nodes using CAD generated information instead of either directly inputting nodes via a keyboard or by an on-line technique of positioning a robot end-effector.

FIG. 7(a) shows three nodes, A, B and C, selected or picked along a CAD drawn line X-Y. Nodes A and C are located at the line's endpoints. Node B is located at the line's midpoint. Of course, the operator must still enter the orientation of each of the nodes.

FIG. 7(b) shows three nodes A, B and C picked on a CAD drawn wire-frame model.

FIG. 7(c) shows three nodes A, B, C picked on a CAD drawn solid model.

Once the nodes in FIGS. 7(a), 7(b) and 7(c) are fully defined (i.e., position, orientation and Criptic language code if necessary), the selected nodes will no longer appear as selected points on the screen but will be shown as node icons. This latter step, however, is not shown in those figures.

Figure 8:
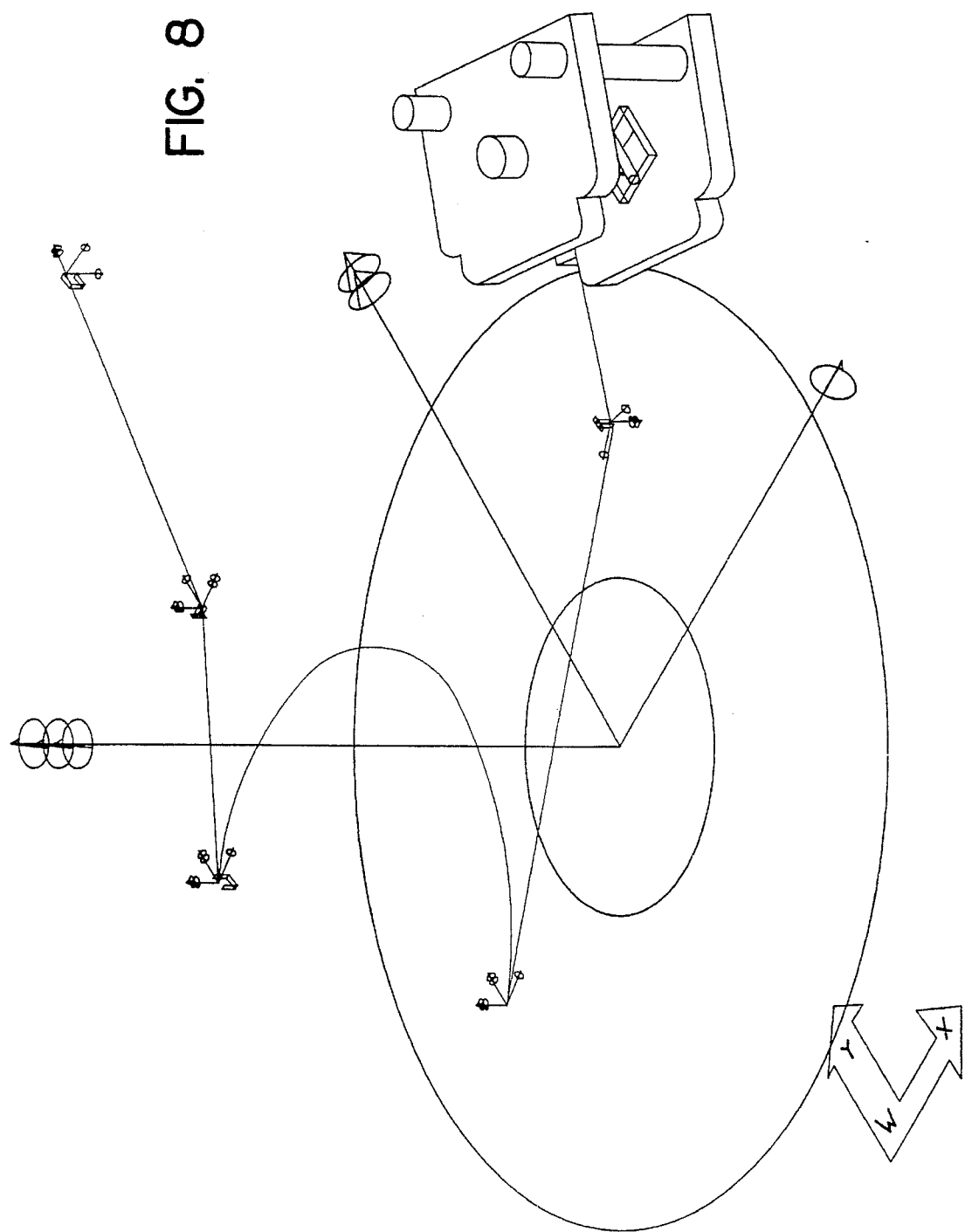
FIG. 8 shows a screen display of a series of nodes connected by trajectories within a work environment.

FIG. 8 shows a series of nodes connected by trajectories within a work environment which includes a workpiece in the form of a die set. A typical robot program will require the robot to move to (a) specified locations on a workpiece, and (b) points in space where it might wait for the next command or interact with a different workpiece. Thus, as shown in FIG. 8, many nodes will not be associated with a location on a workpiece.

Figure 9A:
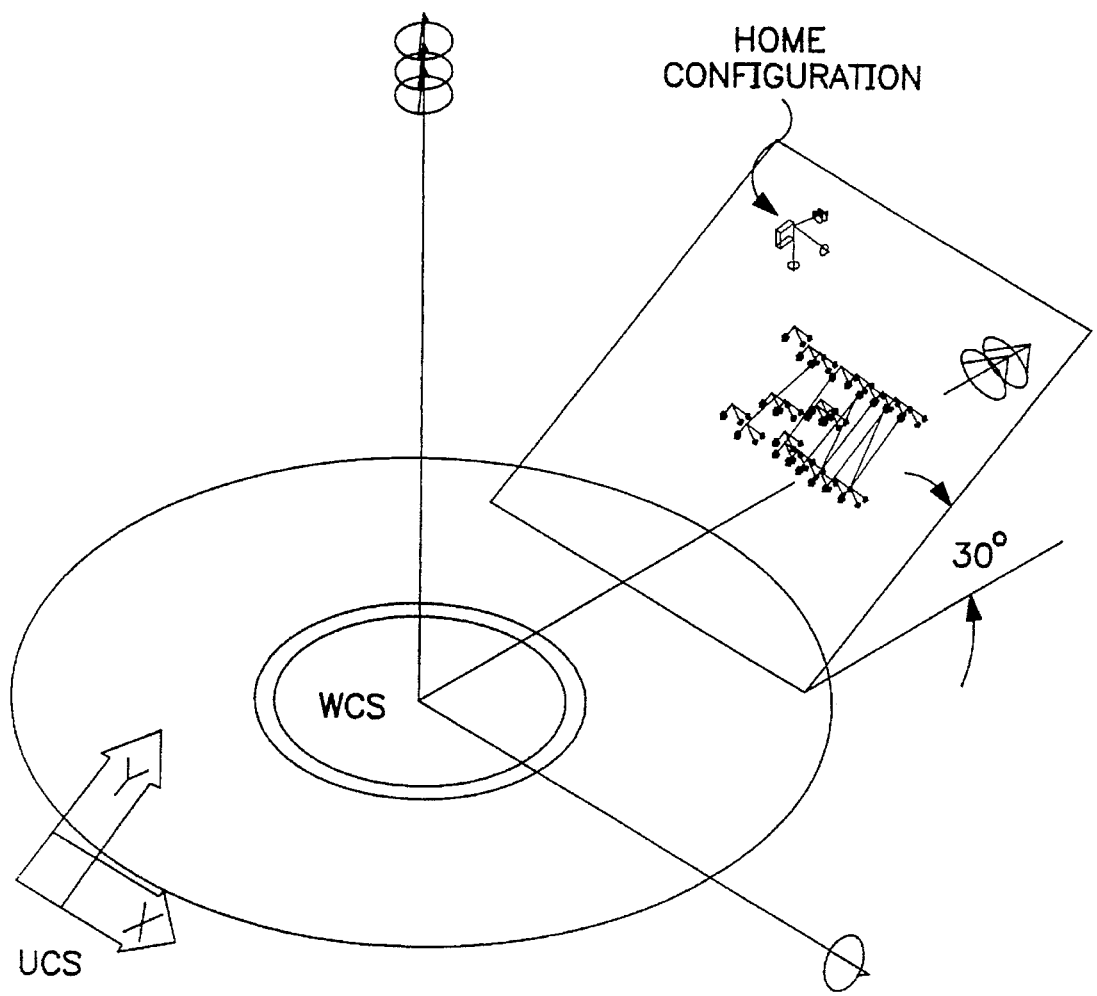
FIG. 9(a) shows a screen display of a program written to execute a specific trajectory.

FIG. 9(a) graphically depicts the results of a program written to execute a specific trajectory. In this trajectory, a pen attached to the end-effector follows a series of lines and arcs to spell out the word "PENN" on a 30 degree inclined plane. The pen attached to the end-effector must remain perpendicular to the plane at all times. Thus, the orientation of end-effector remains constant as the positions change. At various nodes, the pen must lift up from the plane in order to move to the next letter, thereby mimicking the motion of lifting a pen from a piece of paper if the human hand were to manually perform the same task. Of course, the benefit of the invention is that the operator can visually see all of the anticipated movements of the end-effector in three-dimensional space.

Figure 9B:
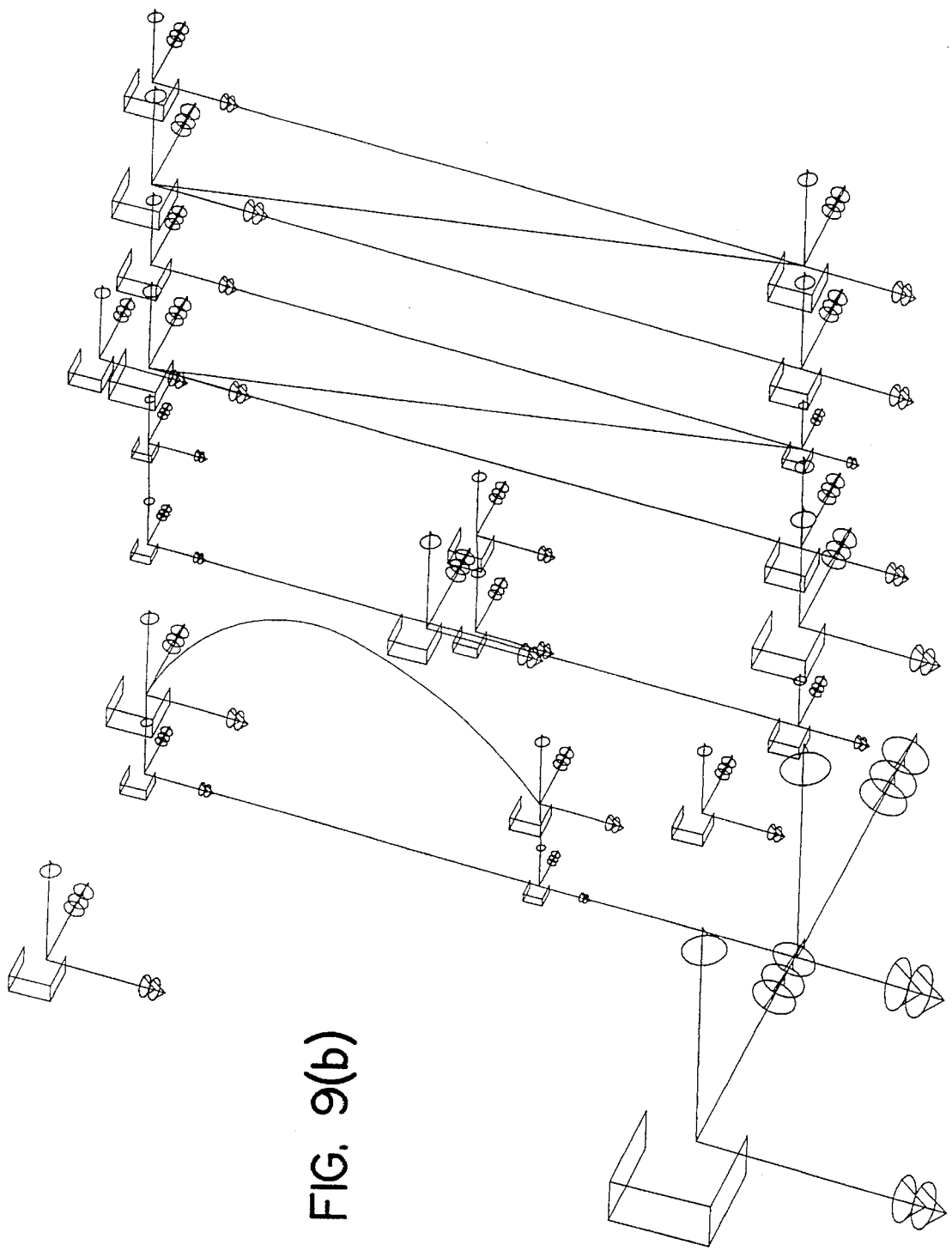
FIG. 9(b) is a magnification of a portion of FIG. 9(a).

FIG. 9(b) shows a magnification of the program. It should be appreciated that many of the tools of the CAD environment, such as the ability to magnify portions of the screen, further facilitates programming and visualization of robot control functions.

Figure 10A:
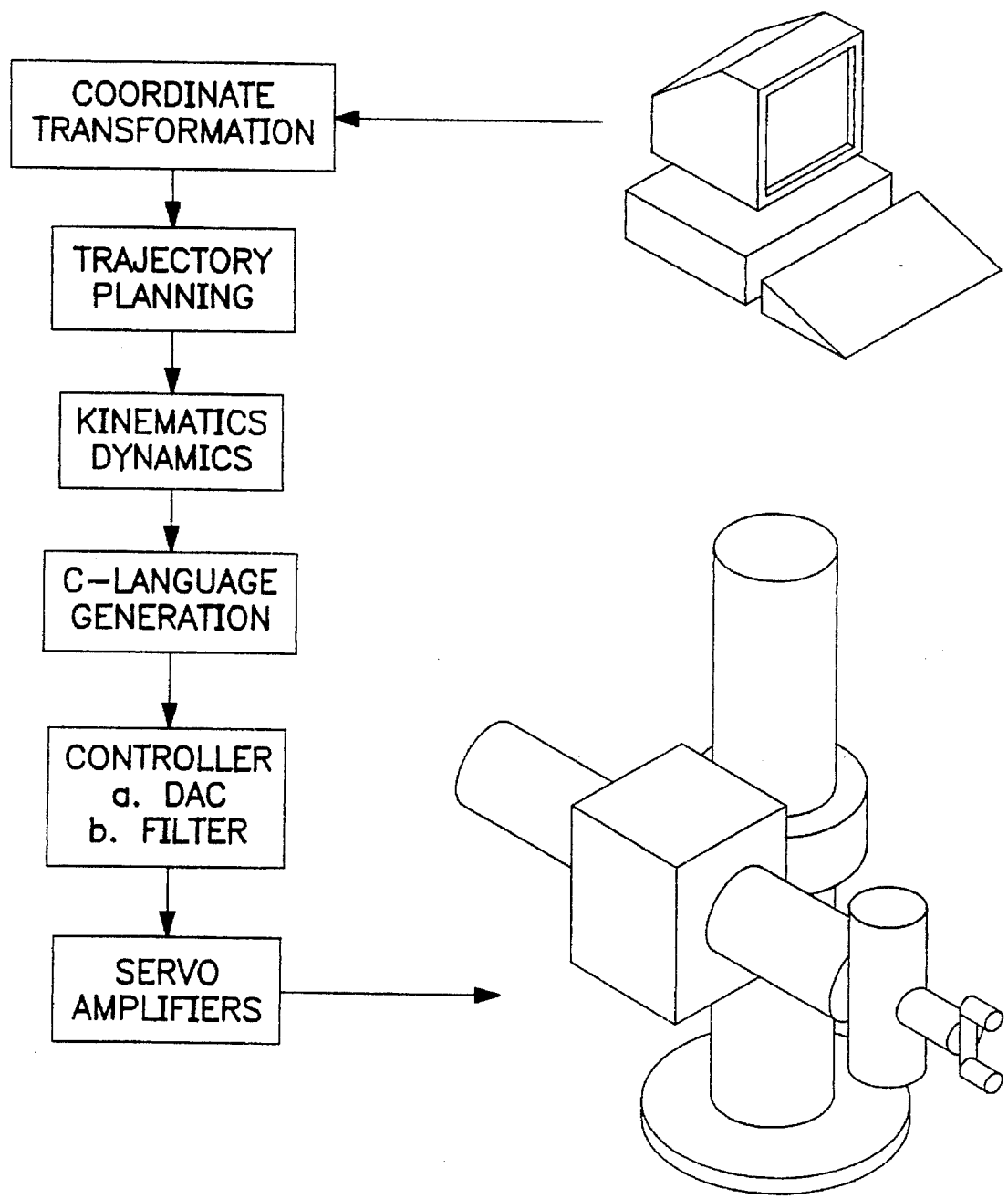
FIGS. 10(a) and 10(b) show flowcharts of the process for converting data generated in the CAD environment into robot control data.
Figure 10B:
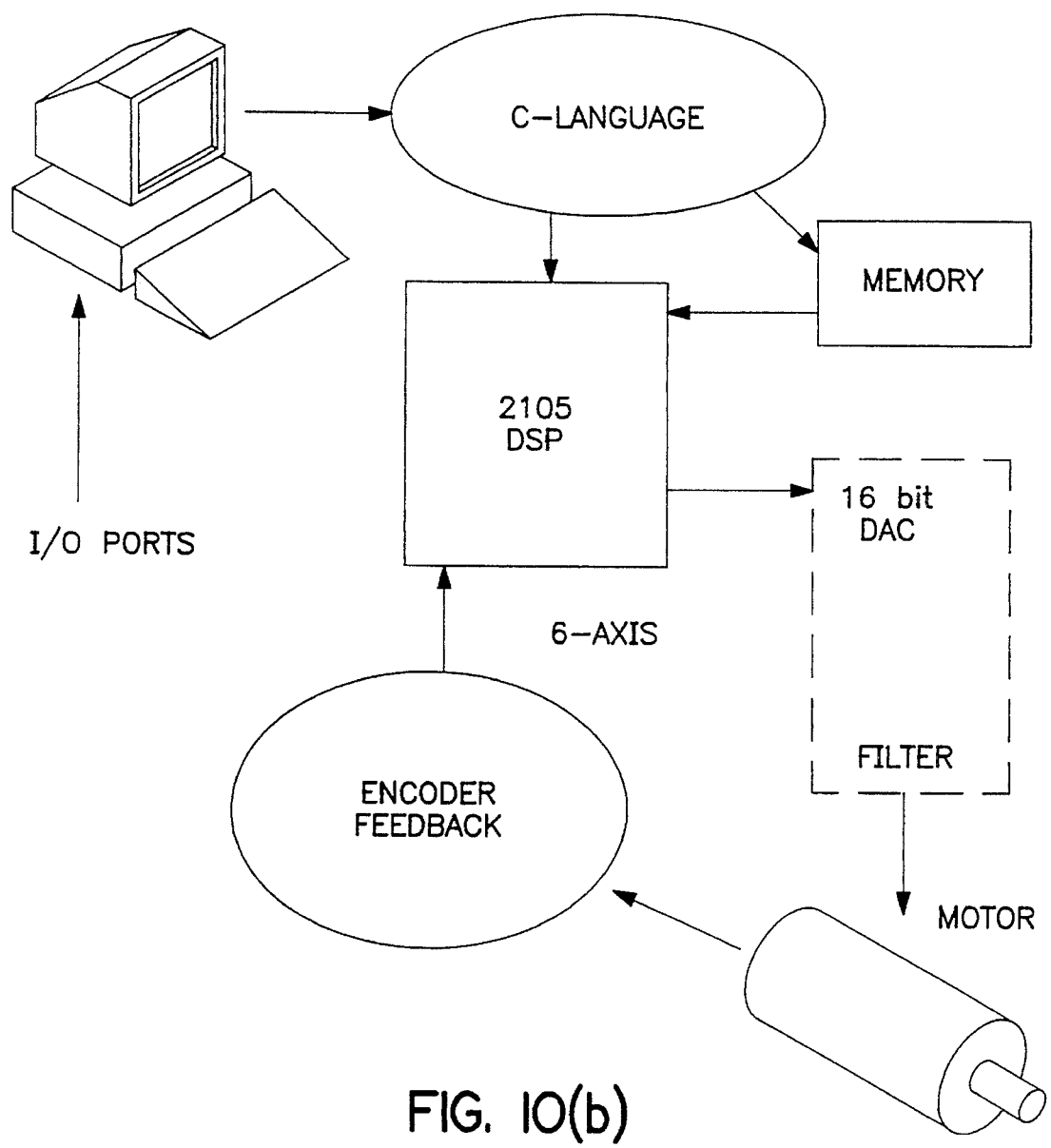

FIGS. 10(a) and 10(b) show overview flowcharts of the process for converting data generated in the CAD environment into robot control data.

Each motor mounted on the robot arm in FIG. 10(a) is individually controlled through a proportional-integral-derivative digital filter. The filter is used to determine the output control signal from the input position error. There are six coefficients with which the output value in encoder counts is calculated.

FIG. 10(b) represents a simplified loop where the motors can be controlled directly from the CPU of a host computer. I/O ports are also made available for the operator to connect external sensors or devices. The end-effector mounted at the end of link number six (see FIG. 10(a)) is controlled by a user output port. Six sensors on the arm locate the "home" position and are controlled by dedicated output ports. The block labelled "2105 DSP" is a motion control board manufactured by Motion Engineering. That board allows for computer interaction between power amplifiers and encoders (position transducers).

Figure 11A:
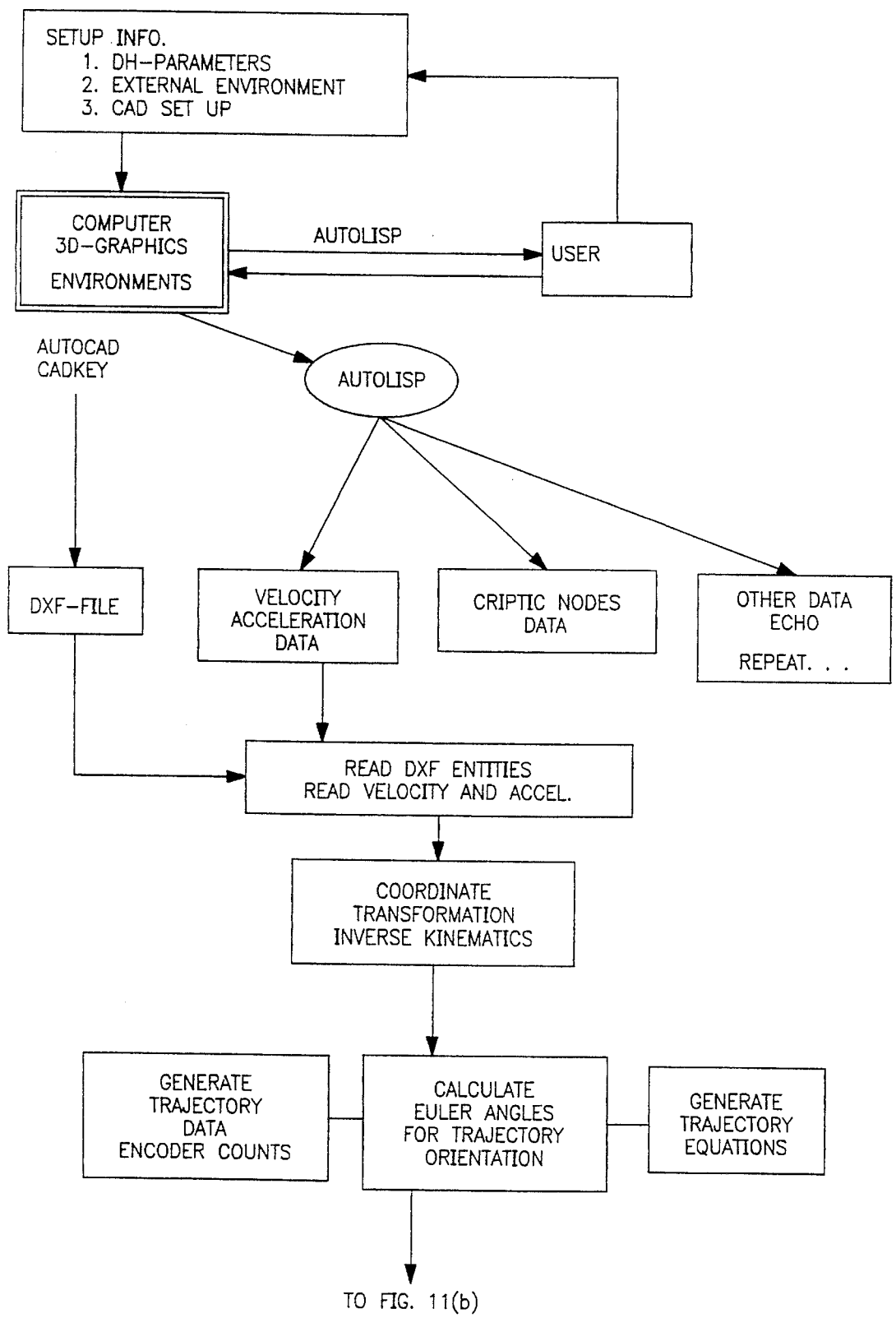
FIGS. 11(a) and 11(b) show a more detailed flowchart of the process in FIGS. 10(a) and 10(b).
Figure 11B:
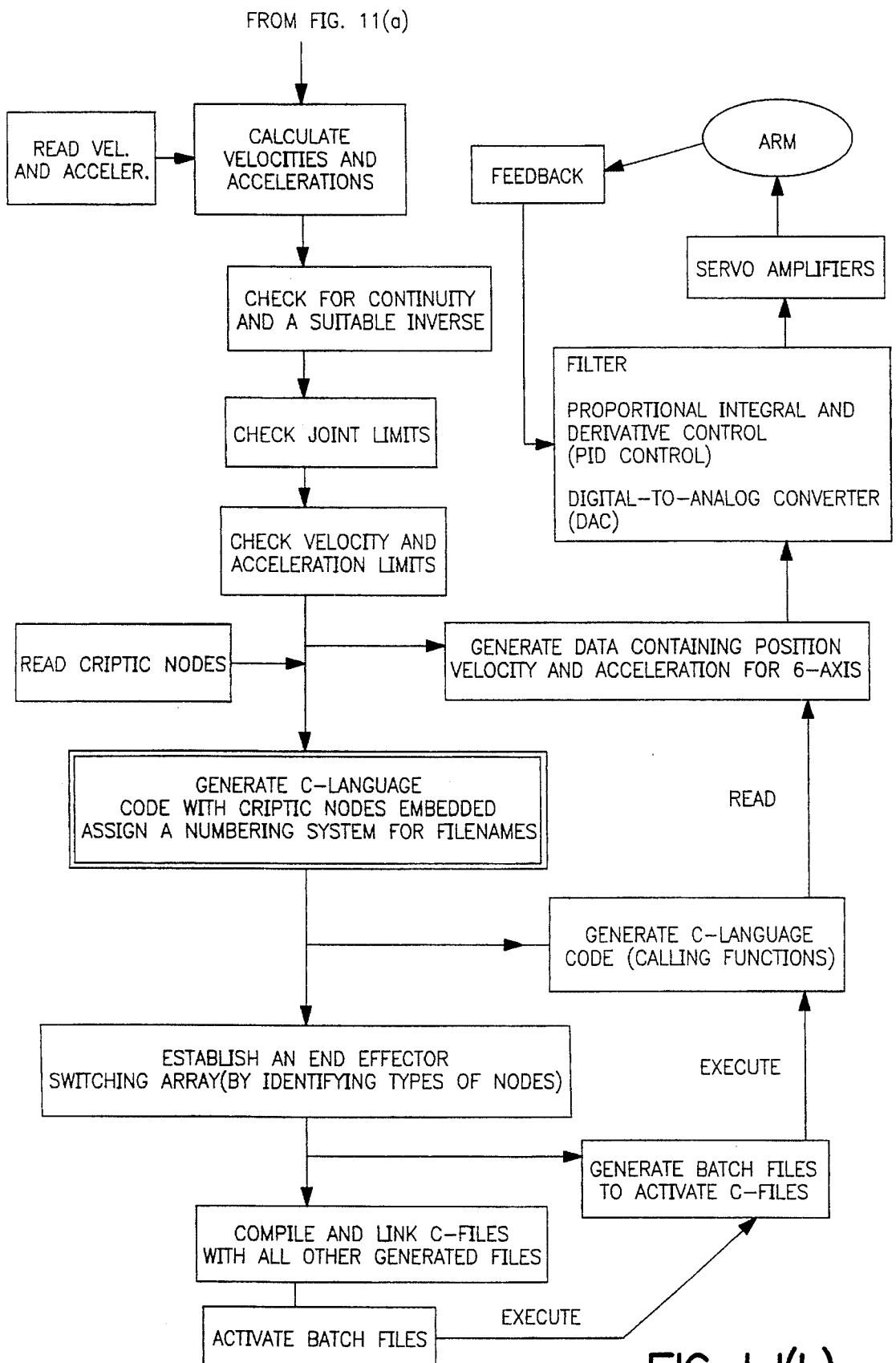

FIGS. 11(a) and 11(b) show a more detailed flowchart of the process in FIGS. 10(a) and 10(b). AutoLISP® is used to interact with the operator to acquire all the necessary information.

FIG. 12 shows a robot suitable for interfacing with the graphical interface of the invention. That robot includes a unique robot arm formed from tube-shaped structural members and employs of brushless DC motors for movement. As noted above, however, it should be understood that the invention will operate with any six axis robot. Furthermore, the invention will operate with any robot having less than six axes since it is a simple matter to hold the variables associated with one or more unutilized axes as constants.

The Appendix includes a code listing of the program. The programs included in this listing are the more significant ones. The order is irrelevant since the program is modular and written in the form of "Libraries". Three types of programming languages were used; TRUE-BASIC by True-Basic Corp., QUICK-C by Microsoft Corp., and AutoLISP® by AutoDesk Corp.

The calls and activation to these routines is different. The TRUE-BASIC files, for example, are separately compiled and consequently linked together (bound) to form executable files. Some C-code is generated by the TRUE-BASIC files, compiled using the Microsoft QUICK-C compiler and then linked to other libraries such as (QCPCDSP.LIB) which includes the motion control routines carried out by the motion control board described above. AutoLISP® files are activated from within AUTOCAD.

The TR-Environment runs under any 3D-graphical package that supports the Drawing Exchange Files. The environment is designed to integrate all of the above mentioned languages and convert graphical six dimensional input into robotics language.

When running the program under AUTOCAD, once the AUTOCAD editor is invoked, all the files needed to run the TR-environment are loaded automatically (unless otherwise specified). This is done by supplying a file called "acad.lsp" in the search path. The "acad.lsp" file is loaded but not executed. Other functions that are written in languages other than AutoLISP® are loaded through the "acad.pgp" file and are automatically loaded as well. (See descriptions of files for more detail.) Once loaded, the environment will display the following message:

| LOADING | TR-ENVIRONMENT |
|---------|----------------|
| "Loading | Learn.lsp" |
| "Loading | Echo.lsp" |

-continued

| LOADING | TR-ENVIRONMENT |
|---|---|
| "Loading | Edit.Isp" |
| "Loading | Criptic.Isp" |
| "Loading | Out.Isp" |
| "Loading | Node.Isp" |

CAUTION: The TR-Environment has been successfully Loaded

The novel graphical interface described above provides significant advantages not contemplated by the prior art. The novel interface allows an operator to employ a well-known CAD environment for easily entering and simultaneously visualizing plural robot configurations and trajectories in an interactive manner. The novel interface is readily switchable between on-line and off-line programming. The novel interface allows the end-effector state to be specified during the creation of configurations and employs a novel state that has programming code embedded therein.

The present invention may be embodied in other specific forms without departing from the spirit or essential attributes thereof and, accordingly, reference should be made to the appended claims, rather than to the foregoing specification, as indicating the scope of the invention.

APPENDIX

THE TR-GRAPHICAL INTERFACE

A Graphical Robotics Control Environment

Copyright © 1992 by Karim Abdel-Malek

*FILE: MOTION.TRU*
*LANGUAGE: TRUE-BASIC*

```
!external

CALL GO_Motion

END

! +++++++++++++++++++++++++++++++++++++++++++++++++++
SUB GO_Motion

LIBRARY "c:\tb\shell.trc"
            ! COMMUNICATION WITH DOS LIBRARY
    LIBRARY "c:\tuberob\euler.trc"
            ! EULER ROTATION MATRIX
    LIBRARY "c:\tuberob\arc_pts.trc"
            ! GENERATION OF POINTS ON AN ARC
    LIBRARY "c:\tuberob\suitable.trc"
            ! CHOOSES A SUITABLE INVERSE KINEMATICS
    LIBRARY "c:\tuberob\reverse.trc"
            ! CREATES DATA FOR THE ECHO AND REPEAT
    LIBRARY "c:\tuberob\arbtry.trc"
            ! ARBITRARY AXIS ALGORITHM
!*************************************************************************
! INITIALIZATION OF MATRICES
    DIM ipoint(3), nn(3), ss(3), aa(3)
    DIM nt(3),st(3),at(3)
    DIM dels(6) ,dels_arc(6), dels_arc2(6)  ! the chosen Joint coordinates
    DIM dels_l(6),dels_l2(6), temp(6)
    DIM dels_l1(6), dels_l2(6)
    DIM x_dels(6), q_dels(6)
    DIM written(6), nwritten(6)
    DIM Vel(6), accel(6)       ! velocities and accelerations
    DIM VELOCITY(30),Acceleration(30)
    DIM E$(40),Insertions(40,15)
    DIM C1r(3)                 ! is the ARC center in WCS
    DIM l1(3),l2(3),n1(3),s1(3),a1(3),n2(3),s2(3),a2(3),dels1(6),dels2(6)
    DIM I_TEMP(3)
    DIM x_kam(6)
    DIM PTS(11,3)
```

*FILE: MOTION.TRU*
*LANGUAGE: TRUE-BASIC*

```
DIM V1(3),V2(3)
DIM Grips(30,2)
DECLARE DEF v_to_$
LET fnumber = 0          ! filenumber is the number of C-files that are generated
LET no_sections = 0
! ****************************************************
! FILE CREATION
! ****************************************************
!reading the velocity & acceleration data
OPEN #20: name "c:\tuberob\vel_acc.txt", organization text, create newold
DIM values$(60)
RESET #20: BEGIN    ! resets pointer to start of file
LET wq = 0
FOR i = 1 to 60
   INPUT #20: a$
   IF MOD(i,2) = 1 then
      LET wq = wq +1
      LET velocity(wq) = val(a$)    ! READING VELOCITY AND ACCELERATION
   ELSE
      LET acceleration(wq) = val(a$)
   END IF
NEXT i
CLOSE #20
!   MAT PRINT velocity
!   MAT PRINT acceleration
! ----------------------------------
LET First = 0    ! i.e this is the first time (for the inserts)
LET count = 0    !number of move commands
! This is to store the location of an INSERT, (i.e. at what count)
OPEN #8: name "d:\inserts.txt", organization text, create newold
ERASE #8
RESET #8: BEGIN
! ----------------------------------
! This file is to store the number of move commands
OPEN #10: name "d:\capacity.txt", organization text, create newold
ERASE #10
RESET #10: BEGIN
! ----------------------------------
OPEN #15: name "d:\cripts.txt", organization text, create newold
ERASE #15
RESET #15: BEGIN
```

A2

FILE: MOTION.TRU
LANGUAGE: TRUE-BASIC

```
! ---------------------------------
OPEN #16: name "d:\c_link.bat", organization text, create newold
SET #16: MARGIN 250
ERASE #16
RESET #16: BEGIN
! ---------------------------------
OPEN #17: name "d:\R_link.bat", organization text, create newold
SET #17: MARGIN 250
ERASE #17
RESET #17: BEGIN
! ---------------------------------
OPEN #9: name "d:\read_C.txt", organization text, create newold
SET #9: MARGIN 250
SET #9: ZONEWIDTH 10
ERASE #9
RESET #9: BEGIN
! ---------------------------------
! this should be the home configuration of the first insertion point
! This file is created by AUTOCAD, it's a DXF file. The DXF file is
! created through a different program written in AUTOLISP, and given
! name "c:\tuberob\try1.dxf"
OPEN #1: name "try1.dxf",access "input", organization "text", create "old"
LET zq = 0
LET zq = zq + 1
LINE INPUT #1: str$
FOR i = 1 to 100
   IF flag = 0 then
      LET zq = zq + 1
      LINE INPUT #1: str$
   END IF IF Mod (zq,2) <>0 and str$ = "  0" then
      LET zq = zq + 1
      LINE INPUT #1: str$
      LET flag = 0
      !    PRINT "str$ befor is ";str$ ! Now determine what entity it is
      SELECT CASE str$
      CASE "SECTION"
         !    PRINT " I got a section at ";zq
```

FILE: MOTION.TRU
LANGUAGE: TRUE-BASIC

```
    CASE "INSERT"
    !       PRINT " I got an insert at ";zq
        CALL insert(flag,ipoint(),nn(),ss(),aa())

!       PRINT "inside the insert "
    !       PRINT " the ipoint = ";
    !       MAT PRINT ipoint
    !       MAT PRINT nn
    !       MAT PRINT ss
    !       MAT PRINT aa
    ! ------------
    .   LET inserting = inserting + 1   ! To track how many inserts
        ! follow each other

SELECT CASE ARC$

! ################################################################  ARC
        CASE "ARC"
            MAT l2 = ipoint
            MAT n2 = nn
            MAT s2 = ss
            MAT a2 = aa !           PRINT " the C1r is inside the insert I am llll for "
    !           MAT PRINT C1r
    !           PRINT " and the l1, n1 s1,a1 = "
    !           MAT PRINT l1
    !           MAT PRINT n1
    !           MAT PRINT s1
    !           MAT PRINT a1
    !            PRINT " and the l2,n2,s2,a2 ="
    !           MAT PRINT l2
    !           MAT PRINT n2
    !        MAT PRINT s2
    !        MAT PRINT a2
            MAT x_dels = 0   ! initialize the x_dels   i.e. the dels from before
! Given: the four arrays n1(),s1(), a1(), p()
! Required: the dels1 () array that contains the six generalized coordinates
            !PRINT " this is for arc point #1 "
```

A4

FILE: MOTION.TRU
LANGUAGE: TRUE-BASIC

```
        CALL suitable_inverse (n1(),s1(),a1(),l1(),dels1(),x_dels())
        !PRINT " this is for arc point #2 "
        CALL suitable_inverse (n2(),s2(),a2(),l2(),dels2(),x_dels())
! Given: an angle
! required: its complementary
        CALL Find_complementary (dels2(6),mu2)
        LET dst1 = abs(dels2(6) -dels1(6))
        LET dst2 = abs(mu2 -dels1(6))
        IF dst2 <dst1 then LET dels2(6) = mu2
! Given the four arrays,
! Required: the three euler angles
        CALL EULER_INVERSE (n1(),s1(),a1(),psi1,theta1,phi1)
        CALL EULER_INVERSE (n2(),s2(),a2(),psi2,theta2,phi2)
        !print "psi 1, theta1 , phi1 "
        !print psi1, theta1, phi1
        !print "psi 2, theta2 , phi2 "
        !print psi2, theta2, phi2

!PRINT "dels1 and dels2 are, respectively "
        !   MAT PRINT dels1,dels2
        ! now find the pts on the arc
        ! Now decide how many segments the arc is going to be divided
        CALL distance (l1(),l2(),d_arc)
        MAT v1 = l1 - C1r
        MAT V2 = l2 - C1r
! Find the smallest angle between the two vectors V1 and V2
        CALL angle (theArc,v1(),v2())    ! arc angle
! Calculate the distance between the center and l1()
        CALL distance (l1(),C1r(),Rarc)
        PRINT " R arc = ";Rarc
        PRINT "TheArc = ";Thearc LET Larc = Rarc* thearc    ! arc length
        IF thearc < (Pi/2) then
! the division of segments(FOR THE ARC) should be
! by angle not by distance
            LET segment = 20
        ELSE
            LET segment = int (thearc * 40/Pi)
        END IF
        MAT pts = zer(segment+1,3)
```

A5

FILE: MOTION.TRU
LANGUAGE: TRUE-BASIC

```
CALL Draw_Ssec (l1(),C1r(),l2(),pts(,),segment)

! the arc length is R*Theta
  ! to keep track of what velocity to pick up
LET no_sections = no_sections + 1
! calculate the time for that section
LET Ts = Larc/Velocity(no_sections)
LET Tp = Ts /segment PRINT "Larc = ";larc
PRINT " velocity = ";velocity(no_sections)
PRINT "segments =";segment
PRINT "Ts = ";Ts
PRINT "Tp = ";Tp ! Now I have q's for the intial and final positions, and I have
coordinates
! of points on the arc joining them.
! Now find n,s,a for the points on the arc
LET step1 = (psi2 -psi1)/segment
LET step2 = (theta2 - theta1)/segment
LET step3 = (phi2 - phi1)/segment FOR i = 0 to segment  ! should be 0 to 10
    ! devide the arc into 11 sections
    LET ph = psi1 + step1 * i
    LET th = theta1 + step2 * i
    LET f =  phi1 + step3 * i
    !IF i = 0 then PRINT "psi, theta, phi :"
    ! print ph, th, f
    !print "Dels1 and dels2 are :"
    !mat print dels1
    !mat print dels2
    !CALCULATING THE ORIENTATION ARRAYS
    LET Cf = Cos(f)
    LET Sf = Sin(f)
    LET Cp = Cos(ph)
    LET Sp = Sin(ph)
    LET Cth = Cos(th)
    LET Sth = Sin(th)
```

A 6

FILE: MOTION.TRU
LANGUAGE: TRUE-BASIC

```
LET nt(1) = Cf*Cp - Sf*Cth*Sp
LET nt(2) = Sf*Cp+Cf*Cth*Sp
LET nt(3) = Sth*Sp
!
LET st(1) = -Cf*Sp-Sf*Cth*Cp
LET st(2) = -Sf*Sp + Cf*Cth*Cp
LET st(3) = Sth*Cp

LET at(1) = Sf*Sth
LET at(2) = -Cf*Sth
LET at(3) = Cth

! I got Insertion points, n, s, a  for all the points on the arc
! Now find inverses for each point
FOR j = 1 to 3
    LET I_temp(j) = pts(i+1,j)    ! (i+1) because i starts at 0
NEXT j !print "I_temp is "
!mat print I_temp
MAT dels_arc = 0
!print " this is for arc point #";i
!print " nt, st, at are "
!mat print nt
!mat print st
!mat print at
!mat print I_temp
! ----------------------
! Here check for shortest distance between each succesive inverse
! This should be for all the ROTARY angles Joints 2,4,5,6
CALL suitable_inverse (nt(),st(),at(),I_temp(),dels_arc(),x_dels)
MAT x_dels = dels_arc
! Smoothness across a jump ( line to arc for example)
IF i = 0 then
    CALL Find_complementary (dels_arc(2),mu2)
    LET dst1 = abs(dels_arc(2) -written(2))
    LET dst2 = abs(mu2 -written(2))
    IF dst2 <dst1 then LET dels_arc(2) = mu2
!----------------------------------
FOR j = 4 to 6
    CALL Find_complementary (dels_arc(j),mu2)
```

A7

FILE: MOTION.TRU
LANGUAGE: TRUE-BASIC

```
        !print " complementary = ";mu2
        LET dst1 = abs(dels_arc(j) -written(j))
        LET dst2 = abs(mu2 - written(j))
        !print "dst1 = ";dst1; " and dst2 = ";dst2
        IF dst2 <dst1 then LET dels_arc(j) = mu2
     NEXT j
     !----------------------------------
  END IF ! ---------- Smoothness along the Move command ------------
  IF i <> 0 then
     CALL Find_complementary (dels_arc(2),mu2)
     LET dst1 = abs(dels_arc(2) -dels_arc2(2))
     LET dst2 = abs(mu2 -dels_arc2(2))
     IF dst2 <dst1 then LET dels_arc(2) = mu2
     !----------------------------------
     FOR j = 4 to 6
        CALL Find_complementary (dels_arc(j),mu2)
        !print " complementary = ";mu2
        LET dst1 = abs(dels_arc(j) -dels_arc2(j))
        LET dst2 = abs(mu2 -dels_arc2(j))
        !print "dst1 = ";dst1; " and dst2 = ";dst2
        IF dst2 <dst1 then LET dels_arc(j) = mu2
     NEXT j
     !----------------------------------
  END IF
  MAT dels_arc2 = dels_arc IF i = segment  then MAT written = dels_arc
  !              FOR k = 1 to 6
  ! IF dels_arc(k) > 2*Pi then LET dels_arc(k) = dels_arc(k) - 2*Pi
  !                 PRINT using$ ("##.##",dels_arc(k));" ";
  !              NEXT k
  !print deg(dels_arc(6))

!let tp = .7    ! time for each segment
  CALL conversion (dels_arc())
  FOR qq = 1 to 6
     LET vel(qq) = (dels_arc(qq) - temp(qq) )/tp
```

*FILE: MOTION.TRU*
*LANGUAGE: TRUE-BASIC*

```
                    IF abs(vel(qq)) < .000005 then LET vel(qq) = 1    ! since the
controller does not understand zero
                    LET vel(qq) = abs(vel(qq))     ! so as not to have negative
velocities
                NEXT qq IF i = 1 then
                    FOR qq = 1 to 6
                        LET accel(qq) = vel(qq)/(tp/3)  ! calculate accelerations for the
first move command
                        IF abs(accel(qq)) < .000005 then LET accel(qq) = 1  ! since
the controller does not understand zero
                        LET accel(qq) = abs(accel(qq))  ! so as not to have negative
accelerations
                    NEXT qq
                ELSE
                    MAT accel = 999900000     ! that is a spike
                    LET accel(6) = 1000
                END IF
                IF i = 0  then     ! AND First = 1 then
                    ! DO NOT do anything
                ELSE
                    ! ------ CHECK LIMITS
                    CALL check_limits (dels_arc(),i)
                    CALL velocity_limits (vel(),i)

PRINT
#9:dels_arc(1),dels_arc(2),dels_arc(3),dels_arc(4),dels_arc(5),dels_arc(6),vel(1),vel(2),
vel(3),vel(4),vel(5),vel(6),accel(1),accel(2),accel(3),accel(4),accel(5),accel(6)
                    LET count = count + 1
                    MAT x_kam = dels_arc
                    !print " now the x_kam inside the (arc) are"
                    !mat print x_kam
                END IF LET first = 1
                MAT temp = dels_arc NEXT i ! GRIPPER Follower
```

*A9*

FILE: MOTION.TRU
LANGUAGE: TRUE-BASIC

```
    LET ccc = ccc + 1
    IF grip$ = "AXIS" then LET ax = 1      ! Open i.e. "AXIS" = open = 1
    IF grip$ = "AXISC" then LET ax = 2     ! Close
    IF grip$ = "AXIS2" then      ! Criptic
       LET ax = 3
       PRINT " insert is criptic and it's ipoint is ";
       MAT PRINT ipoint LET fname_script$ = v_to_$(int(ipoint(1))) & v_to_$(int(ipoint(2))) & v_to_$(int(ipoint(3)))
       !         PRINT "script filename =   ";fname_script$
       LET fnumber = fnumber + 1
       CALL generate_C_file (fname_script$,fnumber)
       ! Now also store the location of the criptic node in units of count
       PRINT #15: count    ! writing to the d:\cripts.txt
    END IF
    LET grips(ccc,1) = count    ! Location of the insert in units of (count)
    LET grips(ccc,2) = ax  ! State of the gripper 1 = open , 2 = close PRINT "                          count =";count; " grip$ =";grip$ MAT l1 = lpoint
    MAT n1 = nn
    MAT s1 = ss
    MAT a1 = aa
    LET ARC$ = "OFF"  ! so it is changed ! ****************************************************************
   CASE "LINE"
   ! ****************************************************************
    MAT l2 = lpoint
    MAT n2 = nn
    MAT s2 = ss
    MAT a2 = aa
    !print " n, s, a and l2 are"
    !mat print n2
    !mat print s2
    !mat print a2
    !print " l2 is ";
```

A10

```
                                    FILE: MOTION.TRU
                                    LANGUAGE: TRUE-BASIC

!mat print I2

CALL suitable_inverse (n1(),s1(),a1(),l1(),dels_l(), x_dels())
    !print " dels_l are"
    !mat print dels_l
    MAT temp = dels_l
    CALL conversion (temp())
    CALL suitable_inverse (n2(),s2(),a2(),l2(),dels_l(),x_dels())

!print " dels_l are"
    !mat print dels_l

CALL EULER_INVERSE (n1(),s1(),a1(),psi1,theta1,phi1)
    CALL EULER_INVERSE (n2(),s2(),a2(),psi2,theta2,phi2)
    CALL distance (l1(), l2(), d_line)
    !print "d_line ="; d_line IF d_line < 1.5 then
       LET segment = 10
    ELSE
       LET segment = int (d_line * 10/1.5)
    END IF LET no_sections = no_sections + 1    ! to keep track of what velocity
to pick up
    ! calculate the time for that section
    LET Ts = d_line/Velocity(no_sections)
    LET Tp = Ts /segment
    !print " velocity = ";velocity(no_sections)
    PRINT "segments (line) =";segment
    !print "Ts = ";Ts
    !print "Tp = ";Tp MAT pts = ZER(segment+1,3)
    CALL points_on_line (l1(),l2(),pts(,),segment)
    !print "segment = ";segment
    LET step1 = (psi2 -psi1)/segment
    LET step2 = (theta2 - theta1)/segment
    LET step3 = (phi2 - phi1)/segment
```

A/I

FILE: MOTION.TRU
LANGUAGE: TRUE-BASIC

```
FOR i = 0 to segment   ! should be 0 to 10
   ! devide the arc into 11 sections
   LET ph = psi1 + step1 * i
   LET th = theta1 + step2 * i
   LET f =  phi1 + step3 * i !print "Dels1 and dels2 are :"
   !mat print dels1
   !mat print dels2
   !
   LET Cf = Cos(f)
   LET Sf = Sin(f)
   LET Cp = Cos(ph)
   LET Sp = Sin(ph)
   LET Cth = Cos(th)
   LET Sth = Sin(th)

LET nt(1) = Cf*Cp - Sf*Cth*Sp
   LET nt(2) = Sf*Cp+Cf*Cth*Sp
   LET nt(3) = Sth*Sp
   !
   LET st(1) = -Cf*Sp-Sf*Cth*Cp
   LET st(2) = -Sf*Sp + Cf*Cth*Cp
   LET st(3) = Sth*Cp

LET at(1) = Sf*Sth
   LET at(2) = -Cf*Sth
   LET at(3) = Cth

!

! I got Insertion points, n, s, a  for all the points on the arc
   !                 ! Now find inverses for each point
   FOR j = 1 to 3
      LET I_temp(j) = pts(i+1,j)    ! (i+1) because i starts at 0
   NEXT j !print "I_temp is "
   !mat print I_temp
   MAT dels_arc = 0
```

A12

FILE: MOTION.TRU
LANGUAGE: TRUE-BASIC

```
!print " this is for arc point #";i

!print " nt, st, at are "
!mat print nt
!mat print st
!mat print at
!mat print I_temp CALL suitable_inverse (nt(),st(),at(),I_temp(),dels_I(),x_dels)
IF i = 0 then
   !print "the 0th dels_I are "
   !mat print dels_I
   !print " written = "
   !mat print written END IF
! -------- Smoothness across a JUMP (line to arc for example)
IF i = 0 then
   CALL Find_complementary (dels_I(2),mu2)

LET dst1 = abs(dels_I(2) -written(2))
   LET dst2 = abs(mu2 -written(2))
   IF dst2 <dst1 then LET dels_I(2) = mu2
   !----------------------------------
   FOR j = 4 to 6
      CALL Find_complementary (dels_I(j),mu2)
      !print " complementary = ";mu2,"and dels_I(j) = ";dels_I(j)
      LET dst1 = abs(dels_I(j) -written(j))
      LET dst2 = abs(mu2 - written(j))
      !print "dst1 = ";dst1; " and dst2 = ";dst2
      IF dst2 <dst1 then LET dels_I(j) = mu2
   NEXT j
   !----------------------------------
END IF MAT x_dels = dels_I
FOR k = 4 to 6
```

A-13

FILE: MOTION.TRU
LANGUAGE: TRUE-BASIC

```
            IF dels_I(k) > 2*Pi then LET dels_I(k) = dels_I(k) - 2*Pi
            !   PRINT dels_I(k);"";
         NEXT k
         ! ---------- Smoothness along the MOVE command --------------
         IF i <> 0 then
            CALL Find_complementary (dels_I(2),mu2)
            LET dst1 = abs(dels_I(2) -dels_I2(2))
            LET dst2 = abs(mu2 -dels_I2(2))
            IF dst2 <dst1 then LET dels_I(2) = mu2
            !---------------------------------
            FOR j = 4 to 6
                CALL Find_complementary (dels_I(j),mu2)
                !print " complementary = ";mu2
                LET dst1 = abs(dels_I(j) -dels_I2(j))
                LET dst2 = abs(mu2 -dels_I2(j))
                !print "dst1 = ";dst1; " and dst2 = ";dst2
                IF dst2 <dst1 then LET dels_I(j) = mu2
            NEXT j
            !---------------------------------
         END IF
         MAT dels_I2 = dels_I
         IF i = segment then MAT written = dels_I !let tp = .6    ! time for each segment
         CALL conversion (dels_I())
         FOR qq = 1 to 3
             LET vel(qq) = (dels_I(qq) - temp(qq) )/tp
             IF abs(vel(qq)) < .000005 then LET vel(qq) = 1    ! since the
controller does not understand zero
             LET vel(qq) = abs(vel(qq))     ! so as not to have negative
velocities
         NEXT qq
         FOR qq = 4 to 6
             LET vel(qq) = (dels_I(qq) - temp(qq) )/tp
             IF abs(vel(qq)) < .000005 then LET vel(qq) = 1    ! since the
controller does not understand zero
             ! if abs(vel(qq)) < 100 then let vel(qq) = 100 * vel(qq)

LET vel(qq) = abs(vel(qq))    ! so as not to have negative
velocities
         NEXT qq
```

A14

*FILE: MOTION.TRU*
*LANGUAGE: TRUE-BASIC*

```
        IF i = 1 then
          FOR qq = 1 to 6
            LET accel(qq) = vel(qq)/(tp/3)   ! calculate accelerations for the first move command
            IF abs(accel(qq)) < .000005 then LET accel(qq) = 1   ! since the controller does not understand zero
            LET accel(qq) = abs(accel(qq))   ! so as not to have negative accelerations
          NEXT qq
        ELSE
          MAT accel = 999900000      ! that is a spike
          LET accel(6) = 1000
        END IF IF i = 0    then  ! AND first = 1 then
          PRINT " Do NOT print anything "
        ELSE
          ! ------ CHECK LIMITS
          CALL velocity_limits (vel(),i)
          CALL check_limits (dels_l(),i)
          PRINT #9:dels_l(1),dels_l(2),dels_l(3),dels_l(4),dels_l(5),dels_l(6),vel(1),vel(2),vel(3),vel(4),vel(5),vel(6),accel(1),accel(2),accel(3),accel(4),accel(5),accel(6)
          LET count = count + 1
          MAT x_kam = dels_l2
          !print " now the x_kam inside the (line) are "
          !mat print x_kam
        END IF LET first = 1
        MAT temp = dels_l NEXT i
      PRINT "                         count =";count; " grip$ =";grip$
      LET ccc = ccc + 1
      IF grip$ = "AXIS" then LET ax = 1    ! Open i.e. "AXIS" = open = 1
      IF grip$ = "AXISC" then LET ax = 2   ! Close
      IF grip$ = "AXIS2" then              ! Cript
        LET ax = 3
```

A/5

FILE: MOTION.TRU
LANGUAGE: TRUE-BASIC

! Gripper Follower

Open = 1

```
LET ccc = ccc + 1
IF grip$ = "AXIS" then LET ax = 1 else LET ax = 2      ! i.e. axis =

LET grips(ccc,1) = 0      ! Location of the insert in units of (count)
LET grips(ccc,2) = ax     ! State of the gripper 1 = open , 2 = close END IF
!print " Inside case else , inserting = ";inserting
IF inserting >= 2 then      !These are the Pt_To_Pt motion commands
   ! >= 2 in case of more than 2 consecutive INSERTS
   MAT l2 = ipoint
   MAT n2 = nn
   MAT s2 = ss
   MAT a2 = aa
   !print " l2, n2, s2, a2 are ";
   !mat print l2
``` to pick up

```
   LET no_sections = no_sections + 1   ! to keep track of what velocity

! calculate the time for that section
   LET Ts = Velocity(no_sections)      !in case of inserts its a velocity
   !let Tp = Ts /segment
   !print " inside the else , the time is Ts =";Ts
   MAT x_dels = 0
   CALL suitable_inverse (n1(),s1(),a1(),l1(),dels_l1(), x_dels())
   !print " Pt_tO_Pt motion dels_l1 ="
   !mat print dels_l1
   CALL suitable_inverse (n2(),s2(),a2(),l2(),dels_l2(),dels_i1())
   !mat print dels_l2

! -------- smoothness along the move command --------------
   CALL Find_complementary (dels_i2(2),mu2)
   LET dst1 = abs(dels_i2(2) -written(2))
   LET dst2 = abs(mu2 - written(2))
   IF dst2 <dst1 then LET dels_i2(2) = mu2
   FOR qq = 4 to 6
       CALL Find_complementary (dels_i2(qq),mu2)
```

A17

FILE: MOTION.TRU
LANGUAGE: TRUE-BASIC

```
            CALL velocity_limits (vel(),no_sections)
            CALL check_limits (dels_l2(),no_sections)
            PRINT
#9:dels_l2(1),dels_l2(2),dels_l2(3),dels_l2(4),dels_l2(5),dels_l2(6),vel(1),vel(2),vel(3),v
el(4),vel(5),vel(6),accel(1),accel(2),accel(3),accel(4),accel(5),accel(6)
            LET count = count + 1
            LET first = 1
            MAT x_kam = dels_l2
            !print " now the x_kam inside the (else) are "
            !mat print x_kam
            LET ccc = ccc + 1
            IF grip$ = "AXIS" then LET ax = 1  ! Opened  i.e. "AXIS" = open = 1
            IF grip$ = "AXISC" then LET ax = 2      ! Closed
            IF grip$ = "AXIS2" then  ! Cript
              LET ax = 3
              !         PRINT " insert (line) is criptic and it's ipoint is ";
              MAT PRINT ipoint
              LET fname_script$ = v_to_$(int(ipoint(1))) & v_to_$(int(ipoint(2)))
& v_to_$(int(ipoint(3)))
              !         PRINT "script filename =   ";fname_script$
              LET fnumber = fnumber + 1
              CALL generate_C_file (fname_script$,fnumber)
              ! Now also store the location of the criptic node in units of count
              PRINT #15: count      ! writing to the d:\cripts.txt
            END IF LET grips(ccc,1) = count      ! Location of the insert in units of
(count)

LET grips(ccc,2) = ax    ! State of the gripper 1 = open , 2 = close
          END IF MAT  l1 = ipoint
          MAT n1 = nn
          MAT s1 = ss
          MAT a1 = aa

END SELECT
```

A-19

FILE: MOTION.TRU
LANGUAGE: TRUE-BASIC

```
!        PRINT " These are the dels"
!        MAT PRINT dels

CASE "LINE"
        LET Arc$ = "LINE"
        !      PRINT " I got a line at ";zq
        CALL line(flag)
        LET inserting = 0

CASE "ARC"
        LET Arc$ = "ARC"   ! that is to recognize that the next I point is part of the arc
        !      PRINT "I got an ARC at ";zq
        CALL ARC(flag,C1r())
        LET inserting = 0
     CASE "ENDSEC"
        !      PRINT " I got an end sec at ";zq
     CASE "EOF"
        !      PRINT " I got an EOF at";zq
        CLOSE #9

PRINT #10:count   ! count = number of move commands
     CLOSE #10

! rearrange the grips matrix so as to print to file only when the
     ! gripper changes status LET tempa = grips(1,2)
     PRINT #8: grips(1,2)   ! the first number is the status at the 0th location
     PRINT #8: grips(1,1)   ! always print the first gripper status
     FOR i = 2 to 18
        IF grips(i,2) = 0 then EXIT FOR
        IF grips(i,2) = 3 then
           ! don't do anything
        ELSE
           IF grips(i,2) <>tempa then    ! print the the gripper to a file ONLY
              PRINT #8: grips(i,1)   ! when a status has been found
              LET tempa = grips(i,2)
           END IF
```

A20

FILE: MOTION.TRU
LANGUAGE: TRUE-BASIC

! and linking to the pcdsp motion control library

```
    LET qcl$= "qcl /AL c:\qc25a\bin\one_one.c " & in$ & " /link
c:\qc25a\lib\pcdspqcl.lib"

! NOW WRITE TO THE BATCH FILE "d:\c_link.bat"
        PRINT #16: qcl$
        PRINT #16: "c:\tuberob\one_one.exe"

CLOSE #16

LET qcl$= "qcl /AL c:\qc25a\bin\echo.c " & in$ & " /link
c:\qc25a\lib\pcdspqcl.lib"
        PRINT #17: qcl$
        PRINT #17: "c:\tuberob\echo.exe"

CLOSE #17         ! d:\R_link.bat
        !qcl  /AL c:\qc25a\bin\one_one.c d:\f1.c d:\f2.c /link c:\qc25a\lib\pcdspqcl.lib PRINT #15: "99"    ! end of data CLOSE #15          ! cripts.txt CLOSE #1           ! c:\tuberob\try1.dxf ! now reverse the move data CALL reverse
        ! now open ! read_c3.txt and write the initial position at the end
        OPEN #66: name "d:\repeat.txt", organization text, create newold
        RESET #66: BEGIN
        !input #66: rubish$
        !input #66: repeat_time$ !let rt = val(repeat_time$)
        !print " repeat _time = ";rt
        !print " and the initial position is "
        !mat print q_dels
        !let rt = rt*1000
        OPEN #67: name "d:\read_c3.txt", organization text, create newold
        SET #67: MARGIN 250
```

A22

FILE: MOTION.TRU
LANGUAGE: TRUE-BASIC

```
        SET #67: ZONEWIDTH 10
        RESET #67: end
        PRINT #67
:q_dels(1),q_dels(2),q_dels(3),q_dels(4),q_dels(5),q_dels(6),rt,rt,rt,rt,rt,rt,rt,rt,rt,rt,rt,rt
        CLOSE #66
        CLOSE #67

STOP
     CASE else
        !         PRINT " No case selected , "
     END SELECT
!-------------------------------------------------
! The MACHINERY to generate the MOVE commands
!-------------------------------------------------

END IF
  NEXT i

SUB insert(flag,ipoint(),nn(),ss(),aa())
     LIBRARY "c:\tuberob\arbtry.trc"    ! arbitrary axis algorithm from ACAD
     LIBRARY "c:\tuberob\rotate.trc"    ! Euler-Lexell roation formula around
Extrusion direction
     DIM Extrusion(3), n(3), s(3), p(3)  ! X and Y before applying the R_angle
     LET R_angle = 0          ! that is in case 50 does not exist LET no_inserts = no_inserts + 1

!     PRINT "no_inserts = ";no_inserts
     MAT extrusion = 0        ! that is in case there was nbo extrusion direction
     LET extrusion(3) = 1     ! in the dxf-file
     FOR i = 1 to 20

LET zq = zq +1
        LINE INPUT #1:str$
```

A-23

FILE: MOTION.TRU
LANGUAGE: TRUE-BASIC

```
IF Mod (zq,2) <>0  and str$ = "  0" then
   !-------------------- Here pick up [p,n,s,a]
   ! p is already picked up !              PRINT "the Extrusion is ";
   !              MAT PRINT Extrusion
   CALL Arbitrary_axis (Extrusion(),n(),s())
   !       PRINT " mat n = ";
   !       MAT PRINT n
   !       PRINT " mat s = ";
   !       MAT PRINT s !------------------------
   ! Now this is to rotate the insertion point from ECS to WCS
   !print " Extrusion direction is ";
   !mat print extrusion
   CALL rotate_insertion (n(),s(),Extrusion(), ipoint(),p())
   !          PRINT " the Ipoint in the WCS is ";
   !          MAT PRINT ipoint
   !------------------------
   ! Now rotate the axis with an angle theta around the extrusion axis
   MAT aa = extrusion
   IF R_angle = 0 then
      MAT nn = n
      MAT ss = s
   ELSE CALL rotate (n(),s(),Extrusion(),nn(),ss(),R_angle)

END IF
   !       print " nn ss aa :"
   !              FOR i = 1 to 3
   !                 PRINT nn(i),ss(i),aa(i)
   !              NEXT i
   !----------------------------------------

LET flag = 1      ! that is to skip one of the reading statements in main
   EXIT FOR
END IF
LET  F  = val(str$)
```

FILE: MOTION.TRU
LANGUAGE: TRUE-BASIC

```
!      PRINT "F = ";F
SELECT CASE F

CASE 8
    LET zq = zq +1
    LINE INPUT #1:str$
CASE 2
    LET zq = zq +1
    LINE INPUT #1:str$
    LET grip$ = str$
    !          PRINT "Inside case 2 (insert) the name is ";str$
CASE 10
    LET zq = zq +1
    LINE INPUT #1:str$
    LET p(1) = val (str$)
    !          PRINT " My x = ";p(1)

CASE 20
    LET zq = zq +1
    LINE INPUT #1:str$
    LET p(2) = val (str$)
    !          PRINT " My y = ";p(2)
CASE 30
    LET zq = zq +1
    LINE INPUT #1:str$
    LET p(3) = val (str$)
    !          PRINT " My z = ";p(3)
CASE 50
    LET zq = zq +1
    LINE INPUT #1:str$
    LET R_angle = val (str$)
CASE 210
    LET exist_210 = 1
    LET zq = zq +1
    LINE INPUT #1:str$
    LET Extrusion(1) = val (str$)
    !          PRINT "my Extrusion1 = ";Extrusion(1)
CASE 220
    LET zq = zq +1
    LINE INPUT #1:str$
    LET Extrusion(2) = val (str$)
```

A25

FILE: MOTION.TRU
LANGUAGE: TRUE-BASIC

```
        !          PRINT "my Extrusion2 = ";Extrusion(2)
     CASE 230
        LET zq = zq +1
        LINE INPUT #1:str$
        LET Extrusion(3) = val (str$)
        !          PRINT "my norm3 = ";Extrusion(3)
     CASE else
        LET zq = zq +1
        LINE INPUT #1:str$
     END SELECT
  NEXT i
END SUB SUB LINE(flag)
   FOR i = 1 to 20
      LET zq = zq +1
      LINE INPUT #1:str$
      IF Mod (zq,2) <>0  and str$ = "  0" then
         LET flag = 1      ! that is to skip one of the reading statements in main
         EXIT FOR
      END IF
      LET  F = val(str$)

SELECT CASE F
      CASE 8
         LET zq = zq +1
         LINE INPUT #1:str$
      CASE 10
         LET zq = zq +1
         LINE INPUT #1:str$
         LET x1 = val (str$)
         !          PRINT " My x1 for the line = ";x1

CASE 20
         LET zq = zq +1
         LINE INPUT #1:str$
         LET y1 = val (str$)
      CASE 30
         LET zq = zq +1
         LINE INPUT #1:str$
```

A26

FILE: MOTION.TRU
LANGUAGE: TRUE-BASIC

```
            LET z1 = val (str$)
        CASE 11
            LET zq = zq +1
            LINE INPUT #1:str$
            LET x2 = val (str$)
        CASE 21
            LET zq = zq +1
            LINE INPUT #1:str$
            LET y2 = val (str$)
            !         PRINT "y2 line =";y2
        CASE 31
            LET zq = zq +1
            LINE INPUT #1:str$
            LET z2= val (str$)
            !         PRINT "z2 for line =";z2
        CASE else
            LET zq = zq +1
            LINE INPUT #1:str$
        END SELECT
    NEXT i
END SUB SUB ARC(flag, C1r())
    DIM p1(3),c1(3),p2(3),P1r(3),P2r(3)
    DIM na(3),sa(3),pa(3),Extr(3)

FOR i = 1 to 20
        LET zq = zq +1
        LINE INPUT #1:str$
        IF Mod (zq,2) <>0  and str$ = "  0" then
            !------------------ Here pick up [pa,na,sa,aa]
            ! p is already picked up
            IF  EXTR(1) = 0 AND EXTR(2) = 0 AND EXTR(3) = 0  then      ! that is the
case for UCS = WCS
                LET Extr(1) = 0     ! i.e. when 210,220,230 do not exist
                LET Extr(2) = 0
                LET Extr(3) = 1
            END IF CALL Arbitrary_axis (Extr(),na(),sa())
            !        PRINT " mat na = ";
```

A27

FILE: MOTION.TRU
LANGUAGE: TRUE-BASIC

```
!       MAT PRINT na
!       PRINT " mat sa = ";
!       MAT PRINT sa
!       PRINT "the two angles are"
!       PRINT the1,the2
!       LET P1(1) =  C1(1) + R1 * Cos (Rad(the1))
!       LET P1(2) = C1(2)  + R1 * Sin (Rad(the1))
!       LET P1(3) = C1(3)
!       LET P2(1) = C1(1) + R1 * Cos (Rad(the2))
!       LET P2(2) = C1(2) + R1 * Sin (Rad(the2))
!       LET P2(3) = C1(3)
!       PRINT "the two points are :"
!       MAT PRINT P1
!       MAT PRINT P2
!--------------------------
! Now this is to rotate the center point from ECS to WCS
CALL rotate_insertion (na(),sa(),Extr(), C1r(),C1())
!       PRINT " the rotated center in the WCS is ";
!       MAT PRINT C1r
!       CALL rotate_insertion (na(),sa(),Extr(), P1r(),P1())
!       PRINT " the rotated P1 in the WCS is ";
!       MAT PRINT P1r
!       CALL rotate_insertion (na(),sa(),Extr(), P2r(),P2())
!       PRINT " the rotated P2 in the WCS is ";
!       MAT PRINT P2r
!--------------------------
!--------------------------
    LET flag = 1      ! that is to skip one of the reading statements in main
    EXIT FOR
END IF
LET  F  = val(str$)

SELECT CASE F

CASE 8
    LET zq = zq +1
    LINE INPUT #1:str$

CASE 10
    LET zq = zq +1
    LINE INPUT #1:str$
```

*FILE: MOTION.TRU*
*LANGUAGE: TRUE-BASIC*

```
        LET c1(1) = val (str$)

CASE 20
        LET zq = zq +1
        LINE INPUT #1:str$
        LET c1(2) = val (str$)

CASE 30
        LET zq = zq +1
        LINE INPUT #1:str$
        LET c1(3) = val (str$)

CASE 40          ! Radius
        LET zq = zq +1
        LINE INPUT #1:str$
        LET R1 = val (str$)

CASE 50          ! Start angle
        LET zq = zq +1
        LINE INPUT #1:str$
        LET the1 = val (str$)

CASE 51          ! end angle
        LET zq = zq +1
        LINE INPUT #1:str$
        LET the2 = val (str$)

CASE 210         ! x-extrusion direction
        LET zq = zq +1
        LINE INPUT #1:str$
        LET Extr(1) = val (str$)

CASE 220
        LET zq = zq +1
        LINE INPUT #1:str$
        LET Extr(2) = val (str$)

CASE 230
        LET zq = zq +1
        LINE INPUT #1:str$
        LET Extr(3) = val (str$)
```

*FILE: MOTION.TRU*
*LANGUAGE: TRUE-BASIC*

```
        CASE else
            LET zq = zq +1
            LINE INPUT #1:str$

END SELECT

NEXT i
END SUB

!
END SUB

SUB conversion (a())
    ! GIVEN: an array of the generalized coordinates, dimensions of which are
    ! in : (in),(rad),(in),(rad),(rad),(rad)
    FOR i = 1 to 6
        IF abs(a(i)) < .000005 then LET a(i) = 0
    NEXT i ! REQUIRED: convert to encoder counts
    ! J-0 -------- the lead is 4(mm) = .15748(in) = (1 rev) = 4096 counts
    LET a(1) = -a(1) * 4096 /.15748

! J-1 -------    1 rev (2 Pi)of the arm needs 280868.577 counts
    ! reduction is 4.0/3.5 and 60
    LET a(2) = -a(2) * ((4/3.5)*60*4096) /(2 *Pi)

! J-2 -------- 1" movement of rack  needs 38197.186 encoder counts
    LET a(3) = -a(3) * 38197.186

! J-3 -------- 1 rev (2 Pi) of the arm needs 120000 encoder counts
    LET a(4) = a(4) * 120000/(2 * Pi)

! J-4 -------- 1 rev (2 Pi) of the arm needs 240000 encoder counts
    LET a(5) = -a(5) * 240000/(2 * Pi)

! J-5 -------- 1 rev (2Pi) of the arm needs 4000 encoder counts
    LET a(6) = -a(6) *2300 /(2*Pi)
```

A30

FILE: MOTION.TRU
LANGUAGE: TRUE-BASIC

```
END SUB

SUB Find_complementary (mu1,mu2)
    ! Given Mu1 in radians
    ! Find it's complemetary in radians
    IF mu1 > 0 then LET mu2 = mu1 - 2*Pi
    IF mu1 < 0 then LET mu2 = mu1 + 2*Pi
    IF mu1 = 0 then LET mu2 = 0
END SUB SUB distance (a(),b(),D)
    LET D =sqr((a(1)-b(1))^2 + (a(2)-b(2))^2 + (a(3)-b(3))^2)
END SUB
SUB check_limits (dels(),i)
    IF dels(1)> 250000 OR dels(1) < -75000 then
        PRINT "WARNING: LIMIT Joint #0  at i= ";i
    END IF
    IF dels(2)> 140000 OR dels(2) < -140000 then
        PRINT "WARNING: LIMIT Joint #1 at i = ";i
    END IF
    IF dels(3)> 0 OR dels(3) < -360000 then
        PRINT "WARNING: LIMIT Joint #2 at i= ";i
    END IF
    IF dels(4)> 60000 OR dels(4) < -60000 then
        PRINT "WARNING: LIMIT Joint #3 at i = ";i
    END IF
    IF dels(5)> 62000 OR dels(5) < -62000 then
        PRINT "WARNING: LIMIT Joint #4 at i = ";i
    END IF
    IF dels(6)> 2300 OR dels(6) < -2300 then
        PRINT "WARNING: LIMIT Joint #5 at i = ";i
    END IF
END SUB SUB angle (theta1,v1(),v2())
    DIM n(3),L1(3),L2(3)
    DECLARE DEF nn
    MAT L1= (1/ NN(V1()))*V1
    MAT L2 = (1 / NN(V2()))*V2
    CALL cross (n(),L1(),L2())
```

A-31

FILE: MOTION.TRU
LANGUAGE: TRUE-BASIC

```
        LET w1 = dot(L1,L2)
        IF abs(w1) < .00005 then
          LET theta1 = pi/2
        ELSE
          IF abs(w1 +1) <.00005 then
            LET theta1= pi
          ELSE
            LET theta1 = ATN ( nn(n()) /w1)
            IF DEG(theta1) < 0 then LET theta1 = theta1 +PI
          END IF
        END IF !call Find_complementary (mu1,mu2)

END SUB
    SUB velocity_limits (dels(), i)
        IF dels(1)> 30000 then
          PRINT "WARNING: (velocity limit) Joint #0 at segment #";i;"Velocity =";dels(1)
        END IF
        IF dels(2)> 30000 then
          PRINT "WARNING: (velocity limit) Joint #1 at segment #";i;"Velocity =";dels(2)
        END IF
        IF dels(3)> 30000 then
          PRINT "WARNING: (velocity limit) Joint #2 at segment #";i;"Velocity =";dels(3)
        END IF
        IF dels(4)> 30000 then
          PRINT "WARNING: (velocity limit) Joint #3 at segment #";i;"Velocity =";dels(4)
        END IF
        IF dels(5)> 30000 then
          PRINT "WARNING: (velocity limit) Joint #4 at segment #";i;"Velocity =";dels(5)
        END IF
        IF dels(6)> 20000 then
          PRINT "WARNING: (velocity limit) Joint #5 at segment #";i;"Velocity =";dels(6)
        END IF
        ! joint six does not need it.
    END SUB DEF v_to_$ (v)
        ! change a value to a string, that was built because str$ has already been used
        LET v_to_$ = str$(v)
    END DEF
```

FILE: MOTION.TRU
LANGUAGE: TRUE-BASIC

```
SUB generate_C_file (fname_script$,fnumber)
    DECLARE DEF v_to_$
    ! First create a C-file
    LET Cfname$ = "d:\f" & v_to_$(fnumber) & ".C"
    OPEN #88: name cfname$, organization text, create newold
    ERASE #88
    RESET # 88 :begin
    PRINT #88: "void f" & v_to_$(fnumber) & "()"
    PRINT #88: "{"

! The script file generated by the user
    LET fname$ = "c:\tuberob\" & fname_script$ & ".txt"
    OPEN #99: name fname$, organization text, create newold
    RESET #99: begin
    DO while more #99
       LINE INPUT #99: s$
       PRINT #88: s$
    LOOP
    CLOSE # 99

PRINT #88: "}"
    CLOSE #88
END SUB

EXTERNAL
!
!dim delthe(6),delthe2(6)
```

A33

*FILE: INVRS4.TRU*
*LANGUAGE: TRUE-BASIC*

```
!mat delthe = 0
!dim aa(3),ss(3),nn1(3), p(3)
!let nn1(1) = 1
!let nn1(2) = 0
!let nn1(3) =  0
!
!let ss(1) = 0
!let ss(2) = 0
!let ss(3) = -1

!let aa(1) = 0
!let aa(2) = 1
!let aa(3) = 0

!let p(1) = 3.8
!let p(2) = 9.2013
!let p(3) = 7
!
!
!call inverse (nn1(),ss(),aa(),p(),delthe(),delthe2())
!print "d1  =";delthe(1)
!print "the2 =";deg(delthe(2))
!print "d3   =";delthe(3)
!print "the4 = ";deg(delthe(4)), Deg (delthe2(4))
!print "the5 = ";deg (delthe(5)),Deg( -Delthe(5))
!print "the6 = ";deg (delthe(6)),Deg(delthe2(6))

!for i = 1 to 6
!print delthe(i),delthe2(i)
!next i
!end

SUB inverse (nn1(),ss(),aa(),p(),delthe(),delthe2())
dim deld(6)
let epsilon = .0000005
    LIBRARY "c:\tuberob\dhmatrx.trc"    ! used to be c:\k\dhmatrx.tru
    LIBRARY "c:\tuberob\yoyo.trc"
    LIBRARY "c:\tuberob\readwrit.trc"
    LIBRARY "c:\tuberob\arctan.trc"
    ! Given a line direction a
```

A34

FILE: INVRS4.TRU
LANGUAGE: TRUE-BASIC

```
! given the point P on the end effector
! ----------------------------------
DIM  w(3)
DIM A01(4,4), A12(4,4), A23(4,4),A34(4,4),A45(4,4)
DIM values$(24), Joint$(10)
! ------------------ This is to retrieve the dh-parameters
! -------------------------------------------------
LET fname$ = "menudat.tru"
DIM  d_htable (6,4)
LET a12$ = "DH_data"        ! Tor retrieve the dh-parameters
LET ooo$ ="record"
LET ccc$ = "newold"
OPEN #6:name a12$,create ccc$,organization ooo$,recsize 8
MAT READ #6 :D_Htable
CLOSE #6
! -----------------------------------------------
MAT READ joint$
DATA "P","R","P","R","R","R","","","",""
DECLARE DEF NN
! the rotation matrix goes as [n s a p]

LET R = D_Htable(6,4)   ! 2.90 for the pen   ! the spherical radius

!   PRINT " inside the real inverse "
!   MAT PRINT nn1
!   MAT PRINT ss
!   MAT PRINT aa
!   MAT PRINT p CALL give_Wrist_point (aa(),p(),R,w())
!   PRINT " the wrist point is :";
!   MAT PRINT w
  ! I will get the three varaiables ! ----------------------------------------------
! Now we're finding the first three joint variables
LET d1 = w(3)
```

A35

*FILE: INVRS4.TRU*
*LANGUAGE: TRUE-BASIC*

```
    CALL arctangent (w(1),w(2),the_second)  ! returns the angle 0>the>270 or up to
-90
    ! that is in radians  call (x,y,angle)
    !print "the_second =";deg(the_second)
    LET a2 = d_htable(2,3)     ! that is the shoulder offset distance
    !print "what I am looking for is ";d_htable(3,4)
    !print "a2 = ";a2
    !print "w(1) and w(2) are ";w(1),w(2)
    LET d3 = sqr (w(1)^2 + w(2)^2 - a2^2 - d4)   !d4 will be set to zero
    LET L = d3 + d_htable(4,4)    ! we're taking the wrist pt only
    LET the_first = Atn (Abs(L) / Abs(a2) )
    !print "the_first = ";deg (the_first)
    LET the2 = the_second - the_first
    !print " theta 2 = "; deg(the2)

LET delthe(2) = the2
    LET deld(1) = d1 - d_htable(1,4)     ! -7      ! that is d1
    LET deld(3) = d3- d_htable(3,4)      !-6.3013         ! that is d3
    ! the second the2 would be (theta2 + 180)
    LET zq = 0
    DIM T(4,4), x3(3),y3(3),z3(3)
    DIM x4(3),y4(3),z4(3),y5(3)
    FOR i = 1 to 3
       LET  the = rad (d_htable (i,1)) + delthe(i)
       LET  alp = rad (d_htable (i,2))
       LET  a = d_htable (i,3)
       LET  d = d_htable (i,4) + deld(i)
       SELECT CASE i
       CASE 1
          CALL D_HGeneration( A01(,),a,alp,d,the,joint$(i))
       CASE 2
          CALL D_HGeneration( A12(,),a,alp,d,the,joint$(i))
       CASE 3
          CALL D_HGeneration( A23(,),a,alp,d,the,joint$(i))
       END SELECT
    NEXT i MAT T = A01 * A12        ! that is to get the A03 matrix
    MAT T = T * A23          !
    FOR i = 1 to 3
       LET x3(i) = T(i,1)
```

A36

*FILE: INVRS4.TRU*
*LANGUAGE: TRUE-BASIC*

```
      LET y5(i) = T(i,2)
   NEXT i
   CALL arctan_sincos (Dot(nn1,y5),Dot(ss,y5), delthe(6))

!==================================================================
!==================================================================
   LET Mu_4 = Delthe(4) + Pi
   IF Mu_4  >= 2*Pi Then LET Mu_4 = Mu_4 - 2*PI
   LET Mu_6 = Delthe(6) + Pi
   IF Mu_6  >= 2*Pi Then LET Mu_6 = Mu_6 - 2*PI
let delthe(1) = deld(1)
let delthe(3) = deld(3)
let delthe2(1) = deld(1)
let delthe2(3) = deld(3)
! -----------------------
   LET delthe2(2) = delthe(2)
   LET delthe2(4) = Mu_4
   LET delthe2(5) = - delthe(5)
   LET delthe2(6) = Mu_6
!print " INSIDE INVRS4 "
!print " delthe1 and delthe2 are "
!mat print delthe
!mat print delthe2

END SUB

SUB give_Wrist_point (a(),p(),R,W())

LET t1 = SQR( R^2 /(a(1)^2 + a(2)^2 + a(3)^2))
   LET t2 = -t1

DIM w1(3),w2(3)
   DIM v1(3), v2(3)
   ! W is the rist point
   FOR i = 1 to 3
      LET W1(i) = P(i) + t1*(a(i))
      LET W2(i) = P(i) + t2*(a(i))
   NEXT i
!print "w1 is ";
```

A-38

FILE: INVRS4.TRU
LANGUAGE: TRUE-BASIC

```
!mat print w1
!print " W2 is ";
!mat print w2
! To check
CALL distance (w1(),p(),d1)
CALL distance (w2(),p(),d2)
!print "d1 =";d1, "d2 =";d2
MAT v1 = w1 - p
MAT v2 = w2 - p
!print "v1 and v2 are"
!mat print v1
!mat print v2
! to see in what direction are the two points !print Dot(v1,a)
!print Dot(v2,a)
IF Dot (v1,a) > 0 then  MAT w = w2  else MAT w = w1

END SUB

SUB distance (a(),b(),D)
    LET D =sqr((a(1)-b(1))^2 + (a(2)-b(2))^2 + (a(3)-b(3))^2)
END SUB
!
SUB cross (c(),a(),b())        ! that is  (a X b) = c
    PRINT " in the cross routine "
    LET c(1) = a(2)*b(3) - a(3)*b(2)
    LET c(2) = -a(1)*b(3) + a(3)*b(1)
    LET c(3) = a(1)*b(2) - a(2)*b(1)
END SUB DEF NN (y())
    LET nn =sqr(y(1)^2 + y(2)^2 + y(3)^2)
END DEF
external sub D_Hgeneration(B(,),a,alp,d,the,J$)     ! alp = alpha, the = theta
! ************************************************
! This subroutine makes available SIX homog.
```

A-34

FILE: DHmatrx.TRU
LANGUAGE: TRUE-BASIC

```
! transf. matrices.
dim  t(4,4) , tinv(4,4)    ! dummy matrices
! data for the Denav-Hartenberg Notations
! ************************************************
if j$ = "P" then           ! Prismatic joint
let t(1,1) = cos (the)
let t(1,2) = -cos(alp)*sin(the)
let t(1,3) = sin(alp)*sin(the)
let t(1,4) = 0
let t(2,1) = sin(the)
let t(2,2) = cos(alp)*cos(the)
let t(2,3) = -sin(alp)*cos(the)
let t(2,4) = 0
let t(3,1) = 0
let t(3,2) = sin(alp)
let t(3,3) = cos(alp)
let t(3,4) = d
let t(4,1)=0
let t(4,2)=0
let t(4,3)=0
let t(4,4)=1 let tinv(1,1) = cos(the)
let tinv(1,2) = sin(the)
let tinv(2,1) = -cos(alp) * sin(the)
let tinv(2,2) = cos(alp)  * cos(the)
let tinv(2,3) = sin(alp)
let tinv(2,4) = -d * sin(alp)
let tinv(3,1) = cos(alp)*sin(the)
let tinv(3,2) = -sin(alp)*cos(the)
let tinv(3,3) = cos(alp)
let tinv(3,4) = -d * cos(alp)
let tinv(4,4) = 1 end if if j$ = "R" then     ! Revolute joint
let t(1,1) = cos (the)
let t(1,2) = -cos(alp)*sin(the)
let t(1,3) = sin(alp)*sin(the)
let t(1,4) = a * cos(the)
```

A40

FILE: DHmatrx.TRU
LANGUAGE: TRUE-BASIC

```
    let t(2,1) = sin(the)
    let t(2,2) = cos(alp)*cos(the)
    let t(2,3) = -sin(alp)*cos(the)
    let t(2,4) = a * sin(the)
    let t(3,1) = 0
    let t(3,2) = sin(alp)
    let t(3,3) = cos(alp)
    let t(3,4) = d
    let t(4,4) = 1 let tinv(1,1) = cos(the)
    let tinv(1,2) = sin(the)
    let tinv(1,4) = -a
    let tinv(2,1) = -cos(alp) * sin(the)
    let tinv(2,2) = cos(alp)  * cos(the)
    let tinv(2,3) = sin(alp)
    let tinv(2,4) = -d * sin(alp)
    let tinv(3,1) = sin(alp)*sin(the)
    let tinv(3,2) = -sin(alp)*cos(the)
    let tinv(3,3) = cos(alp)
    let tinv(3,4) = - d * cos(alp)
    let tinv(4,4) = 1
    end if mat B = t
    end sub
    !
    !

!sub DH_mat_mult2(nb)
!print
!select case nb
!case 0
!mat f2 = IDN       ! Identity matrix
!case 1
!mat f2 = A01
!case 2
!mat f2 = A01 * A12
```

A41

FILE: DHmatrx.TRU
LANGUAGE: TRUE-BASIC

```
!case 3
!mat f2 = A01 * A12
!mat f2 = f2 * A23
!case 4
!mat f2 = A01 * A12
!mat f2 = f2 * A23
!mat f2 = f2 * A34
!case 5
!mat f2 = A01 * A12
!mat f2 = f2 * A23
!mat f2 = f2 * A34
!mat f2 = f2 * A45
!case 6
!mat f2 = A01 * A12
!mat f2 = f2 * A23
!mat f2 = f2 * A34
!mat f2 = f2 * A45
!mat f2 = f2 * A56
!end select
!end sub
!
sub D4vect(p(),pp())
let pp(1) = p(1)
let pp(2) = p(2)
let pp(3) = P(3)
let pp(4) = 1
end sub
sub D3vect(pp(),p())
let p(1) = pp(1)
let p(2) = pp(2)
let p(3) = pp(3)
end sub
!
```

EXTERNAL

!dim n(3), s(3), a(3)

A42

*FILE: EULER.TRU*
*LANGUAGE: TRUE-BASIC*

```
!dim nt(3), st(3), at(3)
!dim EULER_R(3,3)

!let n(1) = 1
!let s(3) = -1
!let a(2) = 1

!let p = pi
!let t = pi/2
!let f = pi

!call EULER_INVERSE (n(),s(),a(),psi,theta,phi)
!print " psi, theta , phi "
!print deg(psi), deg(theta), deg(phi)

!let Cf = Cos(f)
!let Sf = Sin(f)
!let Cp = Cos(p)
!let Sp = Sin(p)
!let Cth = Cos(t)
!let Sth = Sin(t)
!
!let nt(1) = Cf*Cp - Sf*Cth*Sp
!let nt(2) = Sf*Cp+Cf*Cth*Sp
!let nt(3) = Sth*Sp !let st(1) = -Cf*Sp-Sf*Cth*Cp
!let st(2) = -Sf*Sp + Cf*Cth*Cp
!let st(3) = Sth*Cp
!
!let at(1) = Sf*Sth
!let at(2) = -Cf*Sth
!let at(3) = Cth !mat print EULER_R
!for i = 1 to 3
!print nt(i),st(i),at(i)
!next i
!end ! Given n, s, a   : Find the EULER angle solution
```

A43

*FILE: EULER.TRU*
*LANGUAGE: TRUE-BASIC*

```
! I will follow the method of Paul et. al in 1981 and explained in the
! book by Fu, Gonzalez and Lee on , section (2.3).
! -------------------------------------------------------
! NOTE: I shall also use the postmultiplication on P. 56
! -------------------------------------------------------
! WORK IN RADIANS
! ------------------------------------------------------- sub EULER_INVERSE (n(),s(),a(),psi,theta,phi)
! It calculate the Inverse euler rotation matrix.

library "c:\tuberob\arctan.trc"
! Loads The arc tan library ...

call arctangent(s(3),n(3),psi)
let y = n(3)* Sin(psi) +s(3)*Cos(psi)
call arctangent(a(3),y,theta)
let x3 = n(1)*Cos(psi) - s(1) * Sin(psi)
let y3 = n(2)*Cos(psi) - s(2) * Sin(psi)
call arctangent (x3,y3,phi)
end sub
```

EXTERNAL

*FILE: ARC_PTS.TRU*
*LANGUAGE: TRUE-BASIC*

```
!open #3: screen 0,1,0,1
!dim PTS(11,3)
!dim p1(3),Ca(3),P2(3)
!set mode "ega"
!call perswindow (0,20000,0,20000,0,20000,work$)
!call ticks3 (10000,10000,10000,work$)
!let P1(1) = 3.8
!let P1(2) = 8.5
!let P1(3)= 7

!let P2(1)= 3.8
!let P2(2)= 8.5
!let P2(3)= 10
!let segment = 10
!let Ca(1) = 3.8
!let Ca(2) = 8
!let Ca(3) = 8.5
!
!LET U = 0
!let color$ = "cyan"
!let I = 1
!
!call Draw_Ssec (P1(),Ca(),P2(),pts(,),segment)
!ALSO the routine to find pts on a line exists here.
!call  points_on_line (p1(),p2(),pts(,))
!print "the points are "
!mat print pts
!print "I am done"
!

!end sub Draw_Ssec (P1(),Ca(),P2(),PTS(,),segment)
! u ===> (0,1)  Include color, do not include color
! L ===> (0,1)  Draw conecting line , Do not Draw line
library "c:\tuberob\yoyo.trc"
!print " inside arc_pts "
!mat print p1
!mat print ca
```

FILE: ARC_PTS.TRU
LANGUAGE: TRUE-BASIC

```
!mat print p2 library "c:\tuberob\triadyoy.trc"
!library "c:\tb3dgraf\3dlib.trc"
!call ticks3 (1,1,1,work$)
dim N(3),V1(3),V2(3),VV2(3)
dim H(3)
DIM PTS2(2,3)
FOR I = 1 TO 3
    LET PTS2(1,I)= p1(I)
    LET PTS2(2,I)=P2(I)
NEXT I
mat v1 = P1 - Ca
mat v2 = P2 - Ca
declare def NN
let R = NN (V1())
mat V1 = (1/NN(V1()))*V1
mat V2 = (1/NN(V2()))*V2
!print " v1 and v2 are "
!mat print v1
!mat print v2
dim a(3)
mat h = 1
dim R1ab(3,3),P1ab(3)
call cross (N(),v1(),v2())
mat N = (1/NN(N()))*N
call angle (alp,v1(),v2())

call cross (VV2(),N(),v1())

FOR i = 1 to 3
        LET R1ab(i,1)=N(i)
        LET R1ab(i,2)=V1(i)
        LET R1ab(i,3)=VV2(i)
    NEXT i
    MAT P1ab = Ca
let dm = alp/segment for the = 0 to alp step dm
let a(1) =0
```

A46

FILE: ARC_PTS.TRU
LANGUAGE: TRUE-BASIC

```
    let a(2) =R * cos(the)
    let a(3) =R * sin(the)
    !print " a for ssec = ";
    call transform_b_a_1(a())

let z = z +1
    for i = 1 to 3
    let pts(z,i) = a(i)
    next i
    next the

!call matlines3 (pts(,),work$)
        SUB transform_b_a_1 (h())
            MAT h = R1ab * h
            MAT h = h + P1ab
        END SUB
    end sub sub points_on_line (p1(),p2(),pts(,),segment)
    for t = 1 to segment + 1
    for i = 1 to 3 let pts(t,i) = p1(i) + ((t-1)/segment)*(p2(i) - p1(i))

next i next t
    end sub
```

A47

*FILE: DIRECT.TRU*
*LANGUAGE: TRUE-BASIC*

```
library "c:\tuberob\menu_in.tru"
library "c:\tuberob\dh_table.tru"
!library "c:\k\dhmatrx.tru"
dim D_Htable(10,4), joint$(10)
dim pa1(3),pat(3)
let Nj = 6
call Point_on_what_joint (Pa1(),Nj)
mat read joint$
data "P","R","P","R","R","R","","","",""
print "Enter file name"
call DHmenu2 (Nj,D_htable(,))

dim deltheta(6),delD(6)

call input_joint_variables (d1,the2,d3,the4,the5,the6)
let delD(1) = d1
let deltheta(2) = the2
let delD(3) = d3
let deltheta(4) = the4
let deltheta(5) = the5
let deltheta(6) = the6 call calc_matrices (fname$,d_htable(,),Nj,joint$(),deltheta(),delD(),pa1(),work$)
!clear mat print pa1
end sub calc_matrices (fname$,dh_table(,),Nj,joint$(),deltheta(),delD(),pa1(),work$)
library "c:\k\DHmatrx.tru"
!LIBRARY "c:\k\yoyo.tru"

dim A01(4,4),A12(4,4),A23(4,4),A34(4,4),A45(4,4),A56(4,4)
dim f1(4,4)
for i = 1 to Nj
let the = RAD (DH_table(i,1) + deltheta(i))    !THETA(i)
let alp = RAD(DH_table(i,2))                   !ALPHA(i)
let a   = DH_table(i,3)                        !A(i)
```

A48

FILE: DIRECT.TRU
LANGUAGE: TRUE-BASIC

```
    let d   = DH_table(i,4)  +delD(i)            !D(i)

select case i
    case 1
    call D_HGeneration( A01(,),a,alp,d,the,joint$(i))
    mat print A01
    case 2
    call D_HGeneration( A12(,),a,alp,d,the,joint$(i))
    mat print A12
    case 3
    call D_HGeneration( A23(,),a,alp,d,the,joint$(i))
    mat print A23
    get key uu
    case 4
    call D_HGeneration( A34(,),a,alp,d,the,joint$(i))
    case 5
    call D_HGeneration( A45(,),a,alp,d,the,joint$(i))
    case 6
    call D_HGeneration( A56(,),a,alp,d,the,joint$(i))
    end select
    next i call DH_mat_mult1(Nj)
    !call DH_mat_mult1(6)

!call transf_FF_global (FFa1(,),F1(,))
    call transf_to_global (Pa1(),F1(,))
    clear
    get key uu
    print " The A06 matrx is "
    mat print F1 let a12$ = "rotation.dat"
    let ooo$ ="record"
    let ccc$ = "newold"
    open #6:name a12$,create ccc$,organization ooo$,recsize 8
    erase #6
    mat write #6 :F1
```

A49

FILE: DIRECT.TRU
LANGUAGE: TRUE-BASIC close #6

! *********************************************************
! sub DH_mat_mult is the multiplication routine
! for transferring each point to GLOBAL COORDINATES
! ********************************************************* sub DH_mat_mult1(nb)

print
select case nb
case 0
   mat f1 = IDN          ! Identity Matrix
case 1
   mat f1 = A01
case 2
   mat f1 = A01 * A12
case 3
   mat f1 = A01 * A12
   mat f1 = f1 * A23
case 4
   mat f1 = A01 * A12
   mat f1 = f1 * A23
   mat f1 = f1 * A34
case 5
   mat f1 = A01 * A12
   mat f1 = f1 * A23
   mat f1 = f1 * A34
   mat f1 = f1 * A45
case 6
   mat f1 = A01 * A12
   mat f1 = f1 * A23
   mat f1 = f1 * A34
   mat f1 = f1 * A45
   mat f1 = f1 * A56
end select
end sub
!
! ****************************************************

A50

FILE: DIRECT.TRU
LANGUAGE: TRUE-BASIC

```
sub transf_to_global (p(),F(,))
dim pp(4)
dim q(4)
call D4vect(p(),pp())
mat q = f * pp
call D3vect(q(),p())
end sub

! ***************************************************

!sub transf_FF_global (FF(,),F(,))
!dim pp(4)
!dim q(4),p(3)
!for j = 1 to size(FF,2)
!for i = 1 to 3
!let P(i) = FF(i,j)
!next i !call D4vect(p(),pp())
!mat q = f * pp
!call D3vect(q(),p())

!for i = 1 to 3
!let  FF(i,j) = P(i)
!next i
!next j
!end sub
! ***************************************************
sub D4vect(p(),pp())
let pp(1) = p(1)
let pp(2) = p(2)
let pp(3) = P(3)
let pp(4) = 1
end sub sub D3vect(pp(),p())
let p(1) = pp(1)
let p(2) = pp(2)
let p(3) = pp(3)
end sub
end sub
```

A51

FILE: MENU_IN.TRU
LANGUAGE: TRUE-BASIC

```
external
!
!call input_joint_variables (d1,the2,d3,the4,the5,the6)
!print d1,the2,d3,the4,the5,the6
!print
!dim Pa1 (3)
!call point_on_what_joint (pa1(), Nj)
!print Nj
!mat print Pa1
!end sub input_joint_variables (d1,the2,d3,the4,the5,the6)
LIBRARY "c:\tb\forms\formlib.trc"
LIBRARY "c:\tb\forms\interpt.trc"
LIBRARY "c:\tuberob\readwrit.tru"
DIM keys(2)
MAT READ keys
DATA 315, 324              !F1, F10

DIM image$(14), values$(6), types$(6)
MAT READ image$
ASK mode mode$
IF mode$="MONO" then
   LET formcolor$ = "blue"         !monochrome systems
   LET hicolor$   = "black/white"
   LET errcolor$  = "white/black/blink"
ELSE
   LET formcolor$ = "black/cyan"   !color adaptor systems
   LET hicolor$   = "white/black"
   LET errcolor$  = "red/black/blink"
END IF OPEN #1: screen 0,1,.12,1      !form window
OPEN #2: screen 0,1,0,.08      !error message window
SET color errcolor$ LET start = 1                  !start with field #1
DO
   WHEN error in
      LET flag=0
```

*FILE: MENU_IN.TRU*
*LANGUAGE: TRUE-BASIC*

```
let fname$ = "jointdat"

call reading (values$(),fname$)
      CALL FormKey(#1,#2,image$,values$,types$,formcolor$,hicolor$,start,keys)
call writing (values$(),fname$)
let d1 = val(values$(1))
let the2 = val(values$(2))
let d3 = val(values$(3))
let the4 = val(values$(4))
let the5 = val(values$(5))
let the6 = val(values$(6))
   USE
!     CALL KeyStroke2(Extype,start)    !handle the exit key
      LET flag=1
   END WHEN LOOP until flag=0           !loop until form correctly entered

CLEAR

DATA "
DATA "              | Joint Variables Input |
DATA "
DATA "
DATA "
DATA "    Joint # 1: Prismatic  _____  (inch)
DATA "    Joint # 2: Revolute   _____  (Degrees)
DATA "    Joint # 3: Prismatic  _____  (inch)
DATA "    Joint # 4: Revolute   _____  (Degrees)
DATA "    Joint # 5: Revolute   _____  (Degrees)
DATA "    Joint # 6: Revolute   _____  (Degrees)
DATA "
DATA "
DATA "        F1 -- Help              F10 -- Change Colors END sub sub point_on_what_joint (pa1(), Nj)
```

A53

FILE: MENU_IN.TRU
LANGUAGE: TRUE-BASIC

```
LIBRARY "c:\tb\forms\formlib.trc"
LIBRARY "c:\tb\forms\interpt.trc"
LIBRARY "c:\tuberob\readwrit.tru"
DIM keys(2)
MAT READ keys
DATA 315, 324            !F1, F10

DIM image$(14), values$(4), types$(4)
MAT READ image$
ASK mode mode$
IF mode$="MONO" then
   LET formcolor$ = "blue"         !monochrome systems
   LET hicolor$   = "black/white"
   LET errcolor$  = "white/black/blink"
ELSE
   LET formcolor$ = "black/cyan"  !color adaptor systems
   LET hicolor$   = "white/black"
   LET errcolor$  = "red/black/blink"
END IF OPEN #1: screen 0,1,.12,1     !form window
OPEN #2: screen 0,1,0,.08     !error message window
SET color errcolor$ LET start = 1                 !start with field #1
DO
   WHEN error in
      LET flag=0
let fname$ = "pointdat"

call reading (values$(),fname$)
      CALL FormKey(#1,#2,image$,values$,types$,formcolor$,hicolor$,start,keys)
call writing (values$(),fname$)
let pa1(1) = val(values$(1))
let pa1(2) = val(values$(2))
let pa1(3) = val(values$(3))
let Nj = val(values$(4))
   USE
!      CALL KeyStroke2(Extype,start)  !handle the exit key
      LET flag=1
   END WHEN
```

FILE: MENU_IN.TRU
LANGUAGE: TRUE-BASIC

```
LOOP until flag=0         !loop until form correctly entered

CLEAR

DATA "                                                              "
DATA "     ┌─────────────────────────────┐                          "
DATA "     │     Point input data        │                          "
DATA "     └─────────────────────────────┘                          "
DATA "▔▔▔▔▔▔▔▔▔▔▔▔▔▔▔▔▔▔▔▔▔▔▔▔▔▔▔▔▔▔▔▔▔▔▔▔▔▔▔▔▔▔▔▔▔▔▔▔▔▔▔▔▔▔▔▔▔▔▔▔▔"
DATA "│                                                            │"
DATA "│    The Coordinates of the point in question with respect   │"
DATA "│    to local coordinates                                    │"
DATA "│              x-coordinate _____ (inch)                  │"
DATA "│              y-coordinate _____ (inch)                  │"
DATA "│              z-coordinate _____ (inch)                  │"
DATA "│                                                            │"
DATA "│    And the link is number          ____    (1 to 6)        │"
DATA "│                                                            │"
DATA "▕▔▔▔▔▔▔▔ F1 -- Help ▔▔▔▔▔▔▔▔▔▔▔▔▔ F10 -- Change Colors ▔▔▔▔▔▔▏"

END sub
```

FILE: n_scrpt.TRU
LANGUAGE: TRUE-BASIC

```
library "c:\tuberob\script.trc"
dim values$(18)
open #21: name "d:\l_name.txt", organization text, create newold
reset #21: BEGIN
for i = 1 to 3
input #21: a$
let fname$ = fname$ & a$
print fname$
next i
let fname$ = "c:\tuberob\" & fname$ & ".txt"
print fname$
close #21
open #10: name fname$, organization text, create newold
erase #10
reset #10: BEGIN call TR_editor (values$())
for i = 1 to 18
if values$(i) = "" then     ! don't do anything
else
print #10:values$(i)
end if
next i
close # 10
end
```

*FILE: e_scrpt.truTRU*
*LANGUAGE: TRUE-BASIC*

```
library "c:\tuberob\script.trc"
dim values$(18)
let zq = 0
! figure out the name of the script
open #21: name "d:\l_name.txt", organization text, create newold
reset #21: BEGIN
for i = 1 to 3
input #21: a$
let fname$ = fname$ & a$ next i
let fname$ = "c:\tuberob\" & fname$ & ".txt"

close #21
!
open #10: name fname$, organization text, create newold
reset #10: BEGIN do while more #10
let zq = zq + 1
line input #10:values$(zq)
loop call TR_editor (values$())
erase #10
for i = 1 to 18
if values$(i) = "" then    ! don't do anything
else
print #10:values$(i)
end if
next i
close #10
end
```

*FILE: REVERSE.TRU*
*LANGUAGE: TRUE-BASIC*

```
external
! called by motion
!call reverse
!end sub reverse
dim arr(20)
Dim line$(1)  ! the positions
! This will read the amount of move commands
open #10: name "d:\capacity.txt",access "input", organization text,  create "old"
reset #10: BEGIN
input #10 :number    ! number = count
let count = number
mat line$ = Nul$(number)     ! redimensioning the line$ matrix let s = 0

! This will read the file d:\cripts.txt and create the file cripts_2.txt
open #24: name "d:\cripts_2.txt", organization text,  create "newold"
erase #24
reset #24: BEGIN
open #23: name "d:\cripts.txt",access "input", organization text,  create "old"
reset #23: BEGIN
for c = 1 to 20
input #23 :cript$   ! Read from the original
let arr(c) = val(cript$)
if arr(c) = 99 then exit for
print #24: cript$
next c    ! The loop will exit with the (number of criptic locations + 1)=c
close #23    ! d:\cripts.txt ! This also handles the case where no cripts exist (just 99)
for i = c-1 to 1 step -1
if arr(i) = count then
! don't do anything
else
let arr(i) = count + (count - arr(i))
print #24: str$(arr(i))
end if
next i
print #24: "99"
```

FILE: REVERSE.TRU
LANGUAGE: TRUE-BASIC

```
close #24    ! d:\cripts_2.txt

! This will read the file d:\inserts.txt and creates the file inserts2.txt
open #27: name "d:\inserts2.txt", organization text,  create "newold"
erase #27
reset #27: BEGIN
open #26: name "d:\inserts.txt",access "input", organization text,  create "old"
reset #26: BEGIN
input #26: initial_grip$    ! the status of the 0-position
input #26: ins$             ! the 0-line (does not mean much)
print #27: initial_grip$
print #27: ins$
for c = 1 to 20
input #26 : ins$      ! Read from the original
let arr(c) = val(ins$)
if arr(c) = 99 then exit for
print #27: ins$
next c   ! The loop will exit with the (number of criptic locations + 1)=c !  NOTE: (c-1) is the last entry close #26    ! d:\inserts.txt
for i = c-2 to 1 step -1    ! pivot at the the location before the last entry
let arr(i) = count + (count - arr(i))
print #27: str$(arr(i))
next i
if c <= 1 then
!don't do anything
else
print #27:str$(2*count)
end if
print #27: "99"
close #27    ! d:\inserts2.txt ! This will read the initial position of the joints
open #13: name "d:\initial.txt",access "input", organization text,  create "old"
reset #13: BEGIN
input #13 :line0$
```

*FILE: REVERSE.TRU*
*LANGUAGE: TRUE-BASIC*

```
let lineo$ = Ltrim$(line0$)
close #13 mat line$ = nul$(number)
! This will read the move commands
open #9: name "d:\read_C.txt" , organization text,  create "old"
set #9: margin 250
set #9: zonewidth 10
reset #9: BEGIN
for i = 1 to number line input #9: line$(i)
next i
reset #9:end
close #9 open #12: name "d:\read_C2.txt" , organization text,  create "newold"
erase #12
set #12: margin 250
set #12: zonewidth 10
reset #12: BEGIN
open #66: name "d:\read_C3.txt" , organization text,  create "newold"
erase #66
set #66: margin 250
set #66: zonewidth 10
reset #66: BEGIN
for i = 1 to number
print  #12: line$(i)
print  #66: line$(i)
next i
! 1,2,3,4 will become 1,2,3,4,3,2,1  we took off the middle 4
for i = number-1 to  1 step -1
print  #12: line$(i)[1:59];line$(i+1)[60:250]
next i
! writing the initial coordinates
let last$ = line0$ &" "& line$(1)[60:250]
print #12:last$
close #12
close #66
end sub
```

FILE: Rotate.TRU
LANGUAGE: TRUE-BASIC

EXTERNAL

```
!dim n(3),s(3),a(3)
!dim n2(3),s2(3)
!dim p(3),ipoint(3)
!let n(1) =1
!let n(2) = 0
!let n(3) =0
!
!let s(1) =0
!let s(2) =0
!let s(3) =1

!let a(1) =0
!let a(2) =-1
!let a(3) =0

!let p(1) = 3
!let p(2) = 4
!let p(3) = 5
!
!call rotate_insertion (n(),s(),a(), ipoint(),p())
!print "ipoint =";
!mat print ipoint !
!let R_angle = 45
!
!
!call rotate (n(),s(),a(),n2(),s2(),R_angle)
!print "n2 = ";
!mat print n2
!
!print "s2 = ";
!mat print s2
!end sub rotate (n(),s(),a(),n2(),s2(),R_angle)
```

A-6 /

```
FILE: Rotate.TRU
LANGUAGE: TRUE-BASIC

! given n() s() a() rotate around a() with an angle R_angle(degrees)
! and return nn() and ss() only since mat aa = a
! use Euler-Lexelle Formula
DECLARE DEF NN let the = RAD(R_angle)
let V = 1 - Cos(the)
let C = Cos(the)
let SS = Sin(the)
! No need to calculate a2 since we are rotating about a2....
!let a2(1)=(V*a(1)*a(1)+C)*a(1)+(V*a(1)*a(2)-a(3)*SS)*a(2)+(V*a(1)*a(3)+a(2)*SS)*a(3)
!let a2(2)=(V*a(1)*a(2)+a(3)*SS)*a(1)+(V*a(2)*a(2)+C)*a(2)+(V*a(2)*a(3)-a(1)*SS)*a(3)
!let a2(3)=(V*a(1)*a(3)-a(2)*SS)*a(1)+(V*a(2)*a(3)+a(1)*SS)*a(2)+(V*a(3)*a(3)+C)*a(3)

let s2(1)=(V*a(1)*a(1)+C)*s(1)+(V*a(1)*a(2)-a(3)*SS)*s(2)+(V*a(1)*a(3)+a(2)*SS)*s(3)
let s2(2)=(V*a(1)*a(2)+a(3)*SS)*s(1)+(V*a(2)*a(2)+C)*s(2)+(V*a(2)*a(3)-a(1)*SS)*s(3)
let s2(3)=(V*a(1)*a(3)-a(2)*SS)*s(1)+(V*a(2)*a(3)+a(1)*SS)*s(2)+(V*a(3)*a(3)+C)*s(3)

let n2(1)=(V*a(1)*a(1)+C)*n(1)+(V*a(1)*a(2)-a(3)*SS)*n(2)+(V*a(1)*a(3)+a(2)*SS)*n(3)
let n2(2)=(V*a(1)*a(2)+a(3)*SS)*n(1)+(V*a(2)*a(2)+C)*n(2)+(V*a(2)*a(3)-a(1)*SS)*n(3)
let n2(3)=(V*a(1)*a(3)-a(2)*SS)*n(1)+(V*a(2)*a(3)+a(1)*SS)*n(2)+(V*a(3)*a(3)+C)*n(3)
! normalize the vectors
mat n2 = (1/ NN(n2())) * n2
mat s2 = (1/ NN(s2())) * s2
end sub sub rotate_insertion (n(),s(),a(), ipoint(),p())
! given n() s() a() of the ECS -coordinate system
! and given a point in the ECS the routine returns the insertion point
! in the WCS.

let ipoint(1) = n(1)*p(1) + s(1)*p(2) + a(1)*p(3)
let ipoint(2) = n(2)*p(1) + s(2)*p(2) + a(2)*p(3)
let ipoint(3) = n(3)*p(1) + s(3)*p(2) + a(3)*p(3)

end sub def NN (y())
let nn =sqr(y(1)^2 + y(2)^2 + y(3)^2)
end def
```

A 62

FILE: Script.TRU
LANGUAGE: TRUE-BASIC

EXTERNAL

```
sub TR_editor (values$())
LIBRARY "c:\tb\forms\formlib.trc"
LIBRARY "c:\tb\forms\interpt.trc"
DIM keys(2)
MAT READ keys
DATA 315, 324              !F1, F10

DIM image$(21), types$(18)
MAT READ image$
ASK mode mode$
IF mode$="MONO" then
   LET formcolor$ = "blue"       !monochrome systems
   LET hicolor$   = "black/white"
   LET errcolor$  = "white/black/blink"
ELSE
   LET formcolor$ = "red/cyan"   !color adaptor systems
   LET hicolor$   = "white/yellow"
   LET errcolor$  = "red/black/blink"
END IF OPEN #1: screen 0,1,.12,1     !form window
OPEN #2: screen 0,1,0,.08     !error message window
SET color errcolor$ LET start = 1                 !start with field #1
DO LET flag=0

CALL FormKey(#1,#2,image$,values$,types$,formcolor$,hicolor$,start,keys)
```

A-63

FILE: Script.TRU
LANGUAGE: TRUE-BASIC

```
LOOP until flag=0          !loop until form correctly entered

CLEAR

DATA "▇▇▇▇▇▇▇▇▇▇▇▇▇▇▇▇▇ TUBE ROB EDITOR ▇▇▇▇▇▇▇▇▇▇▇▇▇▇▇▇▇▇▇▇"
   DATA "▌                                                     ▐"
   DATA "▌ _____   ▐"
   DATA "▌ _____   ▐"
   DATA "▌ _____   ▐"
   DATA "▌ _____   ▐"
   DATA "▌ _____   ▐"
   DATA "▌ _____   ▐"
   DATA "▌ _____   ▐"
   DATA "▌ _____   ▐"
   DATA "▌ _____   ▐"
   DATA "▌ _____   ▐"
   DATA "▌ _____   ▐"
   DATA "▌ _____   ▐"
   DATA "▌ _____   ▐"
   DATA "▌ _____   ▐"
   DATA "▌ _____   ▐"
   DATA "▌ _____   ▐"
   DATA "▌ _____   ▐"
   DATA "▌ _____   ▐"
   DATA "▌ _____   ▐"
   DATA "▇▇▇▇▇ MOVE using arrows ▇▇▇ <ENTER> when done ▇▇▇▇▇▇▇▇"

END sub
```

FILE: YOYO.TRU
LANGUAGE: TRUE-BASIC

```
external

! SUB    YOYO.TRU
! ************************************************************
! This routine contains the following:
! T2_polygons
! two_polygons
! vectors
! Normal
! Cross
! Angle
! Signs
! In_or_out
! On_ends
! In_sector
! Above_or_Below
! V_Point_Line
! Line_Sphere
! Arc_polygon
! distance
! ************************************************************
!dim a(3,5)
!mat read a
!data 0,0,0,0,0
!data 0,0,3,3,0
!data 0,3,3,0,0
!
!dim b(3,4)
!mat read b
!data 0,-2,2,0
!data -1,2,2,-1
!data 1,1,1,1
!dim temp2(3,5)

!call T2_polygons (b(,),a(,),temp2(,),zq)
!mat print temp2
!print "there was zq = ";zq
!end
```

FILE: YOYO.TRU
LANGUAGE: TRUE-BASIC

```
sub T2_polygons (b(,),a(,),temp2(,),zq)
call Two_polygons (b(,),a(,),temp2(,),ZQ)
call Two_polygons (a(,),b(,),temp2(,),ZQ)
end sub !dim ffa1(3,5)
!mat read ffa1
!data 0,0,7,7,0
!data 0,2,2,0,0
!data 1,1,1,1,1
!
!
!call Two_polygons (ff2(,),ff1(,),temp2(,),ZQ)
!mat print temp2
!print "zq = ";zq
!end
!

!dim pa1(3),c1(3)
!dim pa2(3)
!let pa1(1)=.293
!let pa1(2)=0
!let pa1(3)=.293
!
!let c1(1)=1
!let c1(2)=0
!let c1(3)=1
!
!let Pa2(1)=.293
!let pa2(2)=0
!let pa2(3) =1.707
!
!dim temp(3,4)
!call ARC_POLYGON (pa1(),c1(),pa2(),fFA1(,),f$,temp(,),zq)
!

!mat print temp
!end
```

*A66*

*FILE: YOYO.TRU*
*LANGUAGE: TRUE-BASIC*

```
! ---------------------------------------------
! sbroutine 2 polygons checks if two polygons interfere
! ---------------------------------------------
SUB Two_polygons (ff1(,),ff2(,),temp2(,),ZQ)
library "c:\k\Give_Nor.tru"
dim N2(3)

call Give_Normal (ff2(,),N2())
    DIM q1(3),q2(3),q(3),pm(3)
    LET u = ubound(ff1,2)-1
!print " I came here and u =";u
    FOR PP = 1 TO U
        FOR I = 1 TO 3
            LET Q1(I) = FF1(I,PP)
            LET Q2(I) =FF1(I,PP+1)
        NEXT I
        MAT Q = Q2 - Q1
        IF  ABS(DOT(Q,N2)) <.005 THEN
            print "           "    !    line parallel!"
        ELSE
            LET S = N2(1)*FF2(1,1) + N2(2)*FF2(2,1) + N2(3)*FF2(3,1)-DOT(Q1,N2)
            LET T = S / DOT(Q,N2)
!           PRINT " FOR T # ";PP, " T WAS =";T
            IF T >= -.005  AND T <=1.005 THEN
                FOR I = 1 TO 3
                    LET PM(I) = Q1(I) + Q(I) *T
                NEXT I
                CALL IN_OR_OUT (PM(),A$,FF2(,),N2())
                IF A$ = "IN" THEN
                    LET ZQ = ZQ + 1
                    FOR I = 1 TO 3
                        LET TEMP2(I,ZQ) = PM(I)
                    NEXT.I
                END IF
            END IF
        END IF
    NEXT PP
END SUB
```

FILE: YOYO.TRU
LANGUAGE: TRUE-BASIC

```
! +++++++++++++++++++++++++++++++++++++++++++++++++
! Takes any three points and returns 2 Vectors
! ---------------------------------------
SUB vectors(g1(),g2(),p1(),p2(),p3())
    MAT g1=p1-p2
    MAT g2=p3-p2
END SUB
! ---------------------------------------
! takes Any three points on one plane
! Returns the Normal
! ---------------------------------------
SUB normal (m(),q1(),q2(),q3())
    DIM p12(3) , p32(3)
    MAT p12 = q1-q2
    MAT p32 = q3 -q2
    CALL cross (m(),p12(),p32())
END SUB
! ---------------------------
! Calculates the cross product of Two vectors
! ---------------------------
SUB cross (q(),p5(),p2())
    LET q(1) = p5(2)*p2(3) - p5(3)*p2(2)
    LET q(2) = -p5(1)*p2(3) + p5(3)*p2(1)
    LET q(3) = p5(1)*p2(2) - p5(2)*p2(1)
END SUB
! ---------------------------
! sUB angle
! Calculates the Angle between any two vectors   <180, >0
! in Radians
! -----------------------------------------
SUB angle (theta1,v1(),v2())
    DIM n(3),L1(3),L2(3)
    DECLARE DEF nn
    MAT L1= (1/ NN(V1()))*V1
    MAT L2 = (1 / NN(V2()))*V2
    CALL cross (n(),L1(),L2())
    LET w1 = dot(L1,L2)
    IF abs(w1) < .005 then
       LET theta1 = pi/2
    ELSE
       IF abs(w1 +1) <.005  then
```

A68

*FILE: YOYO.TRU*
*LANGUAGE: TRUE-BASIC*

```
        LET theta1= pi
      ELSE
        LET theta1 = ATN ( nn(n()) /w1)
        IF DEG(theta1) < 0 then LET theta1 = theta1 +PI
      END IF
    END IF
END SUB
! ---------------------------------------

DEF NN(d())
   LET NN = SQR((d(1))^2 + (d(2))^2 +(d(3))^2 )
END DEF
! ---------------------------------------

SUB signs( n11(),n12(),sve)
   DIM n10(3)
   LET sve = 1
   FOR i = 1 to 3
      LET n10(i) = n11(i) * n12(i)
      IF sgn(n10(I)) = -1 then LET sve = -1
   NEXT i
END SUB
! ---------------------------------------
SUB in_or_out (pm(),a$,fw(,),n22())
   DIM p1(3),p2(3),A1(3),A2(3),n33(3)
   LET sumtheta = 0
   LET w =size(fw,2)-1
   FOR i1 = 1 to w
      FOR i = 1 to 3
         LET p1(i) = fw(i,i1)
         LET p2(i) = fw(i,i1+1)
      NEXT i
      CALL on_ends (pm(),p1(),p2(),o$)
      IF o$ ="ON" then
         LET sumtheta = 360
      ELSE
         CALL vectors (A1(),A2(),p1(),pm(),p2())
         CALL cross (n33(),A1(),A2())
         CALL angle ( tht,A1(),A2())
```

A69

*FILE: YOYO.TRU*
*LANGUAGE: TRUE-BASIC*

```
            CALL signs (n33(),n22(),de)
            LET tht = DEG(tht) * de
            LET sumtheta = sumtheta + tht
         END IF
      NEXT i1
      IF abs(sumtheta) > 350 then
         LET a$ = "IN"
      ELSE
         LET a$ = "out"
      END IF
END SUB
! ---------------------------------------------------
! On_ends    === Checks if a point is on the endpoints
! ---------------------------------------------------
SUB ON_ends (pm(),p1(),p2(),o$)
   DIM v1(3),v2(3)
   MAT v1 = p1-pm
   MAT v2 = p2-pm
   IF abs(v1(1))<=.005 and abs(v1(2))<=.005 and abs(v1(3))<=.005 then
      LET o$ ="ON"
   END IF
   IF abs(v2(1))<=.005 and abs(v2(2))<=.005 and abs(v2(3))<=.005 then
      LET o$ ="ON"
   END IF

END SUB

! ---------------------------------------------------
! SUB IN_SECTOR checks if a point is in a sector of a circle
! ---------------------------------------------------
SUB IN_SECTOR(s(),f1(),fc(),f2(),aa$)

DIM m(3),v1(3),v2(3),v(3),q(3)
   DECLARE DEF nn
   CALL on_ends (s(),f2(),f1(),w$)
!    CALL on_ends (s(),fc(),f1(),w1$)     I don't know why I put it in the first place
if w1$ ="ON" then
let aa$="OUT"
else
   IF w$="ON"  then
      LET aa$ ="IN"
```

A-70

*FILE: YOYO.TRU*
*LANGUAGE: TRUE-BASIC*

```
      ELSE
         MAT m=f1+f2
         MAT m = .5 * m
         MAT v1 = f1 - fc
         MAT v2 = f2 - fc
         MAT v = m - fc
         MAT q = s - fc
         CALL angle (theta1 ,v1(),v2())
         !                     missing a check
         LET theta1 = theta1 / 2
         CALL angle (theta2,v(),q())
         IF theta2 <=theta1 +.005 and nn(q()) <=nn(v1())+.005 then
            LET aa$ ="IN"
         ELSE
            LET aa$="OUT"
         END IF
      END IF
   end if
END SUB ! ------------------------------------------------------
! SUB ABOVE_OR_BELOW    Checks if a point is above a line
!                       or below it w.r.t. a normal
! ------------------------------------------------------
SUB ABOVE_OR_BELOW (p1(),p2(),N(),p(),p$)
   DIM m(3),k(3),v(3)
   CALL V_POINT_LINE (p(),p1(),p2(),v())
   LET s = 0
   FOR i = 1 to 3
      IF abs(v(i))<=.005 then LET s= s +1
   NEXT i
   IF s = 3 then
      LET p$ = "ABOVE"
   ELSE
      MAT m = p2-p1
      CALL cross (k(),v(),m())
      LET sve = 1
      FOR i = 1 to 3
         IF abs(k(i)*n(i)) >=.005 and SGN(k(i)*n(i)) = -1 then
            LET sve = -1
         END IF
```

A 71

FILE: YOYO.TRU
LANGUAGE: TRUE-BASIC

```
    NEXT i
    IF sve = -1 then
       LET p$="ABOVE"
    ELSE
       LET p$="BELOW"
    END IF
  END IF
END SUB ! ----------------------------------------------------
! SUB V_POINT_LINE  creates a vector from a point to a line
! ----------------------------------------------------
SUB V_POINT_LINE (pm(),p1(),p2(),v())
    DIM w(3)
    DECLARE DEF nn
    LET t1 = -(p2(1)-p1(1))*(p1(1)-pm(1))
    LET t2 = -(p2(2)-p1(2))*(p1(2)-pm(2))
    LET t3 = -(p2(3)-p1(3))*(p1(3)-pm(3))
    LET s = (p2(1)-p1(1))^2+(p2(2)-p1(2))^2+(p2(3)-p1(3))^2
    LET t = (t1 + t2 + t3)/s
    FOR i = 1 to 3
       LET w(i) = p1(i) +(p2(i) - p1(i))*t
    NEXT i
    MAT v = w-pm
    IF abs(nn(v())) <=.05 then PRINT "point on line"
END SUB ! ----------------------------------------------------
! Sub LINE_SPHERE   Intersects a line with a sphere
!                   and finds the two points of intersection
!   NOTE : The line is in parametric form
! ----------------------------------------------------
SUB LINE_SPHERE (x1(),x2(),c(),r,s1(),s2(),z$)
    ! ---------------
    !           A check for the end points of the line to see
    !           if one of them is on the surface of the sphere
    ! if t = 0 then only one point is shown
    ! ---------------
    DIM k(3)
    LET RR = (x2(1))^2 + (x2(2))^2 + (x2(3))^2
```

A72

FILE: YOYO.TRU
LANGUAGE: TRUE-BASIC

```
    LET ss1 = 2* x2(1) * (x1(1)-c(1))
    LET ss2 = 2* x2(2) * (x1(2)-c(2))
    LET ss3 = 2* x2(3) * (x1(3)-c(3))
    LET q = (x1(1)-c(1))^2+(x1(2)-c(2))^2 +(x1(3)-c(3))^2 -r^2
    LET s = ss1+ss2+ss3
    LET del = s^2 - 4*RR*q
    IF del <0 then
       LET z$ ="NO"
    ELSE
       LET z$ ="YES"
       LET t1 = (-s + sqr(del))/ (2*RR)
       LET t2 = (-s - sqr(del))/ (2*RR)
       FOR i = 1 to 3
          LET s1(i) = x1(i) +(x2(i))*t1
          LET s2(i) = x1(i) + (x2(i))*t2
       NEXT i
    END IF
 END SUB

! ------------------------------

! ------------------------------
! Sub ARC_POLYGON    is one of the four main subroutines that are called
!                 by intersect Two Faces
!Here the arc is only an arc
! ------------------------------
SUB ARC_POLYGON (p1(),c(),p2(),FA(,),f$,temp(,),zq)
library "c:\k\Give_nor.tru"
library "c:\k\planesyo.tru"
dim s1(3),s2(3) ,h(3)
dim X1(3),X2(3)

dim N1(3)
dim N(3)   ! normal to Fa(,)
declare def NN
dim v1(3) ,V2(3)

call Give_normal (Fa(,),N())
mat v1 = p1 - c
mat v2 = p2 - c
```

A73

FILE: YOYO.TRU
LANGUAGE: TRUE-BASIC

```
for i = 1 to 3
let h(i) = Fa(i,1)
next i call cross (N1(),V1(),V2())
call planeS (N1(),p1(),N(),h(),X1(),X2(),A$)
!print "x1 and x2 are "
!mat print x1
!mat print x2
dim ff1(3,2)
for i = 1 to 3
let ff1(i,1)= p1(i)
let ff1(i,2)=p2(i)
next i
dim piu(3,2)
call Two_polygons (ff1(,),fa(,),piu(,),ZQ55)
!print " piu is "
!mat print piu
!print "zq for piu is ";zq55
if zq55 > .5 then
let zq = zq +1
for i = 1 to 3
let temp(i,zq) = piu(i,1)
next i
end if let R = nn(V1())

CALL LINE_SPHERE (x1(),x2(),c(),R,s1(),s2(),x$)
!print "s1 and s2 are "
!mat print s1
!mat print s2

IF x$ ="NO" then
     LET f$ = "NO"
  ELSE
     CALL IN_SECTOR (s1(),p1(),c(),p2(),a$)
!print "point s1 is ";a$ ,"sctor"
     IF a$ = "IN" then CALL IN_OR_OUT (s1(),c$,fa(,),n())
!print "point s1 is ";c$ ,"polygon"
     IF c$ = "IN" then
```

A-74

*FILE: YOYO.TRU*
*LANGUAGE: TRUE-BASIC*

```
        LET zq = zq+1
        FOR i = 1 to 3
            LET temp(i,zq) = s1(i)
        NEXT i
      END IF
      CALL IN_SECTOR (s2(),p1(),c(),p2(),I$)
!print "point s2 is ";I$ ,"sctor"
      IF I$ = "IN" then CALL IN_OR_OUT (s2(),t$,fa(,),n())
!print "point s2 is ";t$ ,"polygon"
      IF t$ = "IN" then
  let zq = zq +1
        FOR i = 1 to 3
            LET temp(i,zq) = s2(i)
        NEXT i
      END IF
    END IF
END SUB sub distance (a(),b(),D)
let D =sqr((a(1)-b(1))^2 + (a(2)-b(2))^2 + (a(3)-b(3))^2)
end sub
!
```

A 75

FILE: VEL_IN.TRU
LANGUAGE: TRUE-BASIC

```
call in_out
end
sub in_out
dim values$(30)
dim vals$(30)
open #20: name "vel_acc.txt", organization text, create newold
reset #20: BEGIN
for i = 1 to 30
input #20: values$(i)
print values$(i)
next i
for i = 1 to 30
input #20: vals$(i)
next i call velocity_acceleration1 (values$())
call velocity_acceleration2 (vals$())
erase #20
reset #20: BEGIN
for i = 1 to 30
if values$(i) ="" then let values$(i) = "1.2"
print #20: values$(i)
next i
for i = 1 to 30
if vals$(i) ="" then let vals$(i) = "1.2"
print #20: vals$(i)
next i
close #20
end sub sub velocity_acceleration1 (values$())
LIBRARY "c:\tb\forms\formlib.trc"
LIBRARY "c:\tb\forms\interpt.trc"
DIM image$(22), types$(30)

DIM keys(2)
MAT READ keys
DATA 315, 324            !F1, F10
```

FILE: VEL_IN.TRU
LANGUAGE: TRUE-BASIC

```
MAT READ image$ !, values$
!if D > 0 then let values$(3) = using$("####.##",D)
ASK mode mode$
IF mode$="MONO" then
   LET formcolor$ = "blue"          !monochrome systems
   LET hicolor$   = "black/white"
   LET errcolor$  = "white/black/blink"
ELSE
   LET formcolor$ = "blue/yellow"   !color adaptor systems
   LET hicolor$   = "red/cyan"
   LET errcolor$  = "red/black/blink"
END IF OPEN #1: screen 0,1,.12,1         !form window
OPEN #2: screen 0,1,0,.08         !error message window
SET color errcolor$ LET start = 1                     !start with field #1
DO
   WHEN error in
      LET flag=0
      CALL FormKey(#1,#2,image$,values$,types$,formcolor$,hicolor$,start,keys)
!let Mu = val(values$(1))
   USE
      CALL KeyStroke2(Extype,start)   !handle the exit key
      LET flag=1
   END WHEN LOOP until flag=0                 !loop until form correctly entered

CLEAR

DATA "                                                                    "
DATA "        | VELOCITY & ACCELERATION |                                  "
DATA "                                                                    "
DATA "
DATA "  SEGMENT    trjctry (in/sec) pt.pt(sec)  ACC.(in/sec^2)
DATA "    1.
```

A-77

FILE: VEL_IN.TRU
LANGUAGE: TRUE-BASIC

```
DATA "       2.       _____    _____                    ["
DATA "       3.       _____    _____                    ["
DATA "       4.       _____    _____                    ["
DATA "       5.       _____    _____                    ["
DATA "       6.       _____    _____                    ["
DATA "       7.       _____    _____                    ["
DATA "       8.       _____    _____                    ["
DATA "       9.       _____    _____                    ["
DATA "      10.       _____    _____                    ["
DATA "      11.       _____    _____                    ["
DATA "      12.       _____    _____                    ["
DATA "      13.       _____    _____                    ["
DATA "      14.       _____    _____                    ["
DATA "      15.       _____    _____                    ["
DATA "                                                        ["
DATA "              F1 -- Help                  ENTER---To Continue            "
END sub sub velocity_acceleration2 (values$())
LIBRARY "c:\tb\forms\formlib.trc"
LIBRARY "c:\tb\forms\interpt.trc"
DIM image$(22), types$(30)

DIM keys(2)
MAT READ keys
DATA 315, 324              !F1, F10

MAT READ image$ !, values$
!if D > 0 then let values$(3) = using$("####.##",D)
ASK mode mode$
IF mode$="MONO" then
   LET formcolor$ = "blue"        !monochrome systems
   LET hicolor$   = "black/white"
   LET errcolor$  = "white/black/blink"
ELSE
   LET formcolor$ = "blue/yellow"  !color adaptor systems
   LET hicolor$   = "red/cyan"
   LET errcolor$  = "red/black/blink"
END IF
```

A 78

*FILE: VEL_IN.TRU*
*LANGUAGE: TRUE-BASIC*

```
OPEN #1: screen 0,1,.12,1      !form window
OPEN #2: screen 0,1,0,.08      !error message window
SET color errcolor$ LET start = 1                  !start with field #1
DO
   WHEN error in
      LET flag=0
      CALL FormKey(#1,#2,image$,values$,types$,formcolor$,hicolor$,start,keys)

!let Mu = val(values$(1))
      USE
         CALL KeyStroke2(Extype,start)   !handle the exit key
         LET flag=1
   END WHEN LOOP until flag=0              !loop until form correctly entered

CLEAR

DATA "
DATA "         | VELOCITY & ACCELERATION |
DATA "
DATA "
DATA "    SEGMENT   trjctry (in/sec)  pt.pt(sec)  ACC.(in/sec^2)
DATA "    16.
DATA "    17.
DATA "    18.
DATA "    19.
DATA "    20.
DATA "    21.
DATA "    22.
DATA "    23.
DATA "    24.
DATA "    25.
DATA "    26.
DATA "    27.
DATA "    28.
DATA "    29.
```

A79

*FILE: VEL_IN.TRU*
*LANGUAGE: TRUE-BASIC*

```
DATA "          30.                                               "
DATA "                                                            "
DATA "          F1 -- Help                    ENTER---To Continue "

END sub

SUB KeyStroke2(key,field)        !handle exit keys...

SELECT CASE key
   CASE 315                      !F1 -- give a little help
      WINDOW #0
      CLEAR
      SET cursor 8,1
      SELECT CASE field
      CASE 1
          PRINT "Default is 0.8 for steel on steel "
          PRINT "Between tube and drum"
      case else
          PRINT "ENTER THE VELOCITY AND ACCELERATION "
      END SELECT
      SET cursor 24,50
      PRINT "Press any key to continue."
      GET KEY x
      CLEAR CASE 324                      !F10 -- cycle form color
      ASK color c
      SET color c+1
   case else
   clear
      print " I am sorry, you have to fill everything "
      print " in the form"
      get key u
   END SELECT

END SUB
```

FILE: Drct_LRN.TRU
LANGUAGE: TRUE-BASIC

```
clear
dim qs(6),v(6)
dim nn(3),ss(3),aa(3),ipoint(3)
dim DH_table(10,4)
dim xp(3), yp(3)    ! two points on the +ve x and y --axis of each insert
    LET a12$ = "DH_data"        ! Tor retrieve the dh-parameters
    LET ooo$ ="record"
    LET ccc$ = "newold"
    OPEN #6:name "dh_data",create "newold",organization "record",recsize 8
    MAT READ #6 :DH_table
    CLOSE #6 open #11: name "d:\lrn_lsp.txt", organization text, create newold
erase #11
reset #11: BEGIN
set #11: margin 250
set #11: zonewidth 10 open #10: name "d:\learn.txt", organization text, create newold
reset #10: BEGIN do while more #10
line input #10:a$
!print " the string is ";a$
call string_to_6numbers (a$,v())
let zq = zq + 1
print "For Object # ";zq
print "Converting back to joint angles"
call convert_back_to_degrees (v())
print "Calculating Direct Kinematics"
call find_direct (v(), nn(),ss(),aa(),ipoint(), dh_table(,))
! two points on the +ve x and y --axis of each insert
print "Creating the Triad -------- Send to AutoLisp"
print
mat xp = nn + ipoint
mat yp = ss + ipoint print #11:ipoint(1)
```

A81

*FILE: Drct_LRN.TRU*
*LANGUAGE: TRUE-BASIC*

```
    print #11:ipoint(2)
    print #11:ipoint(3)
    print #11:xp(1)
    print #11:xp(2)
    print #11:xp(3)
    print #11:yp(1)
    print #11:yp(2)
    print #11:yp(3)

loop
close #10
close #11 end sub find_direct (qs(), nn(),ss(),aa(),ipoint(),dh_table(,))
library "c:\tuberob\DHmatrx.trc"
dim joint$(10)
dim pa1(3),pat(3)

let Nj = 6
mat read joint$
data "P","R","P","R","R","R","","","",""

!call  DHmenu2 (Nj,Dh_table(,))
dim deltheta(6),delD(6)

let delD(1) = qs(1)
let deltheta(2) = qs(2)
let delD(3) = qs(3)
let deltheta(4) = qs(4)
let deltheta(5) = qs(5)
let deltheta(6) = qs(6)

dim A01(4,4),A12(4,4),A23(4,4),A34(4,4),A45(4,4),A56(4,4)
dim f1(4,4)
```

A82

FILE: Drct_LRN.TRU
LANGUAGE: TRUE-BASIC

```
for i = 1 to Nj
  let the = RAD (DH_table(i,1) + deltheta(i))    !THETA(i)
  let alp = RAD(DH_table(i,2))                   !ALPHA(i)
  let a   = DH_table(i,3)                        !A(i)
  let d   = DH_table(i,4)  +delD(i)              !D(i)

select case i
  case 1
    call D_HGeneration( A01(,),a,alp,d,the,joint$(i))
    !mat print A01
  case 2
    call D_HGeneration( A12(,),a,alp,d,the,joint$(i))
    !mat print A12
  case 3
    call D_HGeneration( A23(,),a,alp,d,the,joint$(i))
    !mat print A23
    !get key uu
  case 4
    call D_HGeneration( A34(,),a,alp,d,the,joint$(i))
  case 5
    call D_HGeneration( A45(,),a,alp,d,the,joint$(i))
  case 6
    call D_HGeneration( A56(,),a,alp,d,the,joint$(i))
  end select
next i call DH_mat_mult1(Nj)
!call DH_mat_mult1(6)

!call transf_FF_global (FFa1(,),F1(,))
call transf_to_global (Pa1(),F1(,))

!print " the A06 matrix is "
!print "right here "
!mat print F1
for i = 1 to 3
  let nn(i) = F1(i,1)
  let ss(i) = F1(i,2)
```

A83

FILE: Drct_LRN.TRU
LANGUAGE: TRUE-BASIC

```
let aa(i) = F1(i,3)
let ipoint(i) = F1(i,4)
next i

! ***********************************************
! sub DH_mat_mult is the multiplication routine
! for transferring each point to GLOBAL COORDINATES
! *********************************************** sub DH_mat_mult1(nb)

select case nb
case 0
   mat f1 = IDN         ! Identity Matrix
case 1
   mat f1 = A01
case 2
   mat f1 = A01 * A12
case 3
   mat f1 = A01 * A12
   mat f1 = f1 * A23
case 4
   mat f1 = A01 * A12
   mat f1 = f1 * A23
   mat f1 = f1 * A34
case 5
   mat f1 = A01 * A12
   mat f1 = f1 * A23
   mat f1 = f1 * A34
   mat f1 = f1 * A45
case 6
   mat f1 = A01 * A12
   mat f1 = f1 * A23
   mat f1 = f1 * A34
   mat f1 = f1 * A45
   mat f1 = f1 * A56
end select
```

A84

FILE: Drct_LRN.TRU
LANGUAGE: TRUE-BASIC

```
end sub
!
! ************************************************* sub transf_to_global (p(),F(,))
dim pp(4)
dim q(4)
call D4vect(p(),pp())
mat q = f * pp
call D3vect(q(),p())
end sub

! *************************************************

!sub transf_FF_global (FF(,),F(,))
!dim pp(4)
!dim q(4),p(3)
!for j = 1 to size(FF,2)
!for i = 1 to 3
!let P(i) = FF(i,j)
!next i !call D4vect(p(),pp())
!mat q = f * pp
!call D3vect(q(),p())

!for i = 1 to 3
!let  FF(i,j) = P(i)
!next i
!next j
!
!end sub

! *************************************************
sub D4vect(p(),pp())
let pp(1) = p(1)
let pp(2) = p(2)
let pp(3) = P(3)
let pp(4) = 1
end sub
```

A 85

FILE: Drct_LRN.TRU
LANGUAGE: TRUE-BASIC

```
sub D3vect(pp(),p())
let p(1) = pp(1)
let p(2) = pp(2)
let p(3) = pp(3)
end sub
end sub sub string_to_6numbers (a$,v())
! converts a string that contains six numbers with ONE space between each
! to a matrix with six numbers for i = 1 to 5
let a = pos(a$," ")
let v(i) = val (trim$(a$[1:a]))
let a$ = trim$(a$[a:Maxnum])
if i = 5 then let v(6) = val (trim$(a$[1:a]))
next i
end sub sub convert_back_to_degrees (a())
! output: an array of the generalized coordinates, dimensions of which are
! in : (in),(deg),(in),(deg),(deg),(deg)
for i = 1 to 6
if abs(a(i)) < .000005 then let a(i) = 0
next i ! REQUIRED: convert inchs and degrees
! J-0 -------- the lead is 4(mm) = .15748(in) = (1 rev) = 4096 counts
let a(1) = -a(1) * .15748/4096
! J-1 --------    1 rev (2 Pi)of the arm needs 280868.577 counts
                ! reduction is 4.0/3.5 and 60
let a(2) = -a(2) * (360)/((4/3.5)*60*4096)
! J-2 -------- 1" movement of rack  needs 38197.186 encoder counts
let a(3) = -a(3) / 38197.186
! J-3 -------- 1 rev (2 Pi) of the arm needs 120000 encoder counts
let a(4) = a(4)* (360)/ 120000
! J-4 -------- 1 rev (2 Pi) of the arm needs 240000 encoder counts
let a(5) = -a(5) *360/ 240000
! J-5 -------- 1 rev (2Pi) of the arm needs 4000 encoder counts
let a(6) = -a(6) *360/4000
end sub
```

FILE: One_One.C
LANGUAGE: MS Quick-C

```c
#include "stdio.h"
#include "c:\qcdsp\pcdsp.h"

void gripper_status();
void f1(); /* These are possible criptic nodes that might be inserted */
void f2();
void f3();
void f4();
void f5();
void f6();
void f7();
void f8();
void f9();
void f10();
void call_function();
main ()
{
double final[6],vel[6],accel[6];
          double pos4,pos5;
int grips[18];   /* this array carries the position of the gripper
                    when a change in status is needed   */
int cripts[18];  /* this array carries the position of the criptic nodes
                    in units of count  */
 int status;     /* GRIPPER STATUS */
int initial_grip; /* INITIAL STATUS OF THE GRIPPER */
int wq, zq,dummy;  /* dummy variables */ int count;    /* Number of move commands recovered from d:\capacity.txt */
int i,j,e;
int h,k;
int s;
int axes[6] ={0,1,2,3,4,5};
FILE *fptr;
FILE *fcount;
FILE *fgrip;
FILE *fcript;
void gripper_close( void );
void wait();
```

FILE: One_One.C
LANGUAGE: MS Quick-C

```c
s = 0;
/* Now reading the gripper Status information */
if ( (fgrip = fopen( "D:\\inserts.txt", "rt")) != NULL)
        {
            fscanf (fgrip, "%d \n",&initial_grip);
            printf (" initial_grip = %d \n",initial_grip);
            status = initial_grip;
    gripper_status(&status);
        wait(2);
        zq = 0  ;
  for (i = 0; i<18; i++)
     {fscanf(fgrip, "%d \n", &grips[zq]) ;
    /*    printf("             grips = %d \n",grips[zq]); */
        if (grips[zq] == 99) break;
        zq = zq + 1;
        } printf ("breaking @ zq = %d \n",zq);
  printf ("breaking @ i = %d \n",i);

}
  fclose(fgrip);
/* ---------------------------------------------------- */
/* Now reading the (Criptic nodes) location information */
if ( (fcript = fopen( "D:\\cripts.txt", "rt")) != NULL)
        {
    wq = 0  ;
    for (i = 0; i<18; i++)
        {fscanf(fcript, "%d \n", &cripts[wq]) ;
         printf("             cripts[ %d ] = %d \n", wq, cripts[wq]);

if (cripts[wq] == 99) break;
        wq = wq + 1;
         } printf ("after breaking wq = %d \n",wq);
     printf ("after breaking i = %d \n",i);

}
  fclose(fcript);
            printf (" Just after \n");
```

FILE: One_One.C
LANGUAGE: MS Quick-C

```c
        for (k = 0; k<wq; k++) printf("     cripts[%d] = %d \n",k, cripts[k]);
            printf (" Just after \n");
        for (k = 0; k<zq; k++) printf(" grips[%d] = %d \n",k, grips[k]);

if ( (fcount = fopen( "D:\\capacity.txt", "rt")) != NULL)
        {
          fscanf (fcount, "%d \n",&count);

fclose(fcount);
        } e = dsp_init(0x0300) ;
/*    dsp_reset();    */ clear_status(2);
             get_position(0,&pos5);
        /*   printf ("Before position of 1 = %7.3f \n",pos5);*/
    printf (" \a \n");
    if ( (fptr = fopen( "D:\\read_c.txt", "rt")) != NULL)
    {
     for (i=1; i< count+1; i++)    /* since True Basic counts from 1 to ... */
       {
       for (j=0 ; j< 6; j++)
              { fscanf (fptr, "%lf \r ",&final[j]);}
              final[5] = 0;
       for (j=0 ; j<6; j++)
              { fscanf (fptr, "%lf \r ",&vel[j]);}
       for (j=0 ; j<6; j++)
              { fscanf (fptr, "%lf \r ",&accel[j]);}
            /* MOVE Commands should follow  */
       if (e)
       { fprintf(stderr, "PC-DSP intialization error: %s (%d)\n", _error_msg(e),e);
```

FILE: One_One.C
LANGUAGE: MS Quick-C

```
    return e;
  }
if (!e)
    { move_all (6,axes,final,vel,accel);

for(k= 1; k< zq; k++)
          {if (i == grips[k]) {gripper_status(&status);printf ("@ i = %d status = %d \n",i, status); }} for (k = 0 ; k<wq; k++)
         {if (i == cripts[k])
    { printf (" I am calling  at k = %d and cripts(k) = %d \n",k, cripts[k]);s = s + 1; call_function(s);}
           }
        }

}

/* -------------------------------------------------- */ fclose(fptr);
  }
 else printf(" Trouble opening read_c.txt");
}
```

A90

FILE: One_One.C
LANGUAGE: MS Quick-C

```c
void gripper_close(void)
{
init_io(2, IO_OUTPUT);
set_io (2, 1);
} void gripper_status(s)
int *s;
{
int temp;
temp = *s;
   printf ("inside grip_status  temp = %d ",temp);
       if (temp == 1)
       { printf (" Opening \n");
         init_io(2, IO_OUTPUT);
         set_io (2, 1);
         *s = 2;
       }
       else
       { printf (" Closing \n");
         init_io(2, IO_OUTPUT);
         set_io (2, 0);
         *s = 1;
       }
}

/* - ---- ---- ---- ---- ---- ----- -------------------- - */
/* - ---- ---- ---- ---- ---- ----- -------------------- - */
void wait(sec)
int sec;
{    int a,i;
a =  5;
for (i= 0; i<(sec*10000); i++)
    { a = a + 2; }
}
```

FILE: Get_Grip.C
LANGUAGE: MS Quick-C

```c
#include "stdio.h"

main ()
{
int grips[18];

int initial_grip;
int zq,i,dummy,k;
int count;     /* Number of move commands recovered from d:\capacity.txt */
FILE *fgrip;
void check_gripper();
if ( (fgrip = fopen( "D:\\inserts.txt", "rt")) != NULL)
        {
            fscanf (fgrip, "%d \n",&initial_grip);
            printf (" initial_grip = %d \n",initial_grip);
        zq = 0   ;
for (i = 0; i<18; i++)
    {fscanf(fgrip, "%d \n", &grips[zq]) ;
        printf("             grips = %d \n",grips[zq]);
        if (grips[zq] == 99) break;
        zq = zq + 1;
        }
printf ("after breaking zq = %d \n",zq);
printf ("after breaking i = %d \n",i);
  }
 fclose(fgrip);
   check_gripper(zq, zq);
} void check_gripper (zq, var)
int zq,var;
{
 int k;
 for (k=0; k< zq; k++)
        {
            printf(" k = %d ",k);
        }
}
```

A92

FILE:Learn.C
LANGUAGE: MS Quick-C

```c
#include "stdio.h"
#include "conio.h"
#include "c:\qcdsp\pcdsp.h"
main ()
{
double final[6],vel[6],accel[6];
            double pos0,pos1,pos2,pos3,pos4,pos5;
int a,zq;
int count;    /* Number of move commands recovered from d:\\capacity.txt */
int repeat;   /* Number of repeat times recovered from d:\\repeat.txt   */
int i,j,e;
int h,k,q;
int axes[6] ={0,1,2,3,4,5};
FILE *fptr;
    e = dsp_init(0x0300) ;
if ( (fptr = fopen( "D:\\learn.txt", "w")) != NULL)
{
printf (" Please start inserting positions of interest \n");
printf (" <F1> To insert a point \n");
printf ("<ESC> To terminate session \n");

while (a != 27)
{
 if (kbhit ())
    {if (getch() == 27) {break;}
  if (getch() == 59) { zq = zq + 1;
get_position(0,&pos0);get_position(1,&pos1); get_position(2,&pos2);
get_position(3,&pos3);get_position(4,&pos4); get_position(5,&pos5);
fprintf (fptr, "%7.5f %7.5f %7.5f %7.5f %7.5f %7.5f
\n",pos0,pos1,pos2,pos3,pos4,pos5);
printf (" Position # %d \n",zq);
printf ( "%7.5f %7.5f %7.5f %7.5f %7.5f %7.5f \n",pos0,pos1,pos2,pos3,pos4,pos5);
                }
 }
}
        printf ("\n");
}
fclose(fptr);
}
```

*FILE: Cript.lsp*
*LANGUAGE: AutoLisp*

```
(defun c:cript()
(setq st (getpoint "Create a Criptic Node at: "))
(command "insert" "axis2" st "1" "1" "0")
;(command "ucs" "W")

(setq pt (trans st 1 0))
;(setq pt (getpoint "Create a script at (choose a node):"))
(setq a (car pt))
(setq b (car (cdr pt)))
(setq c (caddr pt))

(prin1 a)
(prin1 b)
(prin1 c)

; change to string
(setq a (rtos a 2 4))
(setq b (rtos b 2 4))
(setq c (rtos c 2 4))
; get the integer part
(setq a (atoi a))
(setq b (atoi b))
(setq c (atoi c))
; change to string again so as to write to a file
(setq a (rtos a 2 0))
(setq b (rtos b 2 0))
(setq c (rtos c 2 0))
(setq e (open "d:\\l_name.txt" "w"))

(write-line a e)
(write-line b e)
(write-line c e)

(close e)
(command "n_scrpt")

)
```

FILE: EDIT.Lsp
LANGUAGE:AutoLisp

```
(defun c:edit()
;(command "ucs" "w")
(setq pt (getpoint "What script to edit (choose a node):") )
; translate the point from UCS to WCS
(setq pt (trans pt 1 0))

(setq a (car pt))
(setq b (car (cdr pt)))
(setq c (caddr pt))
;(prin1 a)
;(prin1 b)
;(prin1 c)
! --------

(setq a (rtos a 2 4))
(setq b (rtos b 2 4))
(setq c (rtos c 2 4))
; get the integer part
(setq a (atoi a))
(setq b (atoi b))
(setq c (atoi c))
; change to string again so as to write to a file
(setq a (rtos a 2 0))
(setq b (rtos b 2 0))
(setq c (rtos c 2 0))
! --------
(setq e (open "d:\\l_name.txt" "w"))
(write-line a e)
(write-line b e)
(write-line c e)
(close e)
(command "e_scrpt")

)
```

FILE: LEARN.LSP
LANGUAGE: AutoLisp

```
(defun c:gen()
(command "drct_lrn")

(setq f (open "d:\\lrn_lsp.txt" "r"))
(repeat 16
(setq a (read-line f))
(setq a (atof a))
(setq b (read-line f))
(setq b (atof b))
(setq c (read-line f))
(setq c (atof c))
(setq ipoint (list a b c))

(prin1 "hello dear")
(setq a (read-line f))
(setq a (atof a))
(setq b (read-line f))
(setq b (atof b))
(setq c (read-line f))
(setq c (atof c))
(setq xp (list a b c))

(setq a (read-line f))
(setq a (atof a))
(setq b (read-line f))
(setq b (atof b))
(setq c (read-line f))
(setq c (atof c))
(setq yp (list a b c))

(command "ucs" "w")
(command "ucs" "3" ipoint xp yp)
(command "insert" "axis" "0,0" "1" "1" "0")
)
(close f)
)
```

A96

*FILE: LEARN.LSP*
*LANGUAGE: AutoLisp*

*FILE: ECHO.LSP*
*LANGUAGE: AutoLisp*

```
(defun c:echo ()

(setq f (open "d:\\echo.txt" "w"))
(setq r (getint "How Many Times to ECHO : "))
(setq rep (rtos r 2 0))
(write-line rep f)
(close f)

(command "echo1")

)
```

*FILE: Node.LSP*
*LANGUAGE: AutoLisp*

```
(defun c:node()

(initget 1 "O C")

(setq x (getkword "Gripper Open or Closed ? (O / C) "))

(setq pt (getpoint "Enter a point Please: "))
(if (= x "O") (command "insert" "axis" pt "1" "1" "0"))
(if (= x "C") (command "insert" "axisC" pt "1" "1" "0"))

)
```

I claim:

1. A method for inputting robot end-effector information into a graphical interface, visualizing the information in a three dimensional graphical environment associated with the interface, and generating robot control data therefrom, the method comprising the steps of:

(a) storing graphical image data of the robot end-effector;

(b) inputting one or more nodes into the graphical interface, each node including configuration dam defining the orientation and position of the robot end-effector in three dimensional space, wherein said configuration data is input by:

(i) placing a robot end-effector associated with a six-axis robot at a preselected orientation and position in space;

(ii) reading joint data associated with each of the six axes; and (iii) converting the joint data into orientation and position data corresponding to the coordinate system of the graphical interface;

(c) generating a graphical image of the node in the three dimensional graphical environment from the input node information and stored graphical image data, the graphical image showing the robot end-effector in the robot end-effector's configuration; and (d) creating robot programming language and data files from the node information for controlling operation of the robot end-effector.

2. A method according to claim 1 wherein step (b) includes inputting a plurality of nodes, the method further comprising the step of:

(e) inputting a trajectory between at least one pair of the nodes, wherein step (c) further includes showing the trajectory between the two nodes in the three dimensional graphical environment and step (d) further includes creating the robot programming language and data files from the trajectory.

3. A method according to claim 2 wherein the trajectory between two nodes is generated by a CAD point connecting function.

4. A method according to claim 2 wherein the trajectory between two nodes is generated by specifying a user defined trajectory.

5. A method according to claim 1 further comprising the steps of:

(e) inputting CAD data defining a three dimensional model of a simulated object; and (f) generating a graphical image of the simulated object from the CAD data and displaying the graphical image of the simulated object in the three dimensional graphical environment, along with the one or more end-effector images.

6. A method according to claim 1 wherein the configuration data defining the robot end-effector position in step (b) is input by inputting x, y and z axis coordinates in space.

7. A method according to claim 1 wherein the configuration data defining the robot end-effector position in step (b) is input by:

(i) inputting CAD data to define a line in three dimensional space;

(ii) selecting a point along the line and/or at the end of the line; and (iii) associating the position with the specified point.

8. A method according to claim 1 wherein the configuration data defining the robot end-effector position in step (b) is input by:

(i) inputting CAD data to define a solid model of a simulated object;

(ii) generating a graphical image of the solid model from the CAD data and displaying the graphical image of the solid model in the three dimensional graphical environment;

(iii) selecting a point on the solid model; and (iv) associating the position with the specified point.

9. A method according to claim 1 wherein the configuration data defining the robot end-effector orientation in step (b) is input by:

(i) selecting one or more axes; and (ii) inputting an amount of rotation about the selected axis.

10. An apparatus for inputting robot end-effector information into a graphical interface, visualizing the information in a three dimensional graphical environment associated with the interface, and generating robot control data therefrom, the apparatus comprising:

(a) means for storing graphical image data of the robot end-effector;

(b) means for inputting one or more nodes into the graphical interface, each node including configuration data defining the orientation and position of the robot end-effector in three dimensional space, said means for inputting further including, (i) means for placing a robot end-effector associated with a six-axis robot at a preselected orientation and position in space;

(ii) means for reading joint data associated with each of the six axes; and (iii) means for converting the joint data into orientation and position data corresponding to the coordinate system of the graphical interface, wherein the converted orientation and position data is the orientation and position of the robot end-effector in three dimensional space;

(c) means for generating a graphical image of the node in the three dimensional graphical environment from the input node information and stored graphical image data, the graphical image showing the robot end-effector in the robot end-effector's configuration; and (d) means for creating robot programming language and data files from the node information for controlling operation of the robot end-effector.

11. An apparatus according to claim 10 wherein a plurality of nodes are input into the means for inputting, the apparatus further comprising:

(e) means for inputting a trajectory between at least one pair of the nodes; and (f) means for generating the trajectory between the two nodes in the three dimensional graphical environment, the means for creating robot programming language and data files further including means for creating the robot programming language and data files from the trajectory.

12. An apparatus according to claim 11 wherein the means for generating the trajectory between two nodes is a CAD point connecting function.

13. An apparatus according to claim 11 wherein the means for generating the trajectory between two nodes employs a user defined trajectory.

14. An apparatus according to claim 10 further comprising:

(e) means for inputting CAD data defining a three dimensional model of a simulated object; and (f) means for generating a graphical image of the simulated object from the CAD data and displaying the graphical image of the simulated object in the three dimensional graphical environment, along with the one or more end-effector images.

15. An apparatus according to claim 10 wherein the means for inputting includes means for inputting x, y and z axis coordinates in space, the coordinates being the position of the robot end-effector in three dimensional space.

16. An apparatus according to claim 10 wherein the means for inputting includes:
   (i) means for inputting CAD data to define a line in three dimensional space; and
   (ii) means for selecting a point along the line and/or at the end of the line,
      wherein the position of the selected point is the position of the robot end-effector in three dimensional space.

17. An apparatus according to claim 10 wherein the means for inputting includes:
   (i) means for inputting CAD data to define a solid model of a simulated object;
   (ii) means for generating a graphical image of the solid model from the CAD data and displaying the graphical image of the solid model in the three dimensional graphical environment; and
   (iii) means for selecting a point on the solid model,
      wherein the position of the selected point is the position of the robot end-effector in three dimensional space.

18. An apparatus according to claim 10 wherein the means for inputting includes means for selecting one or more axes and inputting an amount of rotation about the selected axis,
   wherein the amount of rotation about the selected axis is the orientation of the robot end-effector in three dimensional space.

19. A method for inputting robot end-effector information into a graphical interface, visualizing the information in a three dimensional graphical environment associated with the interface, and generating robot control data therefrom, the method comprising the steps of:
   (a) storing graphical image data of the robot end-effector;
   (b) inputting one or more nodes into the graphical interface, each node including configuration data defining the orientation and position of the robot end-effector in three dimensional space, each node further including end-effector state information at the node, wherein one of the states of the robot end-effector is Criptic;
   (c) generating a graphical image of the node in the three dimensional graphical environment from the input node information and stored graphical image data, the graphical image showing the robot end-effector in the robot end-effector's configuration, said graphical image further includes showing the state of the robot end-effector at the robot end-effector's node in the three dimensional graphical environment;
   (d) inputting a set of instructions associated with a robot at the respective node when the Criptic state is input; and
   (e) creating robot programming language and data files from the node and state information for controlling operation of the robot end-effector, and said set of instructions, thereby allowing the set of instructions to be executed when the robot reaches the respective node.

20. A method according to claim 19 wherein the set of instructions in step (d) is input through a text editor.

21. A method for inputting robot end-effector information into a graphical interface, visualizing the information in a three dimensional graphical environment associated with the interface, and generating robot control data therefrom, the method comprising the steps of:
   (a) storing graphical image data of the robot end-effector;
   (b) inputting one or more nodes into the graphical interface, each node including configuration data defining the orientation and position of the robot end-effector in three dimensional space, each node further including end-effector state information at the node, said state information comprising the state of being open, closed or Criptic;
   (c) generating a graphical image of the node in the three dimensional graphical environment from the input node information and stored graphical image data, the graphical image showing the robot end-effector in the robot end-effector's configuration, said graphical image further includes showing the state of the robot end effector at the robot end-effector's node in the three dimensional graphical environment; and
   (d) creating robot programming language and data files from the node and state information for controlling operation of the robot end-effector.

22. A method for inputting robot end-effector information into a graphical interface, visualizing the information in a three dimensional graphical environment associated with the interface, and generating robot control data therefrom, the apparatus comprising:
   (a) means for storing graphical image data of the robot end-effector;
   (b) means for inputting one or more nodes into the graphical interface, each node including configuration data defining the orientation and position of the robot end-effector in three dimensional space, each node further including end-effector state information at the node, wherein one of the states of the robot end-effector is Criptic;
   (c) means for generating a graphical image of the node in the three dimensional graphical environment from the input node information and stored graphical image data, the graphical image showing the robot end-effector in the robot end-effector's configuration, said means for generating a graphical image further including a means for showing the state of the robot end-effector at the robot end-effector's node in the three dimensional graphical environment;
   (d) means for inputting a set of instructions associated with a robot at the respective node when the Criptic state is input; and
   (e) means for creating robot programming language and data files from the node and state information for controlling operation of the robot end-effector, and said set of instructions, thereby allowing the set of instructions to be executed when the robot reaches the respective node.

23. An apparatus according to claim 22 wherein the means for inputting a set of instructions is a text editor.

24. An apparatus for inputting robot end-effector information into a graphical interface, visualizing the information in a three dimensional graphical environment associated with the interface, and generating robot control data therefrom, the apparatus comprising:
   (a) means for storing graphical image data of the robot end-effector;

(b) means for inputting one or more nodes into the graphical interface, each node including configuration data defining the orientation and position of the robot end-effector in three dimensional space, each node further including end-effector state information at the node, said state information comprising the state of being open, closed or Criptic;

(c) means for generating a graphical image of the node in the three dimensional graphical environment from the input node information and stored graphical image data, the graphical image showing the robot end-effector in the robot end-effector's configuration, said means for generating a graphical image further including means for showing the state of the robot end-effector at the robot end-effector's node in the three dimensional graphical environment; and (d) means for creating robot programming language and data files from the node and state information for controlling operation of the robot end-effector.

* * * * *